(12) United States Patent
Fujita et al.

(10) Patent No.: US 8,248,975 B2
(45) Date of Patent: Aug. 21, 2012

(54) WIRELESS TRANSMITTING APPARATUS, WIRELESS RECEIVING APPARATUS, WIRELESS TRANSMISSION METHOD, WIRELESS RECEPTION METHOD, WIRELESS COMMUNICATION SYSTEM, AND WIRELESS COMMUNICATION METHOD

(75) Inventors: Takafumi Fujita, Yokohama (JP); Daisei Uchida, Yokohama (JP); Yosuke Fujino, Yokosuka (JP); Osamu Kagami, Yokosuka (JP); Masahiro Umehira, Yokohama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1186 days.

(21) Appl. No.: 11/990,807

(22) PCT Filed: Sep. 5, 2006

(86) PCT No.: PCT/JP2006/317556
§ 371 (c)(1),
(2), (4) Date: Feb. 21, 2008

(87) PCT Pub. No.: WO2007/029702
PCT Pub. Date: Mar. 15, 2007

(65) Prior Publication Data
US 2009/0285137 A1    Nov. 19, 2009

(30) Foreign Application Priority Data

Sep. 6, 2005  (JP) ................ 2005-257539
Mar. 6, 2006  (JP) ................ 2006-060102
Mar. 6, 2006  (JP) ................ 2006-060103
Apr. 13, 2006 (JP) ................ 2006-110786

(51) Int. Cl.
*H04B 7/00* (2006.01)

(52) U.S. Cl. ............ 370/310; 370/208; 370/331
(58) Field of Classification Search ............ 370/310, 370/491, 208
See application file for complete search history.

(56) References Cited

U.S. PATENT DOCUMENTS 6,515,960 B1 * 2/2003 Usui et al. ................ 370/203
(Continued)

FOREIGN PATENT DOCUMENTS

CN        1525674 A    9/2004
(Continued)

OTHER PUBLICATIONS

Barhumi, Imad, et al., "Optimal Training Design for MIMO OFDM Systems in Mobile Wireless Channels," IEEE Transactions on Signal Processing, vol. 51, No. 6, Jun. 2003, pp. 1615-1624.

(Continued)

*Primary Examiner* — Dang Ton
*Assistant Examiner* — Pamit Kaur
(74) *Attorney, Agent, or Firm* — Harness, Dickey & Pierce, P.L.C.

(57) ABSTRACT

A wireless transmitting apparatus inserts a training signal into a transmission burst at fixed symbol intervals as a pilot signal, a wireless receiving apparatus performs AD conversion of a received burst signal, performs symbol timing recovery, performs frame position detection and pilot signal extraction from the received burst signal for which symbol timing was established, performs frame synchronization, and performs a carrier frequency estimation using pilot signal. A carrier frequency estimation is also performed with respect to a received burst signal for which frame synchronization was established, and channel distortion is estimated and output based on a frequency-corrected received burst signal. Channel distortion estimation is then performed with respect to a frequency-corrected received burst signal, and a data symbol sequence of the channel-compensated received burst signal is converted to a received data bit stream.

44 Claims, 44 Drawing Sheets

U.S. PATENT DOCUMENTS

| | | | | |
|---|---|---|---|---|
| 2002/0181390 | A1* | 12/2002 | Mody et al. | 370/208 |
| 2003/0179776 | A1* | 9/2003 | Sumasu et al. | 370/491 |
| 2004/0001563 | A1* | 1/2004 | Scarpa | 375/326 |
| 2004/0190440 | A1 | 9/2004 | Kim et al. | |
| 2004/0190639 | A1* | 9/2004 | Pauli et al. | 375/260 |
| 2005/0084035 | A1* | 4/2005 | Kim et al. | 375/295 |
| 2005/0094550 | A1 | 5/2005 | Huh et al. | |
| 2006/0182063 | A1* | 8/2006 | Ma et al. | 370/331 |

FOREIGN PATENT DOCUMENTS

| | | |
|---|---|---|
| EP | 1401133 A1 | 3/2004 |
| JP | 4-213257 A | 8/1992 |
| JP | 2002-84258 A | 3/2002 |
| JP | 2003-87218 A | 3/2003 |
| JP | 2003-283458 A | 10/2003 |
| WO | 99/53666 A1 | 10/1999 |
| WO | 2005/022797 A2 | 3/2005 |

OTHER PUBLICATIONS

Matic, Dusan, et al., "Acquisition of synchronisation of parameters for OFDM using a single training symbol," in Fazel, K., et al., "Multi-Carrier Spread-Spectrum & Related Topics," Dordrecht, The Netherlands: Kluwer Academic Publishers, Jan. 2000, pp. 319-326.

Namiki, Junji, "Block Demodulation for Short Radio Packet," the transactions of IECE, vol. J67-B, No. 1, Jan. 1984, pp. 54-61.

Kobayashi, Kiyoshi et al., "Fully Digital Burst Modem for Satellite Multimedia Communication Systems," IEICE Trans. Commun., vol. E80-B, No. 1, Jan. 1997, pp. 8-15.

Matsumoto, Yoichi et al., "VLSI Implemented 60 Mb/s QPSK/OQPSK Burst Digital Demodulator for Radio Application," IEICE Trans. Electron., vol. E77-C. No. 12, Dec. 1994, p. 1873-1880.

Matsumoto, Yoichi et al., "A New Burst Coherent Demodulator for Microcellular TDMA/TDD Systems," IEICE Trans. Commun., vol. E77-B, No. 7, Jul. 1994, pp. 927-933.

Sampei, Seiichi, Applications Digital Wireless Technologies Global Wireless Communications, 1997, pp. 116-159 and 315-332.

Ogura, Koji et al., "Slot Synchronization for TDMA Digital Mobile Communications," IEICE, B-292, pp. 2-292 (1990).

Luise, Marco, "Carrier Frequency Recovery in All-Digital Modems for Burst-Mode Transmissions,"IEEE Transactions on Communications, vol. 43, No. 2/3/4, Feb./Mar./Apr. 1995, pp. 1169-1178.

Oerder, Martin, "Digital Filter and Square Timing Recovery," IEEE Transactions on Communications, vol. 36, No. 5, May 1988, pp. 605-612.

Cavers, James K., "An Analysis of Pilot Symbol Assisted Modulation for Rayleigh Fading Channels," IEEE Transactions on Vehicular Technology, vol. 40, No. 4, Nov. 1991, pp. 686-693.

Ohsawa, Tomoki, et al. "Preamble-less Demodulator for Inmarsat Standard-C Coast Earth Station," ICC '92, pp. 0783-0787., 1992.

Honda, Teruhiko, et al., "A Novel Carrier Recovery Method for Preambleless Demodulation," The Transactions of the IEICE, vol. E-73, No. 10, Oct. 1990, pp. 1681-1687.

Miyake, Yutaka, et al., "Block Demodulation for Trellis Coded Modulation," The Transactions of the IEICE, vol. E-73, No. 10, Oct. 1990, pp. 1674-1680.

* cited by examiner

FIG. 13

| | FIRST EMBODIMENT (FIG. 1) | SECOND EMBODIMENT (FIG. 2) |
|---|---|---|
| MODULATION RATE | 9600 symbol/SECOND | |
| PULSE-SHAPING FILTER | ROOT ROLL-OFF FILTER (ROLL-OFF FACTOR = 0.6) | |
| MODULATION METHOD | QPSK | |
| FORWARD ERROR CORRECTION | CONVOLUTIONAL CODE VITERBI DECODING | |
| PROPAGATION CHANNEL | FLAT RAYLEIGH FADING | |
| DOPPLER FREQUENCY | 10Hz | |
| FREQUENCY OFFSET | 1kHz | |
| RECEIVE DIVERSITY METHOD | 2-BRANCH RECEIVE DIVERSITY WITH MAXIMAL RATIO COMBINING | |
| DATA LENGTH | 16 byte (128 SYMBOL) | |
| PILOT LENGTH × PILOT NUMBER | 4 symbol×5 | |
| BURST LENGTH | 148 symbol | |
| CHANNEL FREQUENCY ESTIMATED NUMBER | 1 | 3 |

FIG. 24

| MODULATION RATE | 9600 symbol/s |
|---|---|
| ROLL-OFF FACTOR | 0.5 |
| MODULATION METHOD | QPSK |
| FORWARD ERROR CORRECTION | CONVOLUTIONAL CODING AND VITERBI DECODING (K=7, R=1/2) |
| PROPAGATION CHANNEL | 1-WAVE RAYLEIGH FADING |
| DOPPLER FREQUENCY | 10 Hz |
| RECEIVE DIVERSITY METHOD | NO DIVERSITY/ 2-BRANCH RECEIVE DIVERSITY WITH MAXIMAL RATIO COMBINING |
| CODE SEQUENCE FOR FRAME SYNCHRONIZATION | Walsh-Hadamard SEQUENCE |
| DATA LENGTH | 16 byte (128 symbol) |
| PILOT LENGTH × PILOT NUMBER | 4 symbol × 5 |
| BURST LENGTH | 148 symbol |

FIG. 33

| MODULATION RATE | 9600 symbol/s |
|---|---|
| PULSE-SHAPING FILTER | ROOT ROLL-OFF (ROLL-OFF FACTOR = 0.5) |
| MODULATION METHOD | QPSK |
| FORWARD ERROR CORRECTION | CONVOLUTIONAL CODING AND VITERBI DECODING (K=7, R=1/2) |
| CHANNEL MODEL | SINGLE PATH RAYLEIGH FADING |
| DOPPLER FREQUENCY | 10 Hz |
| PACKET LENGTH | 16 byte |
| BURST LENGTH | 148 symbol |

FIG. 35

| | SEQUENTIAL DEMODULATION USING PREAMBLE | | | INVENTION |
|---|---|---|---|---|
| MODULATION RATE | 9600 symbol/s | | | |
| PULSE-SHAPING FILTER | ROOT ROLL-OFF FILTER (ROLL-OFF FACTOR = 0.5) | | | |
| MODULATION METHOD | QPSK | | | |
| FORWARD ERROR CORRECTION | CONVOLUTIONAL CODING AND VITERBI DECODING (K=7, R=1/2) | | | |
| PROPAGATION CHANNEL | SINGLE PATH RAYLEIGH FADING | | | |
| DOPPLER FREQUENCY | 10 Hz | | | |
| DATA LENGTH | 16 bytes (128 symbols) | | | |
| PREAMBLE LENGTH | 16 symbols | 32 symbols | 64 symbols | — |
| PILOT LENGTH | 4symbols x5 | 4 symbols x5 | 4 symbols x5 | 4 symbols x5 |
| BURST LENGTH | 164 symbols | 180 symbols | 212 symbols | 148 symbols |
| TRANSMISSION EFFICIENCY | 0.78 | 0.71 | 0.60 | 0.86 |

FIG. 43

EXPERIMENTAL APPARATUS CONDITIONS AND MEASUREMENT CONDITIONS

| Carrier frequency band | 280 MHz |
|---|---|
| Modulation method | $\pi/4$-QPSK |
| Modulation rate | 9600symbol/s |
| Pulse-shaping filter | Root cosine roll-off filter (Roll-off factor=0.5) |
| Signal Bandwidth | 14.4kHz |
| Forward error correction | Convolutional coding, Viterbi decoding (K=7, R=1/2) |
| Data transmission rate | 9600bit/s |
| Propagation channel | Single-Path Rayleigh fading |
| Doppler frequency | 10Hz |
| Rx diversity method | Single/MRC with 2-branch Rx antennas /MRC with 3-branch Rx antennas |
| Data packet length | 16 byte |

WIRELESS TRANSMITTING APPARATUS, WIRELESS RECEIVING APPARATUS, WIRELESS TRANSMISSION METHOD, WIRELESS RECEPTION METHOD, WIRELESS COMMUNICATION SYSTEM, AND WIRELESS COMMUNICATION METHOD

TECHNICAL FIELD

The present invention relates to a wireless transmitting apparatus, a wireless transmission method, and a wireless-communication system in a digital wireless communication system, that is, a signal transmission system utilizing digital wireless communication technology. The invention particularly relates to a wireless transmitting apparatus, a wireless receiving apparatus, a wireless transmission method, a wireless reception method, a wireless communication system, and a wireless communication method, which utilize block demodulation. In accordance with the block demodulation, burst signals that have been received by a wireless receiving apparatus are block-stored in a storage unit or in a storing process and the block-stored signals are then applied to a digital signal processing, thereby performing burst synchronization and demodulation (symbol decision).

Priority is claimed on Japan Patent Application No. 2005-257539, filed Sep. 6, 2005, Japan Patent Applications Nos. 2006-60102 and 2006-60103, both filed Mar. 6, 2006, and Japan Patent Application No. 2006-110786, filed Apr. 13, 2006, the contents of which are incorporated herein by reference.

BACKGROUND ART

Conventional modulation methods in digital wireless communication include frequency shift keying (FSK), phase shift keying (PSK), and quadrature amplitude modulation (QAM). While FSK is a nonlinear modulation method, it is remarkably power-efficient, being effective in miniaturization and reduction of power consumption, and has been used in wireless call systems and the like.

However, with the increase in rate and capacity of recent wireless communications, linear modulation schemes such as PSK and QAM are being widely used in many wireless communication systems due to their excellent spectral efficiency. QAM is effective in increasing spectral efficiency, and can transmit a lot of data in a narrow band since it superimposes signal data to both amplitude and phase. It is therefore widely used in high-rate transmission modes and the like of fixed micro relay systems and wireless local area network (LAN) systems. However, QAM has low power efficiency, and requires a high signal-to-noise power ratio as multi-valuing increases.

PSK superimposes signal data only to the phase, and its frequency use efficiency is inferior to multi-level QAM schemes such as 64QAM and 256QAM. However, it is superior to FSK and QAM in regard to having excellent bit error rate characteristics, even in a low signal-to-noise ratio. This is effective when performing wireless transmission over long distances while suppressing transmission power; in particular, binary PSK (BPSK) and quadrature PSK (QPSK) are one of the most widely used digital wireless modulation methods in satellite communication systems, mobile telephone systems, low-rate transmission mode of wireless LAN, etc.

When considering effective use in the frequency band, the issue must consider the time axis and not only the frequency axis. Wireless communication systems today mainly use time division multiplexing (TDM) for transmitting multiplexed packets (or bursts) on the time axis. The TDM transmission method can be described as a multiplex method suitable for flexibly modifying and allocating lengths and numbers of packets on the time axis.

FIG. 26 is a block diagram of a conventional wireless transmitting apparatus used in TDM transmission schemes and the like. The conventional wireless transmitting apparatus includes a symbol generating circuit 101 that converts a transmission data bit stream S100 to an information symbol sequence, a preamble generating circuit 102 that generates a preamble (training signal) S102 and includes a carrier recovery signal generating circuit, a clock recovery signal generating circuit, and a frame synchronization signal generating circuit, a multiplexing circuit 103 that generates a transmission burst signal S102 by multiplexing the preamble S102 and the data symbol sequence S101, and a digital-to-analog conversion circuit 104 that converts the transmission burst signal S103 from digital to analog. FIG. 28 is an example of the frame configuration of the transmission burst generated by a conventional transmitting apparatus.

FIG. 27 is a block diagram of a conventional wireless receiving apparatus. A sequential demodulation wireless receiving apparatus using conventional synchronization detection includes an A/D conversion circuit 201 performs analog-digital (A/D) conversion of an analog received burst signal S200 and converts it to a digital received burst signal, a carrier recovery circuit 202 that extracts a carrier recovery signal portion from a received burst signal S201 and performs carrier recovery, a symbol timing synchronization circuit 203 that, after carrier recovery, extracts a symbol timing recovery signal portion and performs symbol timing recovery, a channel estimation circuit 204 that estimates propagation channel distortion based on a detected symbol timing, a channel distortion correction circuit 205 that corrects channel distortion using information related to channel distortion, a symbol decision circuit 206 that, after channel distortion correction, identifies a received data symbol and converts it to a received data bit stream, a frame detection circuit 207 that, after symbol decision, extracts a frame synchronization signal and performs frame detection, and a frame synchronization circuit 208 that performs frame synchronization using a detected frame position.

To extract burst synchronization signals such as symbol timing and carrier frequency and the like in wireless packet (burst) transmission, a training signal sequence represented by a preamble signal and a pilot signal is provided in the wireless burst. These training signals are used in compensating channel distortion that fluctuates within the burst. Since preamble signals and pilot signals are redundant signal that do not carry data themselves, they reduce transmission efficiency (frame efficiency). This reduction in transmission efficiency (frame efficiency) is particularly noticeable when the packet length is short.

There has been proposed a block demodulation method of suppressing reduction in the transmission efficiency (frame efficiency) by storing received burst signals that were quasi-coherently detected by a local oscillator of the receiver itself in a temporary memory, and performing burst synchronization and demodulation after extracting a signal for synchronization from the stored received burst signals (see non-patent literature 1). The block demodulation method makes it possible to temporarily store and repeatedly read all received burst signals, and to perform processes of symbol timing synchronization, carrier frequency estimation, channel estimation, etc. The training signal can therefore be shortened, and deterioration in transmission efficiency (frame efficiency) can be suppressed.

[Non-Patent Literature] Junji Namiki, 'Block Demodulation for Short Radio Packet', in The Transactions of the Institute of Electronics and Communication Engineers of Japan, 1984, vol. J67-B, No. 1, pp. 54-61.

DISCLOSURE OF THE INVENTION

Issues to be Solved by the Invention

Systems such as a RF-ID (Radio Frequency Identification) and a sensor network differ from broadband communication systems such as wireless LAN and next-generation mobile telephones for which short packets (burst) communication will become predominant. In the conventional sequential demodulation methods that merely list various types of training signals for synchronization, transmission efficiency (frame efficiency) remarkably deteriorates as the packet length decreases. The frame configuration must therefore be altered to compress a known signal. In carrier recovery used in sequential demodulation methods, a certain amount of burst length is needed to maintain pull-in precision, leading to a problem that carrier frequency synchronization performances deteriorate as the packet length is compressed.

In block demodulation methods such as that disclosed in non-patent literature 1, a preamble part can be omitted, since carrier frequency estimation and symbol timing recovery are performed using a payload part constituted by a data signal. Also, since the carrier frequency is block-estimated and corrected instead of performing gradual pull-in carrier recovery, this method is suitable for coherent detection using short packets. However, in a block demodulation method in which a wireless burst is configured only by data symbols, when the packet length is extremely short, energy required for carrier frequency estimation cannot be ensured in regions of low carrier-to-noise power ratio (CNR), leading to a problem of deterioration in the wireless transmission bit error rate. Furthermore, since the frame synchronization signal must be provided separately from the data signal, deterioration in the transmission efficiency (frame efficiency) is unavoidable.

The present invention has been realized in view of the above circumstances. An object of the present invention is to provide a wireless transmitting apparatus, a wireless transmission method, and a wireless communication system that can increase the transmission efficiency (frame efficiency) in wireless transmission by processing, compressing, and sharing a known training signal sequence. A further object of the present invention is to provide a wireless transmitting apparatus, a wireless receiving apparatus, a wireless transmission method, a wireless reception method, and a wireless communication system that can increase the precision of carrier frequency synchronization performances in regions of low CNR. Furthermore, it is another object of the invention to provide a wireless transmitting apparatus, a wireless receiving apparatus, a wireless transmission method, a wireless reception method, and a wireless communication system that can realize signals required for carrier recovery, symbol timing recovery, frame synchronization, and channel estimation, by using a common training signal sequence.

As a training signal sequence such as that mentioned above, channel estimation could conceivably be performed using a plurality of pilot signals arranged in a burst. However, when performing channel estimation using pilot signals arranged in a burst, the carrier frequency estimation precision deteriorates due to frequency slips (a phenomenon where it becomes impossible to distinguish between phase fluctuation caused by noise and phase fluctuation caused by modulation) in regions of low CNR, and carrier frequency miss-detection increase.

When the burst is a short packet, carrier frequency estimation precise sometimes deteriorates as the number of pilot signals in the burst decreases. This leads to a problem of deterioration in the wireless transmission bit error rate.

Having been realized in view of the above circumstances, it is yet another object of the invention to provide a wireless receiving apparatus, a wireless reception method, and a wireless communication system that can increase the precision of a burst synchronization. For example, when performing a carrier frequency estimation after receiving a wireless burst which a plurality of pilot signals are arranged in, it is an object of the invention to provide a wireless receiving apparatus and a wireless reception method that can increase the carrier frequency estimation precision by suppressing a miss-detection rate of carrier frequencies caused by frequency slips.

It is moreover object of the present invention to provide a wireless receiving apparatus, a wireless reception method, and a wireless communication system that realize the good performances without deteriorating the wireless transmission bit error rate even if the short packet is used.

Means of Solving the Problems

Since the invention has been realized in view of the above circumstances, a wireless transmitting apparatus includes symbol generating means that converts a transmission data bit stream to a data symbol sequence, training signal generating means that generates a training signal of information for carrier recovery, information for clock recovery, and information for frame synchronization, multiplex means that multiplexes the training signal and the data symbol sequence, and generates a transmission burst signal, and digital-to-analog conversion means that performs a digital-to-analog conversion of the transmission burst signal, a training signal generated by the training signal generating means being inserted into a transmission burst as a pilot signal at fixed symbol intervals by the multiplex means.

In the wireless transmitting apparatus of the invention, the training signal generating means includes synchronization code sequence generating means that generates a synchronization code sequence signal for frame synchronization, differential encoding means that differentially encodes the synchronization code sequence signal, and interleave means that interleaves the differentially encoded synchronization code sequence signal.

In the wireless transmitting apparatus of the invention, the synchronization code sequence generating means generates and outputs a synchronization code sequence matrix having Np rows (Np=number of symbols in one pilot signal inserted to burst signal) and Nq−1 columns (Nq=number of pilot signals inserted to burst signal), the differential encoding means generates a differentially encoded matrix by differentially encoding the synchronization code sequence matrix in the row direction with respect to an initial burst vector, and the interleave means rearranges the differentially encoded matrix such that an element at row m and column n corresponds to a pilot pattern of symbol m of an nth pilot signal.

The invention provides a wireless receiving apparatus that performs wireless communication connection with a wireless transmitting apparatus which includes symbol generating means that converts a transmission data bit stream to a data symbol sequence, training signal generating means that generates a training signal including information for carrier recovery, information for clock recovery, and information for frame synchronization, multiplex means that multiplexes the training signal and the data symbol sequence, and generates a transmission burst signal, and digital-to-analog conversion means that performs a digital-to-analog conversion of the transmission burst signal, a training signal generated by the training signal generating means being inserted into a transmission burst as a pilot signal at fixed symbol intervals by the multiplex means; the wireless receiving apparatus including receiving means that receives a wireless burst signal transmitted from the wireless transmitting apparatus, analog/digital conversion means that performs an analog/digital conversion of the received burst signal, symbol timing synchronization means that performs symbol timing synchronization using the received burst signal that was subject to analog/digital conversion, frame detection means that detects a frame position from the received burst signal for which symbol timing was established, and extracts a pilot signal, frame synchronization means that performs frame synchronization using data relating to the detected frame position, carrier frequency estimation means that performs a carrier frequency estimation using pilot signal data extracted by the frame detection means, carrier frequency correction means that performs carrier frequency correction of the received burst signal for which symbol timing was established, using the estimated carrier frequency, channel estimation means that estimates channel distortion based on the frequency-corrected received burst signal, and outputs information related to channel distortion, channel compensation means that corrects channel distortion of the frequency-corrected received burst signal, using the information related to channel distortion, and symbol decision means that converts a data symbol sequence of the channel-compensated received burst signal to a received data bit stream.

In the wireless receiving apparatus of the invention, the frame detection means detects the frame position by including synchronization encoding sequence generating means that generates a synchronization code sequence signal for frame synchronization, differential encoding means that differentially encodes the synchronization code sequence signal, interleave means that interleaves the differentially encoded synchronization code sequence signal, training signal generating means that generates a training signal including information for carrier recovery, information for clock recovery, and information for frame synchronization, pilot signal extraction means that extracts a pilot signal from a received burst signal for which symbol timing was established, and correlation value calculation means that calculates a correlation value using a pilot signal extracted from the received burst signal and a pilot signal sequence generated by the training signal generating means.

In the wireless receiving apparatus of the invention, the channel frequency estimation means estimates the carrier frequency by detecting the phase of an autocorrelation-summation output by autocorrelation-summation calculation means that calculates an autocorrelation value using a pilot signal extracted from the received burst signal and a pilot signal sequence generated by the training signal generating means.

In the wireless receiving apparatus of the invention, the frame detection means includes synchronization encoding sequence generating means that generates a synchronization code sequence signal for frame synchronization, differential encoding means that differentially encodes the synchronization code sequence signal, and interleave means that interleaves the differentially encoded synchronization code sequence signal, training signal generating means that generates a training signal including information for carrier recovery, information for clock recovery, and information for frame synchronization, pilot signal extraction means that extracts a pilot signal from a received burst signal for which symbol timing was established, and correlation value calculation means that calculates a correlation value using a pilot signal extracted from the received burst signal and a pilot signal sequence generated by the training signal generating means, the autocorrelation-summation calculation means calculating a summation of the autocorrelation values using correlation values calculated by the correlation value calculation means.

In the wireless receiving apparatus of the invention, the carrier frequency estimation means further including frequency offset addition/subtraction means that generate and output a plurality of estimated carrier frequencies by adding/subtracting a plurality of frequency offset values to a precise estimation result, and the carrier frequency correction means generates a plurality of frequency-corrected received burst signals by performing carrier frequency correction to a received burst signal using the plurality of estimated carrier frequencies generated by the frequency offset addition/subtraction means.

The wireless receiving apparatus of the invention further includes maximum likelihood decision means that performs a maximum likelihood decision with respect to the plurality of frequency-corrected received burst signals, and determines one of them, the channel estimation means and the channel compensation means executing channel estimation and channel compensation with respect to the determined frequency-corrected received burst signal, and symbol decision means that performs a symbol decision with respect to the received burst signal whose channel was corrected by the channel compensation means.

In the wireless receiving apparatus of the invention, the channel estimation means and the channel compensation means execute channel estimation and channel compensation with respect to each of the frequency-corrected received burst signals, the invention further including maximum likelihood decision means that performs a maximum likelihood decision with respect to the plurality of channel-compensated received burst signals, and selects one frequency-corrected received burst signal, and symbol decision means that performs a symbol decision with respect to the received burst signal selected by the maximum likelihood decision means.

In the wireless receiving apparatus of the invention, the channel estimation means and the channel compensation means execute channel estimation and channel compensation with respect to each of the frequency-corrected received burst signals, and the invention further includes symbol decision means that performs a symbol decision with respect to the plurality of received burst signals whose channels were corrected by the channel compensation means, and error detection and selection means that performs error detection and selection with respect to the plurality of received burst data signals that have been subjected to symbol decision, and determines a desired received burst data signal.

In the wireless receiving apparatus of the invention, the channel estimation means and the channel compensation means execute channel estimation and channel compensation with respect to each of the frequency-corrected received burst signals, and the invention further includes symbol decision means that performs a symbol decision with respect to the plurality of channel-compensated received burst signals, error detection and selection means that performs error detection and selection with respect to the plurality of received burst data signals that have been subjected to symbol decision, and maximum likelihood decision means that, when there are a plurality of received burst signals in which no errors were detected by the error detection and selection means, performs a maximum likelihood decision with respect to the plurality of channel-compensated received burst signals in which no errors were detected, and selects one frequency-corrected received burst signal.

In the wireless receiving apparatus of the invention, in the frequency offset addition/subtraction means, the plurality of frequency offset values that are added/subtracted to/from the precise estimated value estimated by the channel frequency estimation means, are integral multiples of a reciprocal of the pilot signal insertion cycle in the received burst signal.

The wireless receiving apparatus of the invention further includes pulse-shaping filtering means for removing inter-symbol interference, pulse-shaping filtering being performed with respect to the received burst signal that has been subjected to symbol timing synchronization, and a received burst signal that has been subjected to pulse-shaping filtering being used in a rough estimation by the carrier frequency estimation means and in the carrier frequency correction means.

The wireless receiving apparatus of the invention further includes first pulse-shaping filtering means for removing inter-symbol interference, the first pulse-shaping filtering means performing pulse-shaping filtering to the received burst signal that was subjected to symbol timing synchronization, a received burst signal that has passed first pulse-shaping filtering means being used in a rough estimation made by the carrier frequency estimation means, the carrier frequency correction means performing carrier frequency correction with respect to a received burst signal that does not pass the first pulse-shaping filtering means, and further including second pulse-shaping filtering means that performs pulse-shaping filtering to remove inter-symbol interference with respect to a received burst signal whose carrier frequency has been corrected by the carrier frequency correction means, a received burst signal that has been subjected to pulse-shaping filtering by the second pulse-shaping filtering means being used in the channel estimation means and channel compensation means.

In the wireless receiving apparatus of the invention, the channel estimation means performs channel estimation processes in time-division with respect to a plurality of frequency-corrected received burst signals.

In the wireless receiving apparatus of the invention, the channel compensation means performs channel compensation processes with respect to a plurality of frequency-corrected received burst signals.

The wireless receiving apparatus of the invention further includes a plurality of the channel estimation means, which performs parallel processes of channel estimation with respect to a plurality of frequency-corrected received burst signals.

The wireless receiving apparatus of the invention further includes a plurality of the channel compensation means, which performs parallel processes of channel compensation with respect to a plurality of frequency-corrected received burst signals.

In the wireless receiving apparatus of the invention, the channel estimation means includes pilot signal extraction means that extracts a pilot signal from a frequency-corrected received burst signal, training signal generating means that generates a pilot signal containing recovery, information for clock recovery, and information for frame synchronization, pilot part channel estimation means that uses a pilot signal extracted from the received signal and a pilot signal generated by the training signal generating means to perform channel distortion estimation at a pilot signal position, and data part channel interpolation estimation means that uses information related to channel distortion of the pilot signal position to perform an interpolation estimation of channel distortion in a data signal part, and outputs information related to channel distortion for an entire received burst.

In the wireless receiving apparatus of the invention, the channel interpolation estimation means linearly interpolates on a constellation plane and outputs, as information related to channel distortion of the data signal part, information related to channel distortion of pilots at both ends of the data part at each symbol position.

In the wireless receiving apparatus of the invention, the channel interpolation estimation means simply averages on a constellation plane and outputs, as information related to channel distortion of the data signal part, information related to channel distortion at a plurality of pilot signal positions near a data part.

A wireless transmission method of the invention includes a symbol generating process of converting a transmission data bit stream to a data symbol sequence, a training signal generating process of generating a training signal including information for carrier recovery, information for clock recovery, and information for frame synchronization, a multiplex process of multiplexing the training signal and the data symbol sequence, and generating a transmission burst signal, and a digital-to-analog conversion process of performing a digital-to-analog conversion of the transmission burst signal, a training signal generated in the training signal generating process being inserted into a transmission burst as a pilot signal at fixed symbol intervals by the multiplex process.

In the wireless transmission method of the invention, the training signal generating process includes a synchronization code sequence generating process of generating a synchronization code sequence signal for frame synchronization, a differential encoding process of differentially encoding the synchronization code sequence signal, and an interleave process of interleaves the differentially encoded synchronization code sequence signal.

In the wireless transmission method of the invention, in the synchronization code sequence generating process, a synchronization code sequence matrix having Np rows (Np=number of symbols in one pilot signal inserted to burst signal) and Nq−1 columns (Nq=number of pilot signals inserted to burst signal) is generated and output, in the differential encoding process, a differentially encoded matrix is generated by differentially encoding the synchronization code sequence matrix in the row direction with respect to an initial burst vector, and, in the interleave process, the differentially encoded matrix is rearranged such that an element at row m and column n corresponds to a pilot pattern of symbol m of an nth pilot signal.

The invention also provides a wireless reception method in a wireless receiving apparatus which performs wireless communication connection with a wireless transmitting apparatus including symbol generating means that converts a transmission data bit stream to a data symbol sequence, training signal generating means that generates a training signal including information for carrier recovery, information for clock recovery, and information for frame synchronization, multiplex means that multiplexes the training signal and the data symbol sequence, and generates a transmission burst signal, and digital-to-analog conversion means that performs a digital-to-analog conversion of the transmission burst signal, a training signal generated by the training signal generating means being inserted into a transmission burst as a pilot signal at fixed symbol intervals by the multiplex means; the wireless reception method including a receiving process of receiving a wireless burst signal transmitted from the wireless transmitting apparatus, an analog/digital conversion process of performing an analog/digital conversion of the received burst signal, a symbol timing synchronization process of performing symbol timing synchronization using the received burst signal that was subject to analog/digital conversion, a frame detection process of detecting a frame position from the received burst signal for which symbol timing was established, and extracting a pilot signal, a frame synchronization process of performing frame synchronization using data relating to the detected frame position, a carrier frequency estimation process of performing a carrier frequency estimation using pilot signal data extracted in the frame detection process, a carrier frequency correction process of performing carrier frequency correction of the received burst signal for which symbol timing was established, using the estimated carrier frequency, a channel estimation process of estimating channel distortion based on the frequency-corrected received burst signal, and outputs information related to channel distortion, a channel compensation process of correcting channel distortion of the frequency-corrected received burst signal, using the information related to channel distortion, and a symbol decision of converting a data symbol sequence of the channel-compensated received burst signal to a received data bit stream.

In the wireless reception method of the invention, in the frame detection process, a frame is detected by performing a synchronization encoding sequence generating process of generating a synchronization code sequence signal for frame synchronization, differential encoding process of differentially encodes the synchronization code sequence signal, an interleave process of interleaving the differentially encoded synchronization code sequence signal, a training signal generating process of generating a training signal including information for carrier recovery, information for clock recovery, and information for frame synchronization, a pilot signal extraction process of extracting a pilot signal from a received burst signal for which symbol timing was established, and a correlation value calculation process of calculating a correlation value using a pilot signal extracted from the received burst signal and a pilot signal sequence generated in the training signal generating process.

In the wireless reception method of the invention, in the channel frequency estimation process, the carrier frequency is estimated by detecting the phase of an autocorrelation-summation output in an autocorrelation-summation calculation process of calculating an autocorrelation value using a pilot signal extracted from the received burst signal and a pilot signal sequence generated in the training signal generating process.

In the wireless reception method of the invention, the frame detection process includes a synchronization encoding sequence generating process of generating a synchronization code sequence signal for frame synchronization, a differential encoding process of differentially encoding the synchronization code sequence signal, an interleave process of interleaving the differentially encoded synchronization code sequence signal, a training signal generating process of generating a training signal including information for carrier recovery, information for clock recovery, and information for frame synchronization, a pilot signal extraction process of extracting a pilot signal from a received burst signal for which symbol timing was established, and a correlation value calculation process of calculates a correlation value using a pilot signal extracted from the received burst signal and a pilot signal sequence generated in the training signal generating process, in the autocorrelation-summation calculation process, a summation of the autocorrelation values being calculated using correlation values calculated in the correlation value calculation process.

In the wireless reception method of the invention, the carrier frequency estimation process further includes a frequency offset addition/subtraction process of generating and outputting a plurality of estimated carrier frequencies by adding/subtracting a plurality of frequency offset values to a precise estimation result, and in the carrier frequency correction process, a plurality of frequency-corrected received burst signals are generated by performing carrier frequency correction to a received burst signal using the plurality of estimated carrier frequencies generated in the frequency offset addition/subtraction process.

The wireless reception method of the invention further includes a maximum likelihood decision process of performing a maximum likelihood decision with respect to the plurality of frequency-corrected received burst signals, and determining one of them, in the channel estimation process and the channel compensation process, channel estimation and channel compensation being performed with respect to the determined frequency-corrected received burst signal, and a symbol decision process of performing a symbol decision with respect to the received burst signal whose channel was corrected in the channel compensation process.

In the wireless reception method of the invention, in the channel estimation process and the channel compensation process, channel estimation and channel compensation are performed with respect to each of the frequency-corrected received burst signals, the method further including a maximum likelihood decision process of performing a maximum likelihood decision with respect to the plurality of channel-compensated received burst signals, and selecting one frequency-corrected received burst signal, and a symbol decision process of performing a symbol decision with respect to the received burst signal selected in the maximum likelihood decision process.

In the wireless reception method of the invention, in the channel estimation process and the channel compensation process, channel estimation and channel compensation are performed with respect to each of the frequency-corrected received burst signals, the method further including a symbol decision process of performing a symbol decision with respect to the plurality of received burst signals whose channels were corrected in the channel compensation process, and an error detection and selection process of performing error detection and selection with respect to the plurality of received burst data signals that have been subjected to symbol decision, and determining a desired received burst data signal.

In the wireless reception method of the invention, in the channel estimation process and the channel compensation process, channel estimation and channel compensation are performed with respect to each of the frequency-corrected received burst signals, the method further including a symbol decision process of performing a symbol decision with respect to the plurality of channel-compensated received burst signals, an error detection and selection process of performing error detection and selection with respect to the plurality of received burst data signals that have been subjected to symbol decision, and a maximum likelihood decision process of, when there are a plurality of received burst signals in which no errors were detected in the error detection and selection process, performing a maximum likelihood decision with respect to the plurality of channel-compensated received burst signals in which no errors were detected, and selecting one frequency-corrected received burst signal.

In the wireless reception method of the invention, in the frequency offset addition/subtraction process, the plurality of frequency offset values that are added/subtracted to/from the precise estimated value estimated in the channel frequency estimation process, are integral multiples of a reciprocal of the pilot signal insertion-cycle in the received burst signal The wireless reception method of the invention further includes a puls pulse-shaping e-shaping filtering process for removing inter-symbol interference, pulse-shaping filtering being performed with respect to the received burst signal that has been subjected to symbol timing synchronization, and a received burst signal that has been subjected to pulse-shaping filtering being used in a rough estimation in the carrier frequency estimation process and in the carrier frequency correction process.

The wireless reception method of the invention further includes a first pulse-shaping filtering process for removing inter-symbol interference, and, in the first pulse-shaping filtering process, pulse-shaping filtering is performed to the received burst signal that was subjected to symbol timing synchronization, a received burst signal that has passed the first pulse-shaping filtering process is used in a rough estimation made in the carrier frequency estimation process, in the carrier frequency correction process, carrier frequency correction is performed with respect to a received burst signal that does not pass the first pulse-shaping filtering process, the method further including a second pulse-shaping filtering process of performing pulse-shaping filtering to remove inter-symbol interference with respect to a received burst signal whose carrier frequency has been corrected in the carrier frequency correction process, a received burst signal that has been subjected to pulse-shaping filtering in the second pulse-shaping filtering process being used in the channel estimation process and channel compensation process.

In the wireless reception method of the invention, in the channel estimation process, channel estimation processes are performed in time-division with respect to a plurality of frequency-corrected received burst signals.

In the wireless reception method of the invention, in the channel compensation process, channel compensation processes are performed with respect to a plurality of frequency-corrected received burst signals.

The wireless reception method of the invention further includes a plurality of the channel estimation process, which are performed in parallel with respect to a plurality of frequency-corrected received burst signals.

The wireless reception method of the invention further includes a plurality of the channel compensation processes, which are performed in parallel with respect to a plurality of frequency-corrected received burst signals.

In wireless reception method of the invention, the channel estimation process includes a pilot signal extraction process of extracting a pilot signal from a frequency-corrected received burst signal, a training signal generating process of generating a pilot signal containing information for carrier recovery, information for clock recovery, and information for frame synchronization, a pilot part channel estimation process of using a pilot signal extracted from the received signal and a pilot signal generated in the training signal generating process to perform channel distortion estimation at a pilot signal position, and a data part channel interpolation estimation process of using information related to channel distortion of the pilot signal position to perform an interpolation estimation of channel distortion in a data signal part, and outputting information related to channel distortion for an entire received burst.

In the wireless reception method of the invention, in the channel interpolation estimation process, information related to channel distortion of pilots at both ends of the data part at each symbol position is linearly interpolated on a constellation plane and output as information related to channel distortion of the data signal part.

In the wireless reception method of the invention, in the channel interpolation estimation process, information related to channel distortion at a plurality of pilot signal positions near a data part is simply averaged on a constellation plane and output as information related to channel distortion of the data signal part.

The invention also provides a wireless communication system including a wireless receiving apparatus and a wireless transmitting apparatus, the wireless transmitting apparatus including symbol generating means that converts a transmission data bit stream to a data symbol sequence, training signal generating means that generates a training signal including information for carrier recovery, information for clock recovery, and information for frame synchronization, multiplex means that multiplexes the training signal and the data symbol sequence, and generates a transmission burst signal, and digital-to-analog conversion means that performs a digital-to-analog conversion of the transmission burst signal, a training signal generated by the training signal generating means being inserted into a transmission burst as a pilot signal at fixed symbol intervals by the multiplex means; the wireless transmitting apparatus including receiving means that receives a wireless burst signal transmitted from the wireless transmitting apparatus, analog/digital conversion means that performs an analog/digital conversion of the received burst signal, symbol timing synchronization means that performs symbol timing synchronization using the received burst signal that was subject to analog/digital conversion, frame detection means that detects a frame position from the received burst signal for which symbol timing was established, and extracts a pilot signal, frame synchronization means that performs frame synchronization using information relating to the detected frame position, carrier frequency estimation means that performs a carrier frequency estimation using pilot signal data extracted by the frame detection means, carrier frequency correction means that performs carrier frequency correction of the received burst signal for which symbol timing was established, using the estimated carrier frequency, channel estimation means that estimates channel distortion based on the frequency-corrected received burst signal, and outputs information related to channel distortion, channel compensation means that corrects channel distortion of the frequency-corrected received burst signal, using the information related to channel distortion, and symbol decision means that converts a data symbol sequence of the channel-compensated received burst signal to a received data bit stream.

The invention also provides a wireless communication method for a wireless communication system including a wireless receiving apparatus and a wireless transmitting apparatus, the wireless transmitting apparatus including a symbol generating process of converting a transmission data bit stream to a data symbol sequence, a training signal generating process of generating a training signal including information for carrier recovery, information for clock recovery, and information for frame synchronization, a multiplex process of multiplexing the training signal and the data symbol sequence, and generating a transmission burst signal, and digital-to-analog conversion process of performing a digital-to-analog conversion of the transmission burst signal, a training signal generated by the training signal generating means being inserted into a transmission burst as a pilot signal at fixed symbol intervals in the multiplex process; the wireless transmitting apparatus including a receiving process of receiving a wireless burst signal transmitted from the wireless transmitting apparatus, an analog/digital conversion process of performing an analog/digital conversion of the received burst signal, a symbol timing synchronization process of performing symbol timing synchronization using the received burst signal that was subject to analog/digital conversion, a frame detection process of detecting a frame position from the received burst signal for which symbol timing was established, and extracting a pilot signal, a frame synchronization process of performing frame synchronization using data relating to the detected frame position, a carrier frequency estimation process of performing a carrier frequency estimation using pilot signal data extracted in the frame detection process, a carrier frequency correction process of performing carrier frequency correction of the received burst signal for which symbol timing was established, using the estimated carrier frequency, a channel estimation process of estimating channel distortion based on the frequency-corrected received burst signal, and outputting information related to channel distortion, a channel compensation process of correcting channel distortion of the frequency-corrected received burst signal, using the information related to channel distortion, and a symbol decision of converting a data symbol sequence of the channel-compensated received burst signal to a received data bit stream.

EFFECTS OF THE INVENTION

The wireless transmitting apparatus and the wireless receiving apparatus can realize a frame configuration shown in FIG. 17 or 18. The pilot signals shown in FIG. 17 or FIG. 18 are arranged at a constant interval and synchronization data required for carrier recovery, symbol timing recovery, frame synchronization, and channel distortion compensation are contained as a common training signal. In comparison with the frame configuration used in the conventional wireless transmitting apparatus and wireless receiving apparatus shown in FIG. 28, it is not necessary to separately arrange data required for carrier recovery, symbol timing recovery, and frame synchronization in the frame. Therefore, the transmission efficiency (frame efficiency) can be increased even when the communication traffic of short packets is predominant.

Since carrier frequency estimation of the invention uses pilot signals, which are known signal sequence, arranged at equal intervals in a burst, highly precise carrier frequency synchronization performances can be obtained even with a short packet length and in regions of low CNR. In conventional wireless transmitting apparatuses and receiving apparatuses, code sequence data is embedded in adjacent symbols in the burst. Therefore, since a peak must be detected by making a comparison of cross-correlation values for a random signal sequence while deviating the frame position, the sequence length must have a certain degree of length. In contrast in the wireless receiving apparatus of the invention, frame synchronization is performed using the orthogonality of a plurality of synchronization code sequences generated by the pilot signal generating circuit. Also, a code sequence that is differentially encoded in pilot insertion internal units, instead of adjacent symbols, is used. Therefore in the invention, in the range of pilot overlap generated when a frame is deviated forwards or rearwards, the code patterns intersect and the correlation values are noticeably reduced, achieving highly precise frame detection even with a short synchronization code sequence.

The wireless receiving apparatus of the invention performs frame detection by calculating a cross-correlation value for a synchronization code sequence, where, since the synchronization code sequence is differentially encoded in pilot insertion interval units, the calculated cross-correlation value is the summation of the autocorrelation values at each pilot insertion interval. By using this, the amount of phase rotation for one pilot insertion interval, i.e. the carrier frequency offset, can be estimated. That is, frame synchronization and carrier frequency correction can be performed simultaneously in the same signal process.

When demodulating a burst signal in which a plurality of pilot signals arranged, the invention performs a rough estimation by determining an autocorrelation-summation between symbol signals in the same pilot signal, and then performs a precise estimation by determining autocorrelation-summation between symbols of a plurality of pilot signals, thereby making the carrier frequency estimation more precise. In addition, in a demodulation, a plurality of frequency candidates are generated by adding/subtracting a plurality of frequency offsets to the result of the precise estimation, required channel estimation and coherent detection (channel compensation) are performed for each of those candidates in a block demodulation, a maximum determination is performed with respect to the frequency-corrected signal, and an optimal signal is determined, thereby achieving more accurate carrier frequency correction than when using a single carrier frequency. Conceivable apparatus configurations in this case include one that processes a plurality of signals sequentially, and one that processes simultaneously them by providing a plurality of apparatuses in parallel.

In the wireless transmitting apparatus and the wireless receiving apparatus of the invention, the pilot signals are dispersedly arranged in the data. Therefore, a highly precise channel estimation can be made for each pilot signal, and channel fluctuation tracking can be enhanced.

BRIEF DESCRIPTION OF THE DRAWINGS

FIG. 13 is a diagram of parameter comparison conditions in a first example of the invention.

FIG. 24 is a diagram of parameter comparison conditions in a second example.

FIG. 33 is a diagram of parameter comparison conditions in a third example.

FIG. 35 is a diagram of parameter conditions in a fourth example.

FIG. 43 is a diagram of apparatus conditions and measurement conditions in a test of a fifth example.

REFERENCE NUMERALS

Figure 1:
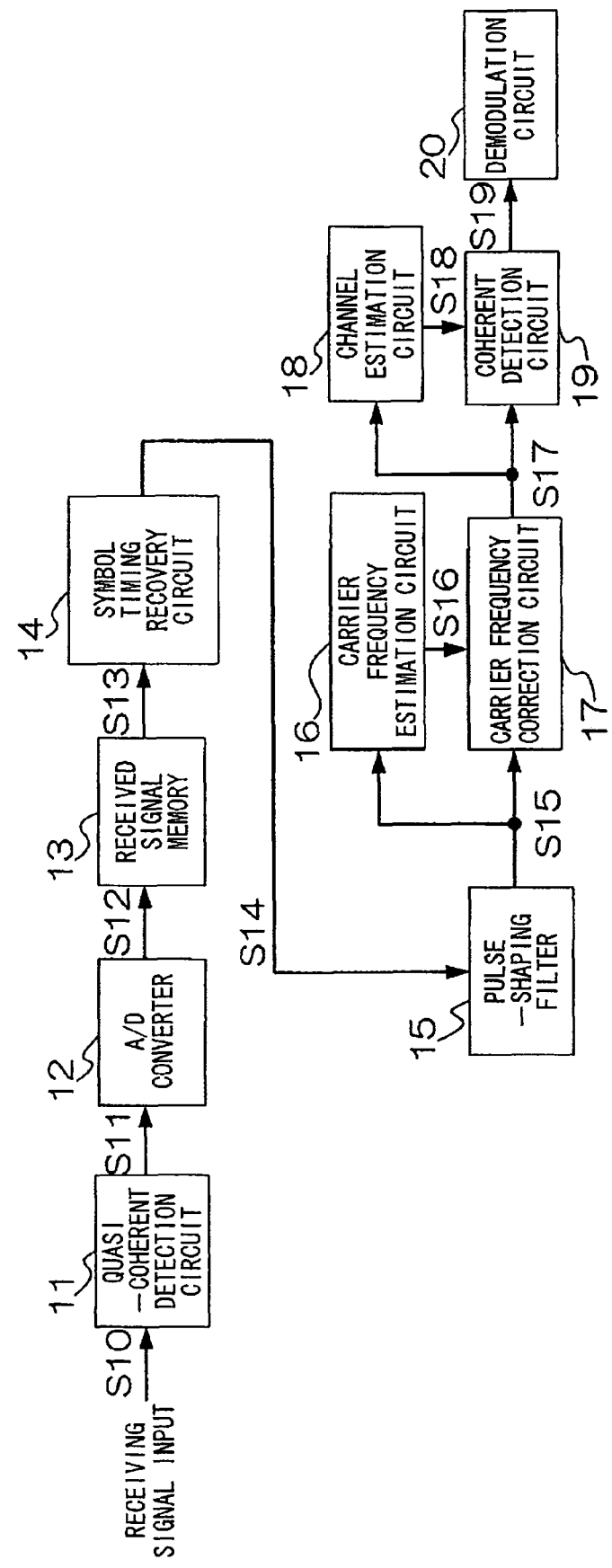
FIG. 1 is a block diagram of a first embodiment of a wireless receiving apparatus of the invention.

11 Quasi-coherent detection circuit
12 A/D converter
13 Received signal memory
14 Symbol timing recovery circuit
15 Pulse-shaping filter
16 Carrier frequency estimation circuit
17 Carrier frequency correction circuit
18 Channel estimation circuit
19 Coherent detection circuit
20 Demodulation circuit
21 Frequency offset addition/subtraction circuit
22, 30 Carrier frequency correction circuit
23, 32, 41 Channel estimation circuit
24, 33, 42 Coherent detection circuit
25, 34, 46 Maximum likelihood decision circuit
40 Maximum likelihood decision circuit (corresponding to a plurality of received bursts)
43, 44 Demodulation circuit (corresponding to a plurality of received bursts)
45 Error detection selection determination circuit
101, 301 Symbol generating circuit
102 Preamble generating circuit
103, 303 Multiplexing circuit
104, 304 D/A conversion circuit
201, 401 A/D conversion circuit
202 Carrier recovery circuit
203, 404 Symbol timing recovery circuit
204 Channel estimation circuit
205 Channel compensation circuit
206, 502 Symbol decision circuit
207, 405 Frame detection circuit
208, 407 Frame synchronization circuit
302, 702 Pilot generating circuit
402 Quasi-coherent detection circuit
403 Received signal memory
408 Carrier frequency interpolation circuit
409 Carrier frequency correction circuit
500 Channel estimation circuit
501 Channel compensation circuit
601 Synchronization code sequence generating circuit
602 Differential encoding circuit
603 Interleaver
701 Pilot extraction circuit
703 Autocorrelation-summation calculation circuit
801 Pilot extraction circuit
802 Pilot signal generating circuit
803 Pilot part channel estimation circuit
804 Data part channel interpolation estimation circuit

BEST MODES FOR CARRYING OUT THE INVENTION

Embodiments of the invention will be explained with reference to the drawings. FIG. 1 is a block diagram of an example configuration of a first embodiment of a wireless receiving apparatus according to the invention. A wireless receiving apparatus shown in FIG. 1 includes a quasi-coherent detection circuit 11, an A/D converter 12, a received signal memory 13, a symbol timing recovery circuit 14, a pulse-shaping filter 15, a carrier frequency estimation circuit 16, a carrier frequency correction circuit 17, a channel estimation circuit 18, a coherent detection circuit 19, and a demodulation circuit 20.

The category-determining unit 111 uses a local oscillator of the receiver itself to perform quasi-quadrature coherent detection of an input received burst signal. The A/D converter 12 converts an analog detection signal (quasi-coherent detection signal) S11 output from the quasi-coherent detection circuit 11 to a digitally quantized digital signal S12. The received signal memory 13 block-stores all received signals S12 output from the element dividing insulating film 12 in each received burst.

The symbol timing recovery circuit 14 extracts and reproduces symbol timings from received signal data of some or all symbols contained in a received burst signal S13 stored in the received signal memory 13, and synchronizes the symbol timings. The received burst signals S13 stored in the received signal memory 13 are input to the symbol timing recovery circuit 14, their symbol decision constellations are determined using some or all of the received burst signal S13, and are output as a symbol timing-synchronized received burst signal S14.

To the received burst signal S14 whose symbol timing is synchronized by the symbol timing recovery circuit 14, the pulse-shaping filter 15 performs processes of removing inter-symbol interference and extracting desired received symbol data. The received burst signal S14 whose symbol timing is synchronized is input to the pulse-shaping filter 15, interference between adjacent symbols is removed, and a received burst signal S15 that is pulse-shaping-filtered in symbol units is output.

The carrier frequency estimation circuit 16 estimates the carrier frequency of a received signal based on received signal data of some or all symbols contained in the pulse-shaping-filtered received burst signal S15 output from the pulse-shaping filter 15. In this embodiment, when estimating the carrier frequency of a received burst signal, the carrier frequency estimation circuit 16 estimates the carrier frequency by performing a two-stage process of making a rough estimate using an autocorrelation-summation (autocorrelation function) between symbol signals of the same pilot signal, and then making a precise estimation using an autocorrelation-summation between symbol signals of plurality pilot signals (e.g. between adjacent pilot signals before and after it).

Figure 5:
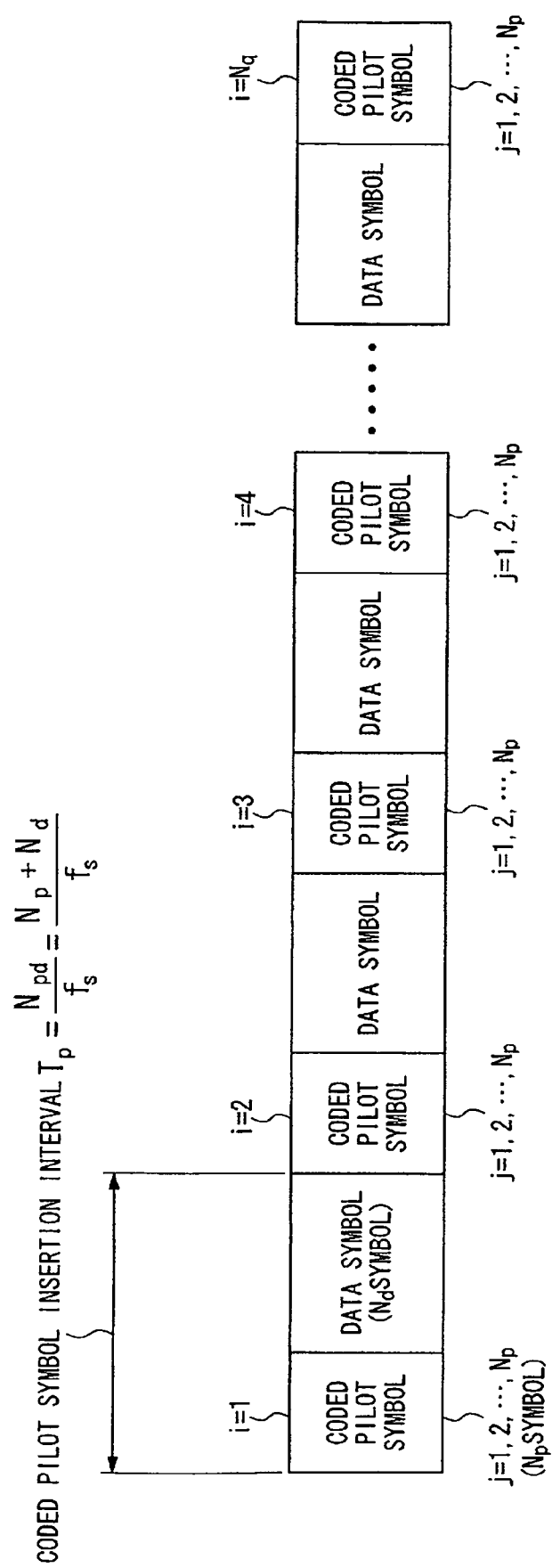
FIG. 5 is a diagram of a burst configuration used in the wireless receiving apparatus of the invention.

As for example shown in FIG. 5, the received burst used in this embodiment includes a plurality of pilot signals arranged in a data burst. That is, the burst signal is constituted with a given piece of data divided by a plurality of predetermined (pre-known) pilot signals. As shown in FIG. 5, if a pilot signal including a pre-known signal sequence is arranged at predetermined intervals such as fixed (equal) intervals in the data burst, when block-processing received signals, burst sync synchronization hronization such as symbol timing synchronization, carrier frequency estimation, and channel estimation can be performed easily and precisely by using the plurality of pilot signals arranged at equal intervals.

The two-stage estimation process of the carrier frequency estimation circuit 16 can be performed as follows. In a received burst such as that shown in FIG. 5, symbol j of pilot signal (pilot portion) number i is deemed $P_{ij}$ (i=1, ..., m, j= 1, ..., n). A rough estimate is determined from the autocorrelation-summation of symbols of the same pilot portion, i.e. symbols which have j in common. A precise estimate is determined from the autocorrelation-summation of symbols at corresponding positions in a plurality of different pilots, i.e. symbols which have j in common. The carrier frequency is roughly estimated using the autocorrelation-summation of symbol signals in the same pilot signal. Although the precision of the frequency estimation is poor, frequency slip is unlikely due to the wide frequency estimation range.

The carrier frequency is precisely estimated using the autocorrelation-summation of symbol signals in a plurality of pilot signals. While frequency slip is likely due to the narrow frequency estimation range, the frequency estimation precision is conversely high. By combining both, it is possible to estimate the carrier frequency over a wide frequency estimation range and with high precision.

The carrier frequency correction circuit 17 uses an estimated carrier frequency S16 estimated by the carrier frequency estimation circuit 16 to correct the frequency of the received burst signal output from the pulse-shaping filter 15. The pulse-shaping-filtered received burst signal S15 is input to the carrier frequency correction circuit 17, its carrier frequency is corrected by using the estimated carrier frequency S16 to perform complex multiplication or phase inversion, and a plurality of received burst signals S17 having corrected carrier frequencies are output.

From received signal data of some or all symbols contained in the carrier frequency correction circuit 17 output from the carrier frequency correction circuit 17, the channel estimation circuit 18 estimates channel distortion such as phase rotation and amplitude in symbol units, and outputs a channel distortion signal S18. The coherent detection circuit (channel compensation means) 19 uses channel data estimated by the channel estimation circuit 18 to perform quadrature coherent detection with respect to the received burst signals S17 output from the carrier frequency correction circuit 17. The demodulation circuit 20 demodulates the received burst signal using a received burst signal (coherent detection signal) S19 that has been subject to quadrature coherent detection output from the coherent detection circuit 19.

As described above, the wireless receiving apparatus shown in FIG. 1 block-stores a received burst signal using the received signal memory 13, and uses the stored signal to perform symbol timing recovery, carrier frequency estimation, channel estimation, and the like. Carrier frequency estimation can be made particularly efficient and precise by performing estimation processes in two-stages using the autocorrelation-summation of symbols of pilot signals.

Figure 2:
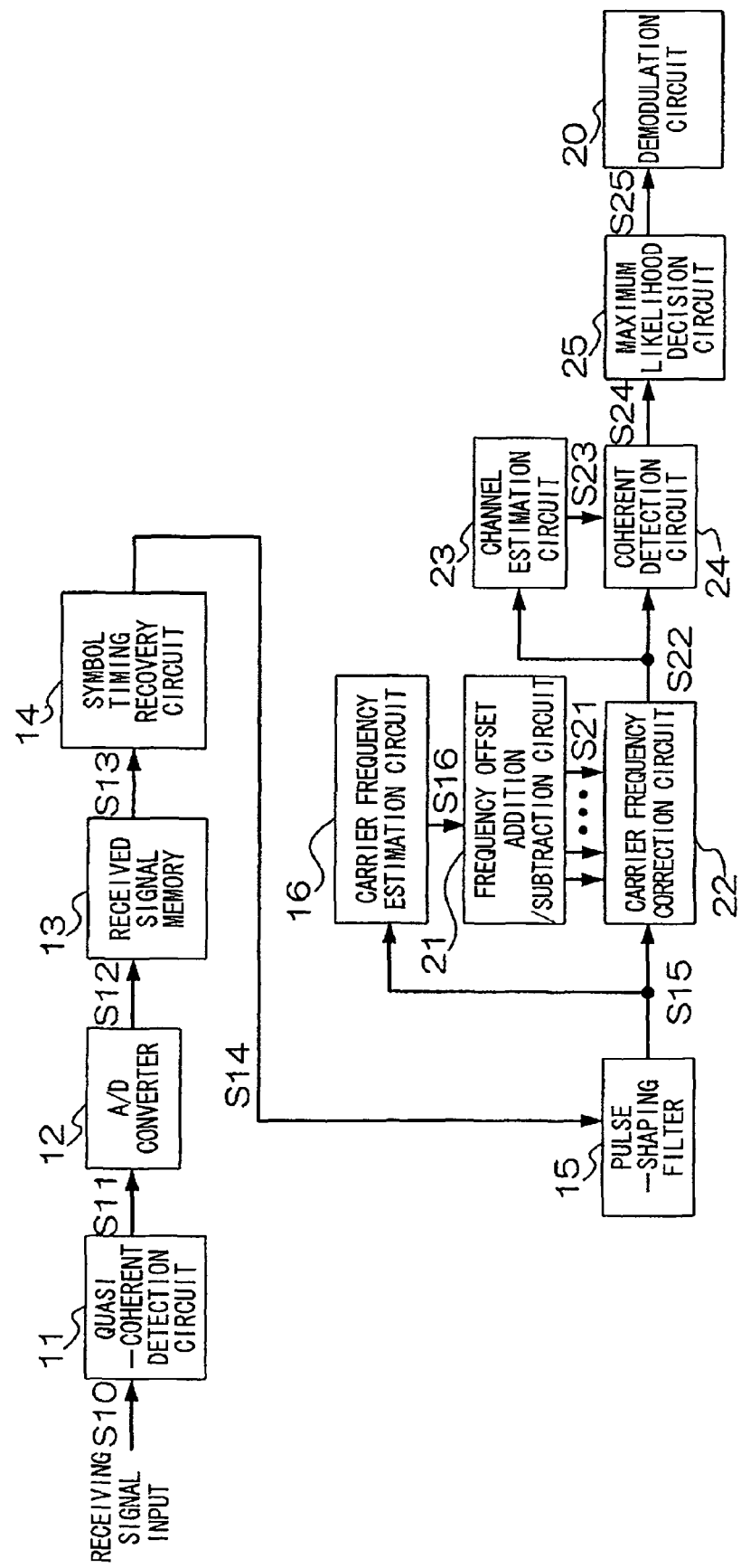
FIG. 2 is a block diagram of a second embodiment of the invention.

Subsequently, a second embodiment of the invention will be explained with reference to FIG. 2. Portions corresponding to those in FIG. 1 and FIGS. 4, 6, 7, 8, 9, and 10 described below are denoted by like reference numerals. In the embodiment of FIG. 2, a frequency offset addition/subtraction circuit 21 is added to the first embodiment of FIG. 1.

In FIG. 2, a received signal S10 is input to the quasi-coherent detection circuit 11, and output as a quasi-coherent detection signal S11. The quasi-coherent detection signal S11 is input to the A/D converter 12, and output as a digitally quantized received signal S12. The digitally quantized received signal S12 is stored for the entire received burst in the received signal memory 13. The received burst signal S13 stored in the received signal memory 13 is read when appropriate for synchronization and demodulation.

The received burst signal S13 stored in the received signal memory 13 is input to the symbol timing recovery circuit 14, the symbol decision constellation is determined using some or all of the received burst signal S13, and it is output as a symbol timing-synchronized received burst signal S14. The symbol-timing-synchronized received burst signal S14 is input to the pulse-shaping filter 15, interference between adjacent symbols is removed, and a received burst signal S15 in pulse-shaping-filtered symbol units is output.

The pulse-shaping-filtered received burst signal S15 is input to the carrier frequency estimation circuit 16, rough and precise estimations of the carrier frequency are performed using some or all of the signals of the received burst signal S15, and an estimated carrier frequency S16 is output. The estimated carrier frequency S16 is input to the frequency offset addition/subtraction circuit 21, which adds or subtracts a specific frequency offset calculated in consideration of the effect of frequency slips and the like caused when estimating the carrier frequency, and as a result, a plurality of estimated carrier frequencies S21 that the estimated carrier frequency has been added to are output.

The pulse-shaping-filtered received burst signal S15 is also input to a carrier frequency correction circuit 22, where carrier frequency correction is performed by complex multiplication or phase rotation using the plurality of estimated carrier frequencies S21, and a plurality of received burst signals S22, whose carrier frequencies have been corrected in accordance with each of the plurality of estimated carrier frequencies S21, are output.

In the first embodiment of the wireless receiving apparatus according to the invention described with reference to FIG. 1, when rough and precise estimations of the carrier frequency of the received burst signal have been made, the pull-in range is ±fs/(2Npd) {fs: modulation rate (symbols per second), Npd: pilot insertion interval (symbol)}. The pilot insertion cycle Tp at this time is Npd/fs (seconds). The larger the pilot signal insertion interval Npd, i.e. the pilot signal insertion cycle Tp, is at this time, the smaller the pull-in range of the carrier frequency estimation. As divergence of the rough estimation pull-in with respect to the range precise estimation pull-in range increases, frequency slip is more likely to occur. As a result, the miss-detection rate of the carrier frequency increases, and the wireless transmission error rate deteriorates.

In the second embodiment of the invention shown in FIG. 2, the carrier frequency correction circuit 22 uses, as a precise estimated value Δf of the carrier frequency offset, a plurality of estimated frequency candidates {Δf±u·fs Npd (u=1, 2, 3, ...)} in consideration of frequency slips output from the frequency offset addition/subtraction circuit 21, in performing carrier frequency correction. That is, in the frequency offset addition/subtraction circuit 21, the plurality of frequency offset values added/subtracted to/from the precise estimated value estimated by the carrier frequency estimation circuit 16 are integral multiples of the pilot signal insertion cycle in the received burst signal. With this configuration, even if a frequency slip occurs, there is a high possibility that the plurality of estimated frequency candidates will contain a suitable estimated carrier frequency.

The plurality of carrier frequency-corrected received burst signals S22 are input to a channel estimation circuit 23, which estimates channel distortion using some or all of the plurality of received burst signals S22, and outputs a channel distortion signal S23. The plurality of carrier frequency-corrected received burst signals S22 are input to a coherent detection circuit 24, which corrects channel distortion in symbol units of each signal using the channel estimation circuit 23, and outputs received burst signals S24 that have been subjected to quadrature coherent detection.

The plurality of received burst signals S24 that have been subjected to quadrature coherent detection are input to a maximum likelihood decision circuit 25, which performs a maximum determination estimation of a most appropriate received burst, from among the plurality of received burst signals that have been subjected to quadrature coherent detection using different estimated carrier frequencies, and outputs the most appropriate received burst signal S25. The most appropriate received burst signal S25 subjected to quadrature coherent detection that is selected by maximum determination is input to the demodulation circuit 20, where a desired received burst data signal is extracted and demodulated.

Whereas the first embodiment of the wireless receiving apparatus of the invention shown in FIG. 1 performs carrier frequency correction, channel estimation, and coherent detection to a single estimated carrier frequency, the second embodiment of the invention shown in FIG. 2 differs in that the frequency offset addition/subtraction circuit 21 adds/subtracts frequency offset to/from the estimated carrier frequency S16 output from the carrier frequency estimation circuit 16, outputs a plurality of estimated carrier frequencies S21, and simultaneously performs carrier frequency correction, channel estimation, and coherent detection in parallel, and lastly the maximum likelihood decision circuit 25 selects a most appropriate received burst.

Figure 3:
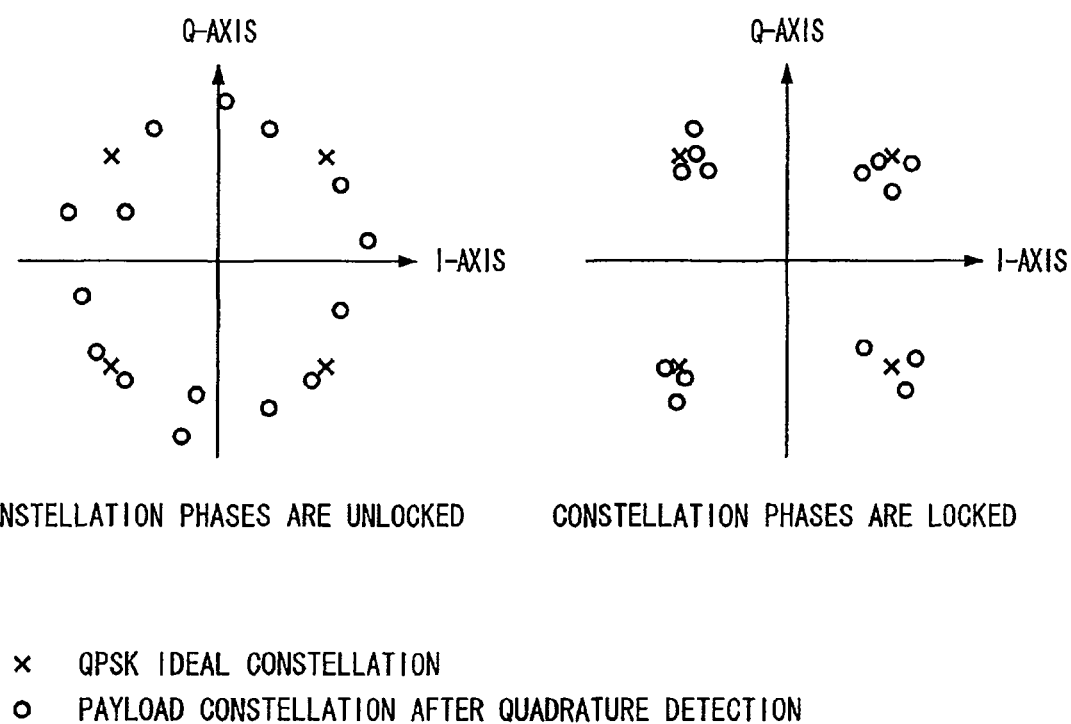
FIG. 3 is a first explanatory diagram of a maximum likelihood decision method using constellation positions.

A maximum likelihood decision method using constellation position in the maximum likelihood decision circuit 25 will be explained with reference to FIG. 3. This example uses QPSK modulation. When frequency correction is performed using an inappropriate estimated carrier frequency, the constellation phases are unlocked and the constellation arrangement becomes random, as shown on the left of FIG. 3. On the other hand, when frequency correction is performed using an appropriate estimated carrier frequency, the constellation phases are locked as shown on the right of FIG. 3, and are distributed near an ideal QPSK constellation position. That is, the summation of the distances from each constellation in the payload portion that has been subjected to quadrature coherent detection to the nearest QPSK ideal constellation position is calculated, and the carrier frequency candidate that obtains the shortest distance summation is selected. It is possible to use not only distance determination in an quadrature coordinate system such as Euclid distance and Manhattan distance, but also the summation of the phase difference with an ideal constellation position in a polar coordinate system.

In the configuration of FIG. 2, to select an appropriate estimated carrier frequency from the plurality of estimated carrier frequency candidates as described above, the maximum likelihood decision circuit 25 is used after the coherent detection circuit 24. When the carrier frequency is corrected using an inappropriate estimated carrier frequency, the constellation arrangement after coherent detection becomes random. By using this feature in configuring the maximum likelihood decision circuit 25, it becomes possible to select an appropriate estimated carrier frequency.

Figure 6:
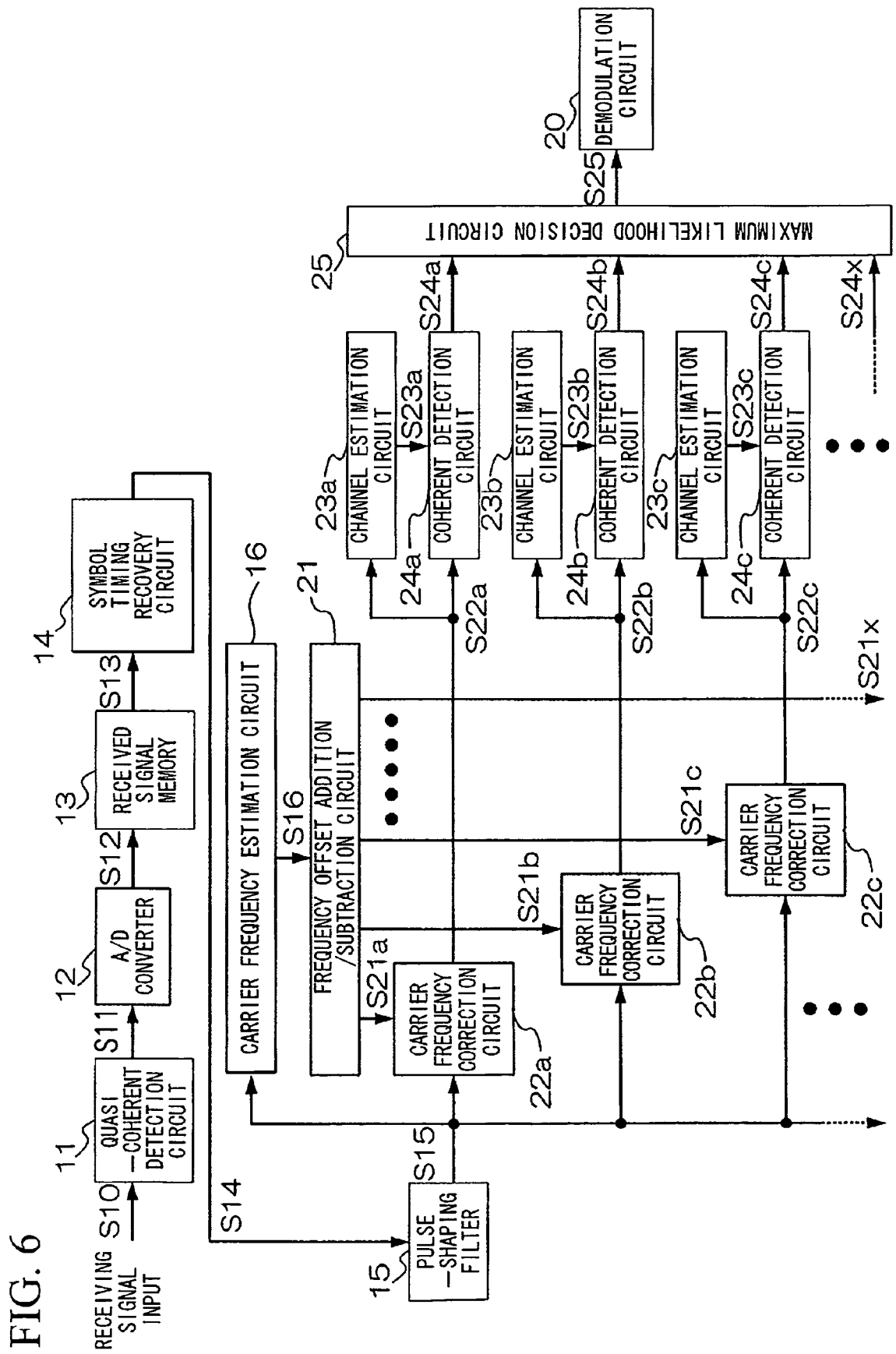
FIG. 6 is a block diagram of a third embodiment of the invention.

Subsequently, a third embodiment of the wireless receiving apparatus of the invention will be explained with reference to FIG. 3. Portions corresponding to those in FIG. 2 are denoted by like reference numerals. While the third embodiment shown in FIG. 6 performs processes which are exactly equivalent to the embodiment shown in FIG. 2, parallel processes of carrier frequency correction, channel estimation, and coherent detection are written separately. Carrier frequency correction circuits 22a, 22b, 22c, ... of FIG. 6 correspond to the carrier frequency correction circuit 22 of FIG. 2, channel estimation circuits 23a, 23b, 23c, ... of FIG. 6 correspond to the channel estimation circuit 23 of FIG. 2, and coherent detection circuits 24a, 24b, 24c, ... of FIG. 6 correspond to the coherent detection circuit 24 of FIG. 2. In FIG. 6, estimated carrier frequencies S21a, S21b, S21c, ..., and S21x, a plurality of carrier frequency-corrected received burst signals S22a, S22b, S22c, ..., S21x, channel distortion signals S23a, S23b, S23c, ..., and received burst signals S24a, S24b, S24c, ..., S24x respectively correspond to the estimated carrier frequencies S21, the received burst signals S22, the channel distortion signal S23, and the received burst signal S24 of FIG. 2.

In the configuration of an actual circuit, the same circuit can be used repeatedly in time-division as in the second embodiment of FIG. 2, or the circuits can be arranged in parallel as in the third embodiment of FIG. 6.

Figure 4:
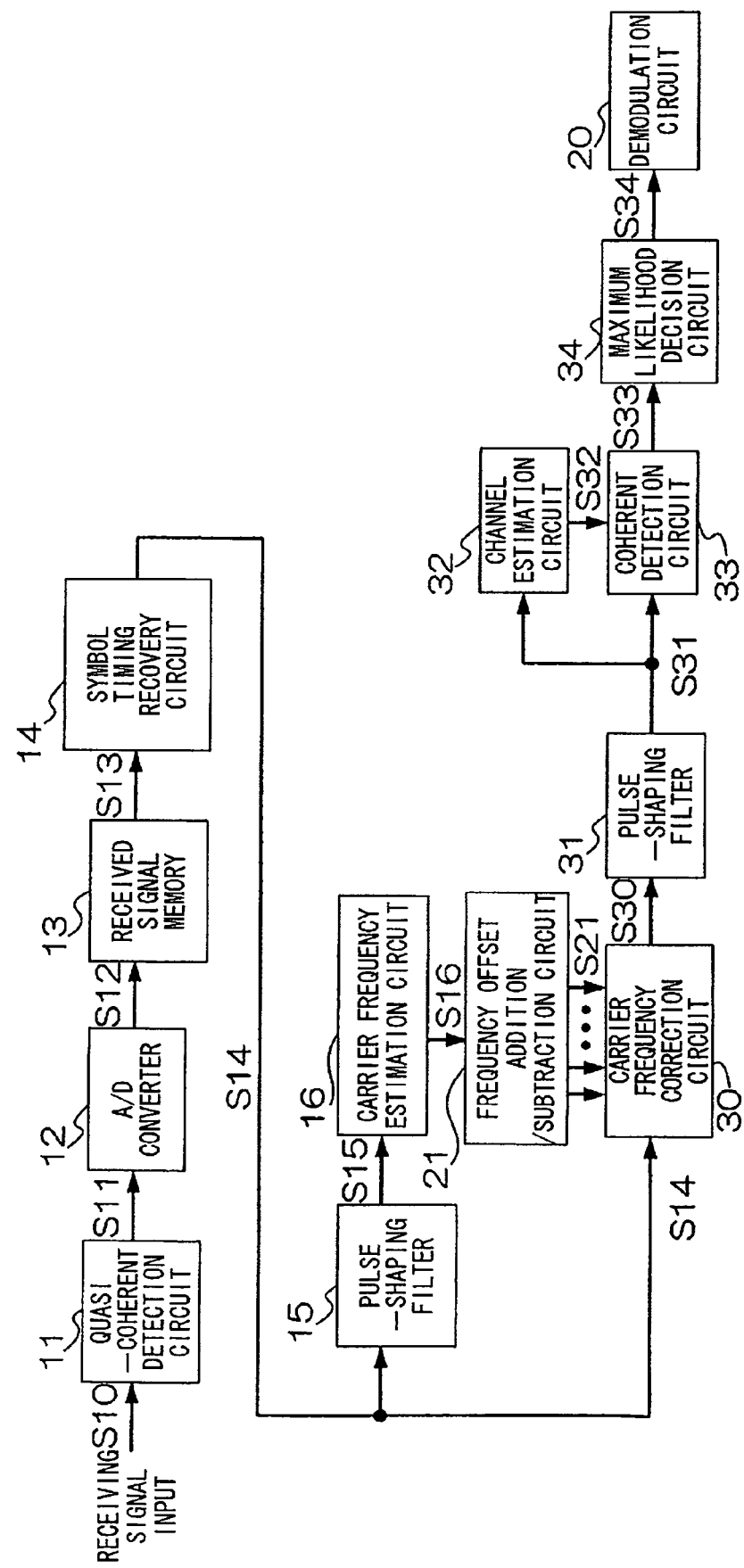
FIG. 4 is a block diagram of a fourth embodiment of the invention.

Subsequently, FIG. 4 is a fourth embodiment of the wireless receiving apparatus of the invention. Portions corresponding to those in FIGS. 1, 2, 6, 7, 8, 9, and 10 described below are denoted by like reference numerals. In FIG. 4, the received signal S10 is input to the quasi-coherent detection circuit 11 and output as a quasi-coherent detection signal S11. This quasi-coherent detection signal S11 is input to the A/D converter 12, and output as a digitally quantized received signal S12.

Digitally quantized received signals S12 across the entire received burst are stored in the received signal memory 13. A received burst signal S13 stored in the received signal memory 13 is read as appropriate to perform synchronization and demodulation. A received burst signal S13 stored in the received signal memory 13 is input to the symbol timing recovery circuit 14, a symbol decision constellation is determined using some or all of the signals of the received burst signal S13, and it is output as a symbol timing-synchronized received burst signal S14. The symbol timing-synchronized received burst signal S14 is input to a first pulse-shaping filter 15 (since this embodiment uses two pulse-shaping filters, they are distinguished as first and second pulse-shaping filters), interference between adjacent symbols is removed, and a received burst signal S15 that is pulse-shaping-filtered in symbol units is output.

The first pulse-shaping-filtered received burst signal S15 is input to the carrier frequency estimation circuit 16, rough and precise estimations of the carrier frequency are performed using some or all of the signals of the received burst signal S15, and an estimated carrier frequency S16 is output. The estimated carrier frequency S16 is input to the frequency offset addition/subtraction circuit 21, which adds or subtracts a specific frequency offset calculated in consideration of the effect of frequency slips and the like caused when estimating the carrier frequency, and as a result, a plurality of estimated carrier frequencies S21 that the estimated carrier frequency has been added to are output.

The pulse-shaping-filtered received burst signal S15 is also input to a carrier frequency correction circuit 22, where carrier frequency correction is performed by complex multiplication or phase rotation using the plurality of estimated carrier frequencies S21, and a plurality of received burst signals S22, whose carrier frequencies have been corrected in accordance with each of the plurality of estimated carrier frequencies S21, are output.

The symbol timing-synchronized received burst signal S14 is input to a carrier frequency correction circuit 30, which performs carrier frequency correction by complex multiplication or phase rotation using the plurality of estimated carrier frequencies S21, and outputs a plurality of carrier frequency-corrected received burst signals S30. The carrier frequency-corrected received burst signals S30 are input to a second pulse-shaping filter 35 that removes interference between adjacent symbols, and outputs a pulse-shaping-filtered received burst signal S31.

The second pulse-shaping-filtered received burst signal S31 is input to a channel estimation circuit 32 that estimates channel distortion using some or all of the plurality of pulse-shaping-filtered received burst signals S31, and outputs a channel distortion signal S32. A plurality of channel frequency-corrected received burst signals S31 are input to a coherent detection circuit 33 that performs coherent detection in symbol units using the channel distortion signal S32, and outputs a received burst signal S33 that has been subjected to quadrature coherent detection.

The plurality of received burst signals S33 that have been subjected to quadrature coherent detection are input to a maximum likelihood decision circuit 34 that performs a maximum determination estimation of a most appropriate burst from among the plurality of received burst signals that have been subjected to quadrature coherent detection using different estimated carrier frequencies, and outputs the most appropriate received burst signal S34. The most appropriate received burst signal S34 that has been subjected to quadrature coherent detection and selected by maximum determination is input to the demodulation circuit 20, where a desired received burst data signal is extracted and demodulated.

The fourth embodiment of the invention shown in FIG. 4 is largely identical to the second embodiment of the wireless receiving apparatus shown in FIG. 2. A constellation of difference is that, while in the second embodiment, the carrier frequency correction circuit 22 corrects the carrier frequency of the received burst signal S15 after it passes the pulse-shaping filter 15, in the fourth embodiment, the carrier frequency correction circuit 30 corrects the carrier frequency of the received burst signal S14 before it passes the first pulse-shaping filter 15, and the received burst signal S14 subsequently passes the second pulse-shaping filter 31.

The pulse-shaping filter 15 is a bandpass filter that affects desired signal extraction. When the carrier frequency offset between transmitter and receiver cannot be ignored in comparison with the pass band of this bandpass filter (i.e. when the carrier frequency offset $\Delta f$ estimated by the carrier frequency estimation circuit 16 is large), desired signal power after the pulse-shaping filter 15 is cancelled by the band limitation. On the other hand, in the fourth embodiment of FIG. 4, the carrier frequency of the signal S14 is corrected before it passes the first pulse-shaping filter 15, and it then passes the second pulse-shaping filter 31. With this configuration, even if there is a large carrier frequency-offset between the transmitter and receiver, the problem of cancellation of the desire signal power of the received burst signal can be avoided.

The carrier frequency correction circuit 30, the pulse-shaping filter 31, the channel distortion signal S32, the coherent detection circuit 33, and the maximum likelihood decision circuit 34 of FIG. 4 respectively correspond to the carrier frequency correction circuit 22, the pulse-shaping filter 15, the channel estimation circuit 23, the coherent detection circuit 24, and the maximum likelihood decision circuit 25 of FIG. 2.

Subsequently, a fifth embodiment of the wireless receiving apparatus of the invention will be explained with reference to FIG. 7. Portions corresponding to those of FIG. 4 are denoted by like reference numerals. While this embodiment executes processes that are exactly equivalent to those of the fourth embodiment of FIG. 4, parallel processes of carrier frequency correction, channel estimation, and coherent detection are written separately. In the configuration of an actual circuit, the same circuit can be used repeatedly as in the fourth embodiment of FIG. 4, or the circuits can be arranged in parallel as in the fifth embodiment of FIG. 7.

Figure 7:
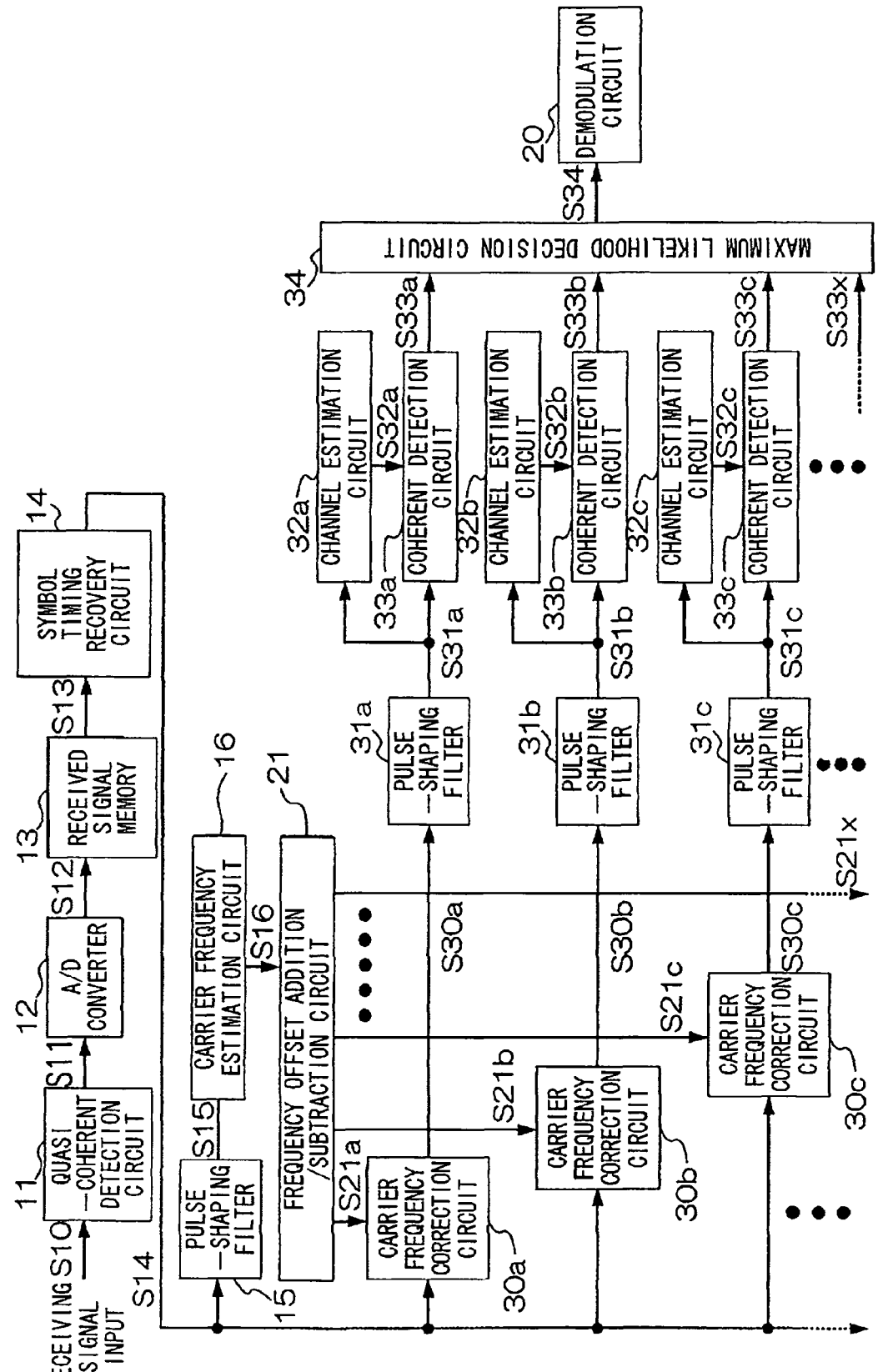
FIG. 7 is a block diagram of a fifth embodiment of the invention.

Carrier frequency correction circuits 30a, 30b, 30c, . . . of FIG. 7 correspond to the carrier frequency correction circuit 30 of FIG. 4, pulse-shaping filters 31a, 31b, 31c, . . . of FIG. 7 correspond to the pulse-shaping filter 31 of FIG. 4, channel estimation circuits 32a, 32b, 32c, . . . of FIG. 7 correspond to the channel estimation circuit of FIG. 4, and coherent detection circuits 33a, 33b, 33c, . . . of FIG. 7 correspond to the coherent detection circuit 33 of FIG. 4. Estimated carrier frequencies S21a, S21b, S21c, . . . , and S21x, a plurality of carrier frequency-corrected received burst signals S30a, S30b, S30c, received burst signals 31a, 31b, 31c, . . . , channel distortion signals S32a, S32b, S32c, . . . , and received burst signals S33a, S33b, S33c, . . . , S33x of FIG. 7 correspond respectively to the estimated carrier frequencies S21, the carrier frequency-corrected received burst signal S30, the pulse-shaping-filtered received burst signal S31, the channel distortion signal S32, and the received burst signal S33 of FIG. 4.

As described above, by using the wireless receiving apparatus of the invention, the carrier frequency can be estimated and corrected with high precision. Even in a region where the wireless burst length is short and the carrier signal-to-noise power ratio is small, superior wireless transmission error rate characteristics can be obtained.

According to the invention, when receiving a wireless burst whose pilot signals are arranged at equal intervals (fixed intervals) and performing carrier frequency estimation, it is possible to suppress the rate of carrier frequency miss-detection caused by frequency slips, and there increase the carrier frequency estimation precision. By increasing the carrier frequency estimation precision, deterioration in the wireless transmission bit error rate can be suppressed even in regions of low CNR, and the wireless transmission distance can be increased. Even when a short packet is used, superior performances can be achieved with no deterioration in the wireless transmission bit error rate.

Subsequently, a sixth embodiment of the invention will be explained with reference to FIG. 8. Portions corresponding to those in FIGS. 1, 2, 4, 6, and 7, and FIGS. 9 and 10 described below, are denoted by like reference numerals. In the sixth embodiment of FIG. 8, the position of a maximum likelihood decision circuit differs in comparison with that of the fourth embodiment of FIG. 4.

Figure 8:
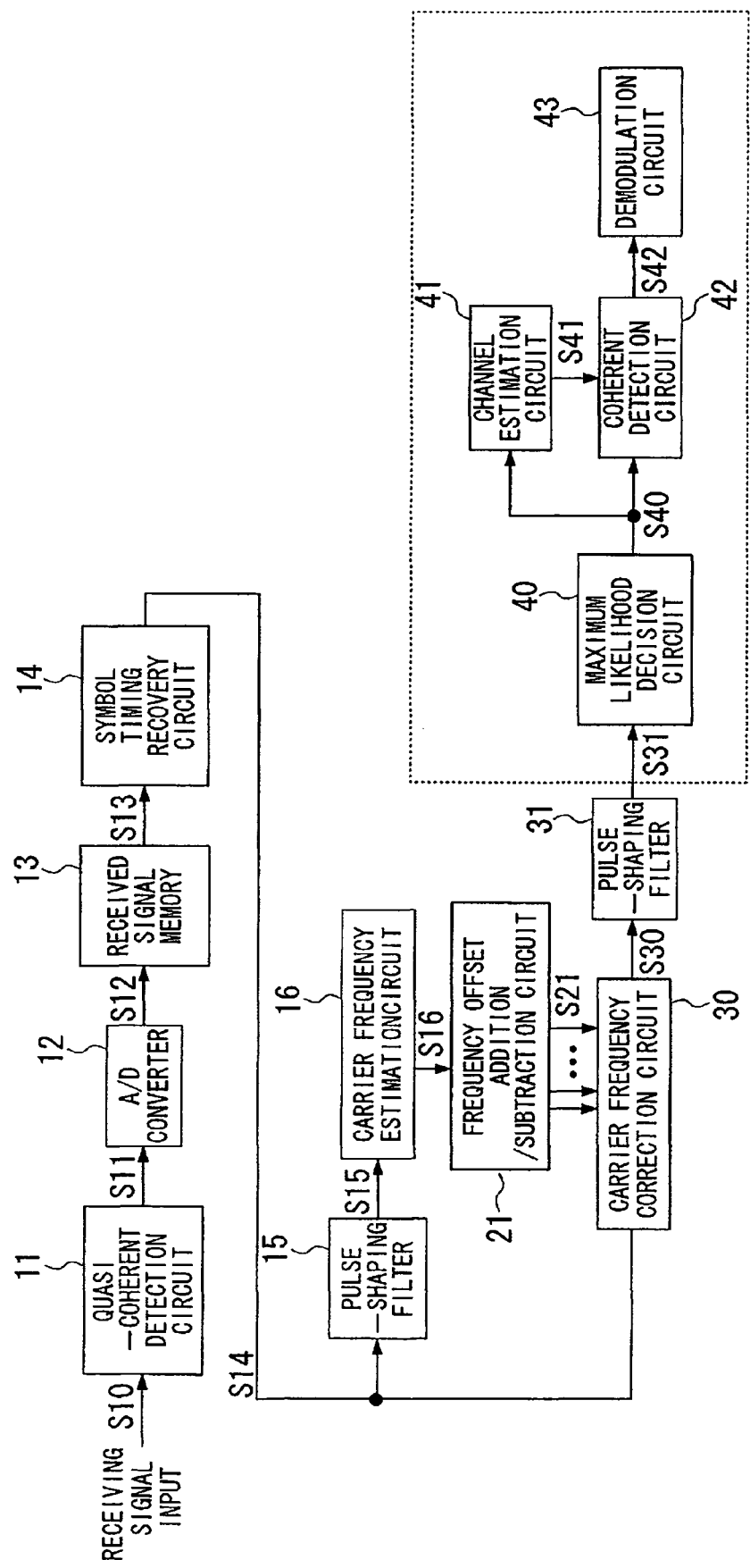
FIG. 8 is a block diagram of a sixth embodiment of the invention.

In FIG. 8, portions from the input of a received signal S10 to the output of a pulse-shaping-filtered received burst signal S31 are identical to the fourth embodiment shown in FIG. 4.

The second pulse-shaping-filtered received burst signal S31 is input to a maximum likelihood decision circuit 40, which performs a maximum determination estimation of the plurality of carrier frequency-corrected signals, and outputs one frequency-corrected received burst signal S40. The carrier frequency-corrected received burst signal S40 that has been narrowed down to one is input to a channel estimation circuit 41, which estimates channel distortion using some or all of the signals of the carrier frequency-corrected received burst signal S40, and outputs a channel distortion signal S41. The carrier frequency-corrected received burst signal S40 is input to a coherent detection circuit 42, which corrects channel distortion in symbol units using the channel distortion signal S41, and outputs a received burst signal S42 that has been subjected to quadrature coherent detection. The single received burst signal S42 that has been subjected to quadrature coherent detection is input to a demodulation circuit 43, where a desired received burst data signal is extracted and demodulated.

The sixth embodiment of the invention shown in FIG. 8 is largely identical to the fourth embodiment shown in FIG. 4. A constellation of difference is that, while in the fourth embodiment shown in FIG. 4, maximum likelihood decision is made after performing channel estimation and quadrature coherent detection to a plurality of frequency-corrected received burst signals S31, in the sixth embodiment shown in FIG. 8, maximum likelihood decision is made using the plurality of frequency-corrected received burst signals S31, and an appropriate received burst signal is selected before performing channel estimation and quadrature coherent detection.

Figure 11:
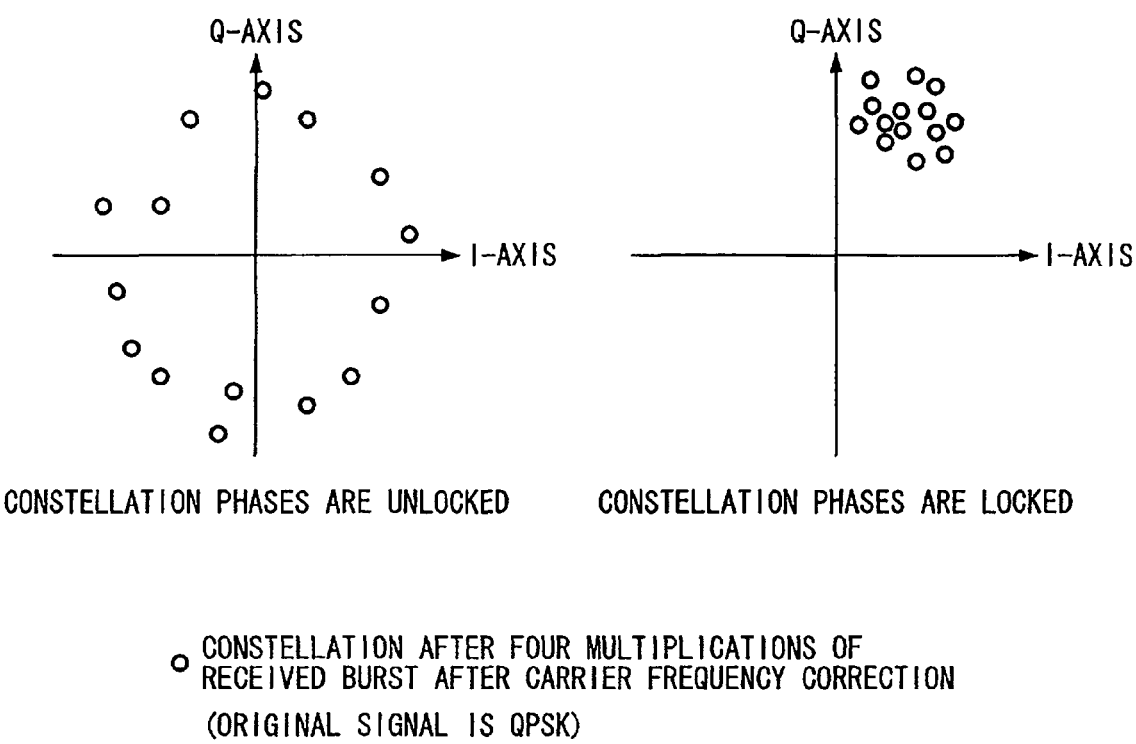
FIG. 11 is a second explanatory diagram of a maximum likelihood decision method using constellation positions.

A maximum likelihood decision method using constellation positions in the maximum likelihood decision circuit 40 will be explained with reference to FIG. 11. This example uses QPSK modulation. As shown on the left of FIG. 11, when frequency correction is performed using an inappropriate estimated carrier frequency, the constellation positions after four multiplications do not lock and the constellation arrangement becomes random. On the other hand, when frequency correction is performed using an appropriate estimated carrier frequency, as shown on the right of FIG. 11, the constellation positions after four multiplications lock, and are distributed around one constellation position. We need only calculate the dispersion of the constellation positions after four multiplications, and select the carrier frequency candidate that obtains least dispersion. This method is not limited to dispersion in a quadrature coordinate system, it being possible to use dispersion of the phase component in a polar coordinate system, and an index instead of dispersion.

Since the sixth embodiment of the invention shown in FIG. 8 performs maximum likelihood decision using received burst signal data prior to coherent detection, its transmission performances are inferior to those of the fourth embodiment shown in FIG. 4. On the other hand, since channel estimations and quadrature coherent detections need not be performed for a plurality of received bursts, the size of the circuit can be reduced. It is therefore effective in simplifying the apparatus when channel fluctuation within the burst is not regarded as particularly large. The sixth embodiment is also effective in simplifying the apparatus when the burst is long, or in an environment where sufficient CNR can be ensured, since the effects of channel compensation can be regarded as minimal.

Subsequently, a seventh embodiment of the invention will be explained with reference to FIG. 9. Portions corresponding to those in FIGS. 1, 2, 4, 6, 7, 8, and FIG. 10 described below, are denoted by like reference numerals. The seventh embodiment shown in FIG. 9 differs from the fourth embodiment shown in FIG. 4 in that it performs determination selection using error detection instead of maximum likelihood decision.

Figure 9:
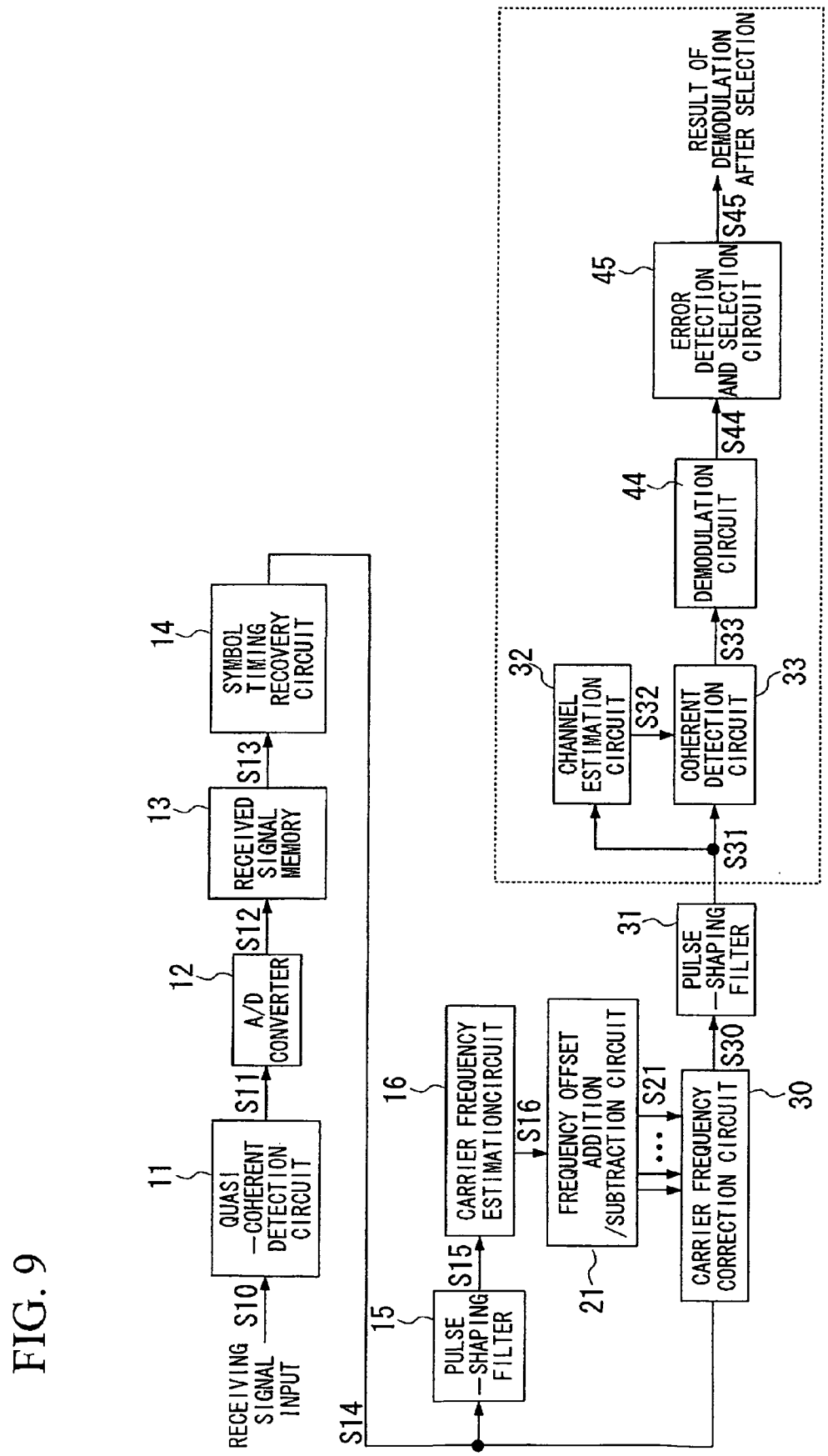
FIG. 9 is a block diagram of a seventh embodiment of the invention.

In FIG. 9, the portions from inputting a received signal S10 to outputting a plurality of received burst signals S33 that have been subjected to quadrature coherent detection are identical to those of the fourth embodiment shown in FIG. 4.

The plurality of received burst signals S33 that have been subjected to quadrature coherent detection are each input to a demodulation circuit 44, which demodulates them to a plurality of received burst data signals S44. The plurality of received burst data signals S44 are input to an error detection selection determination circuit 45, which selects and extracts a desired received burst data signal for which no error is detected S45. While in FIG. 9, a carrier frequency correction circuit 30, a channel estimation circuit 32, and a coherent detection circuit 33 each have one configuration, these configurations can be arranged in parallel as shown in FIGS. 6 and 7 (where the reference numerals are different).

The seventh embodiment of the invention shown in FIG. 9, is largely identical to the fourth embodiment shown in FIG. 4. A constellation of difference is that, while in the fourth embodiment shown in FIG. 4, a demodulation is performed only for a received burst signal selected after maximum likelihood decision, in the seventh embodiment shown in FIG. 9, a demodulation is performed for all the received burst signals S33, error detection is performed for the plurality of received burst data signals S44, and a desired received burst data signal is then selected. Cyclic redundancy check (CRC) and the like is a representative example of an error detection method using received data.

Figure 12:
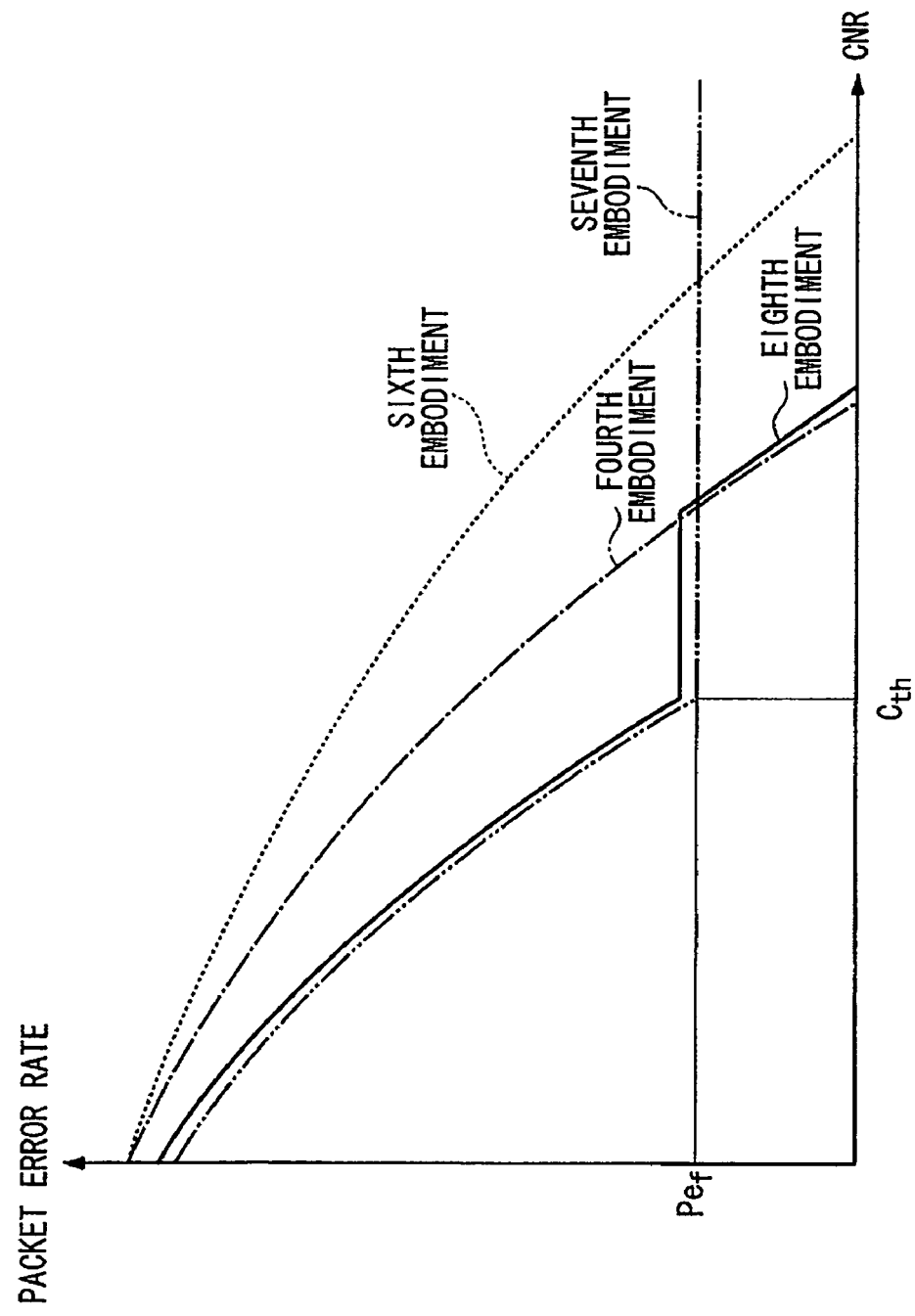
FIG. 12 is an explanatory diagram of effects of the fourth, sixth, seventh, and eighth embodiments.

Transmission performances of the seventh embodiment of the invention will be qualitatively explained with reference to FIG. 12. In comparison with the transmission performances of the fourth embodiment shown in FIG. 4, the seventh embodiment shown in FIG. 9 has excellent transmission performances in regions of low CNR. It is assumed here that error correction codes are applied in data transmission. Error detection precision is increased by implementing demodulation and error correction decoding of all received bursts. Therefore, in comparison with the fourth embodiment which does not include error correction, transmission performances are increased in regions of low CNR. Moreover, FIG. 12 shows irreducible error characteristics at packet error rate=Pef. Here, since a received burst data signal from a received burst that was corrected to an inappropriate carrier frequency has a random bit stream, despite its being an error burst, errors are sometimes undetected (though the rate is extremely low). Generally, error detection can be suppressed by increasing the CRC bit length and so on. Alternatively, by using an eighth embodiment described below, the packet error rate in regions of high CNR can be suppressed.

Subsequently, an eighth embodiment of the invention will be explained with reference to FIG. 10. Portions corresponding to those in FIGS. 1, 2, 4, 6, 7, 8, and 9 are denoted by like reference numerals. The eighth embodiment shown in FIG. 10 differs from the seventh embodiment shown in FIG. 9 in that maximum likelihood decision is additionally performed.

Figure 10:
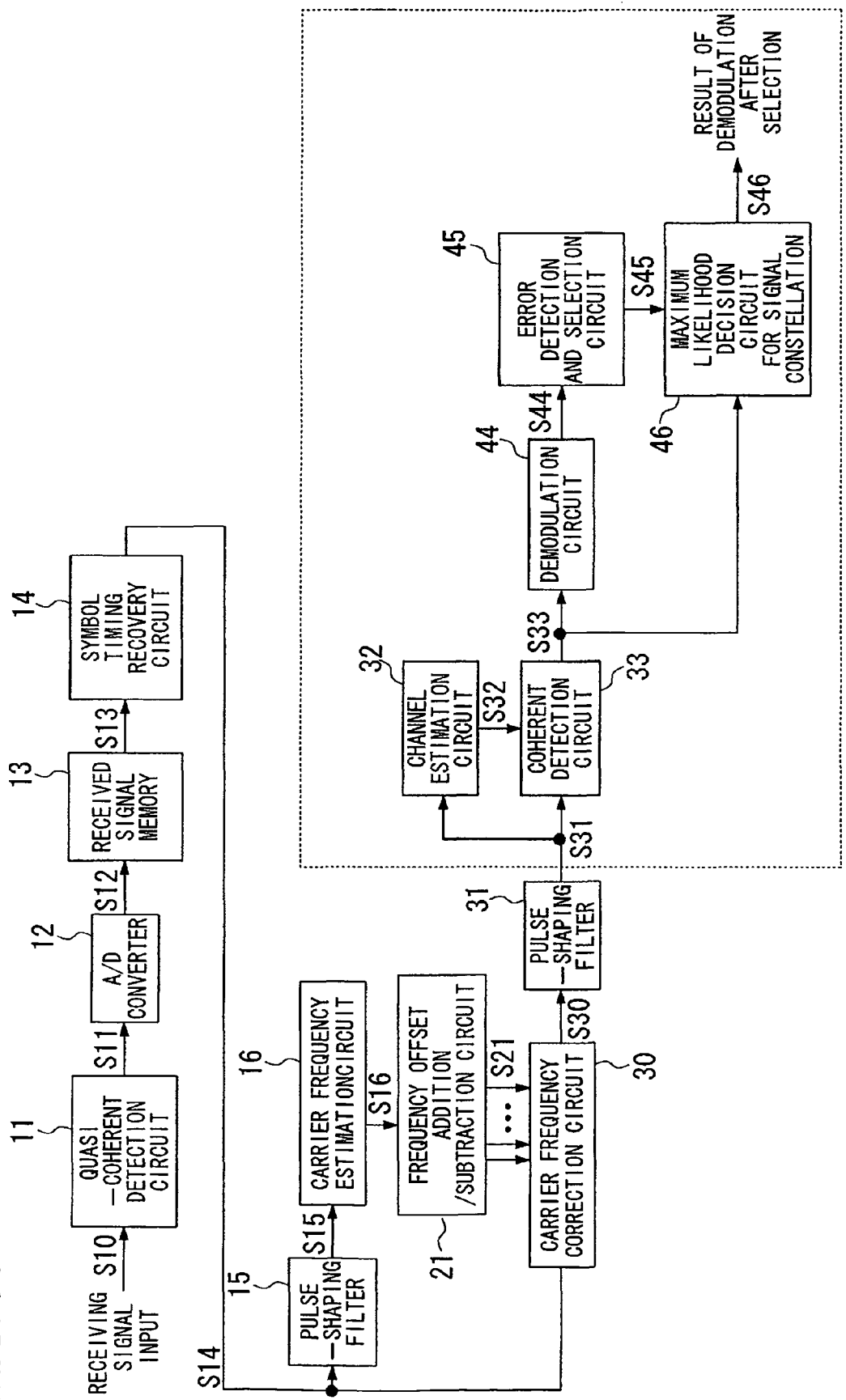
FIG. 10 is a block diagram of an eighth embodiment of the invention.

In FIG. 10, the portions from inputting a received signal s10 to outputting a plurality of received burst data signals S44 that have been subjected to quadrature coherent detection are identical to those of the seventh embodiment shown in FIG. 9.

The plurality of demodulated received burst data signals S44 are input to an error detection selection determination circuit 45, which selects and extracts a desired received burst data signal S45 for which no error is detected. When, due to inappropriate carrier frequency correction, an error is not detected despite its being an error burst, a plurality of received burst data signals S45 are output. Incidentally, while in FIG. 10, a carrier frequency correction circuit 30, a channel estimation circuit 32, and a coherent detection circuit 33 each have one configuration, these configurations can be arranged in parallel as shown in FIGS. 6 and 7 (where the reference numerals are different).

One or a plurality of received burst data signals S45 is/are input to a constellation position maximum likelihood decision circuit 46. When one signal is input, it is output directly as received burst data signal S46. When a plurality of signals are input, a process similar to that of the maximum likelihood decision circuit 34 of the fourth embodiment is performed to select an appropriate received burst data signal S46, which is then output.

Transmission performances of the eighth embodiment of the invention will be qualitatively explained with reference to FIG. 12. IN comparison with the transmission performances of the fourth and seventh embodiments of the invention, it can be seen that the eighth embodiment has excellent transmission performances in regions of both low and high CNR. While the miss-detection rate in error detection can be suppressed by increasing the error detection bit length and so on, since the error detection bit is redundant data that generates overhead in data transmission, it reduces throughput in short-packet communication. By using the eighth embodiment shown in FIG. 10, error detection bit length can be suppressed while increasing the transmission performances.

Carrier frequency estimation in the wireless receiving apparatus of the invention is characterized in that, particularly when using pilot signals dispersed at equal intervals in a wireless burst, in estimating a frequency using an autocorrelation-summation between preceding and subsequent pilots, the frequency pull-in range can be equivalently enlarged.

The embodiments of the invention are not limited to those described above; for example, the blocks of each embodiment can be combined with other blocks or further divided. Furthermore, while in the embodiments described above, a plurality of carrier frequency-corrected signals are subsequently processed in time-division by apparatuses or parallel apparatuses, one of carrier frequency estimation and coherent detection can be time-divided and the other can be configured in parallel. In this case, the plurality of signals are processed while weighting each of the processes and the like, or storage means and the like are added where appropriate to momentarily store the signals.

Example 1

An example using the first and second embodiments of the invention shown in FIGS. 1 and 2 will be explained with reference to FIGS. 13 to 15. Cumulative probability distribution of residual carrier frequency estimation error and packet error rate characteristics of the wireless receiving apparatuses of FIG. 1 and FIG. 2 will be compared using computer simulations. FIG. 13 is a diagram of parameter comparison conditions in this example. While the wireless receiving apparatus of FIG. 1 uses a single estimated carrier frequency, the configuration of FIG. 2 uses three estimated carrier frequencies in consideration of the affects of frequency slips. QPSK modulation is used, and it is assumed that the apparatus has a diversity configuration including two receiving antennas, and that the channel is a flat Rayleigh fading channel. The burst length is 148 symbols, the data packet length is 128 symbols (16 bytes), and five pilot signals are provided, each having a length of four symbols.

Figure 14:
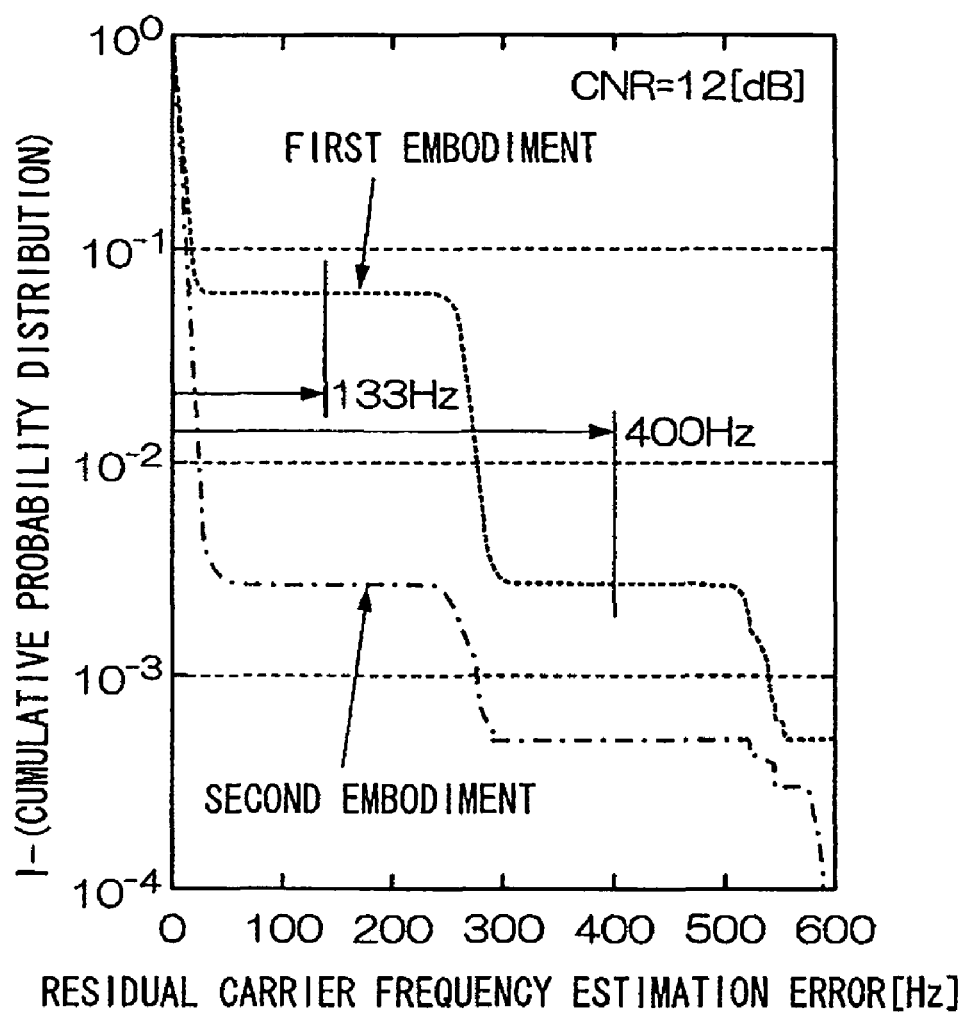
FIG. 14 is a diagram (part 1) of a performances comparison in the first example of the invention.

FIG. 14 is a diagram of cumulative probability distribution of residual carrier frequency estimation error in this example. It is assumed here that CNR=12 dB. Both the circuit of FIG. 1 (first embodiment) and the circuit of FIG. 2 (second embodiment) generate frequency slips at intervals of 267 Hz. Since the wireless receiving apparatus of FIG. 1 has a narrow carrier frequency pull-in range of ±133 Hz, its pull-in performances are poor. As a result, the carrier frequency error detection rate increases. On the other hand, the configuration of FIG. 2 relieves frequency slips of ±fs/Npd=±1/Tp, and its carrier frequency pull-in range is therefore equivalently enlarged to ±400 Hz in comparison with the wireless receiving apparatus of FIG. 1, thereby reducing the carrier frequency error detection rate.

Figure 15:
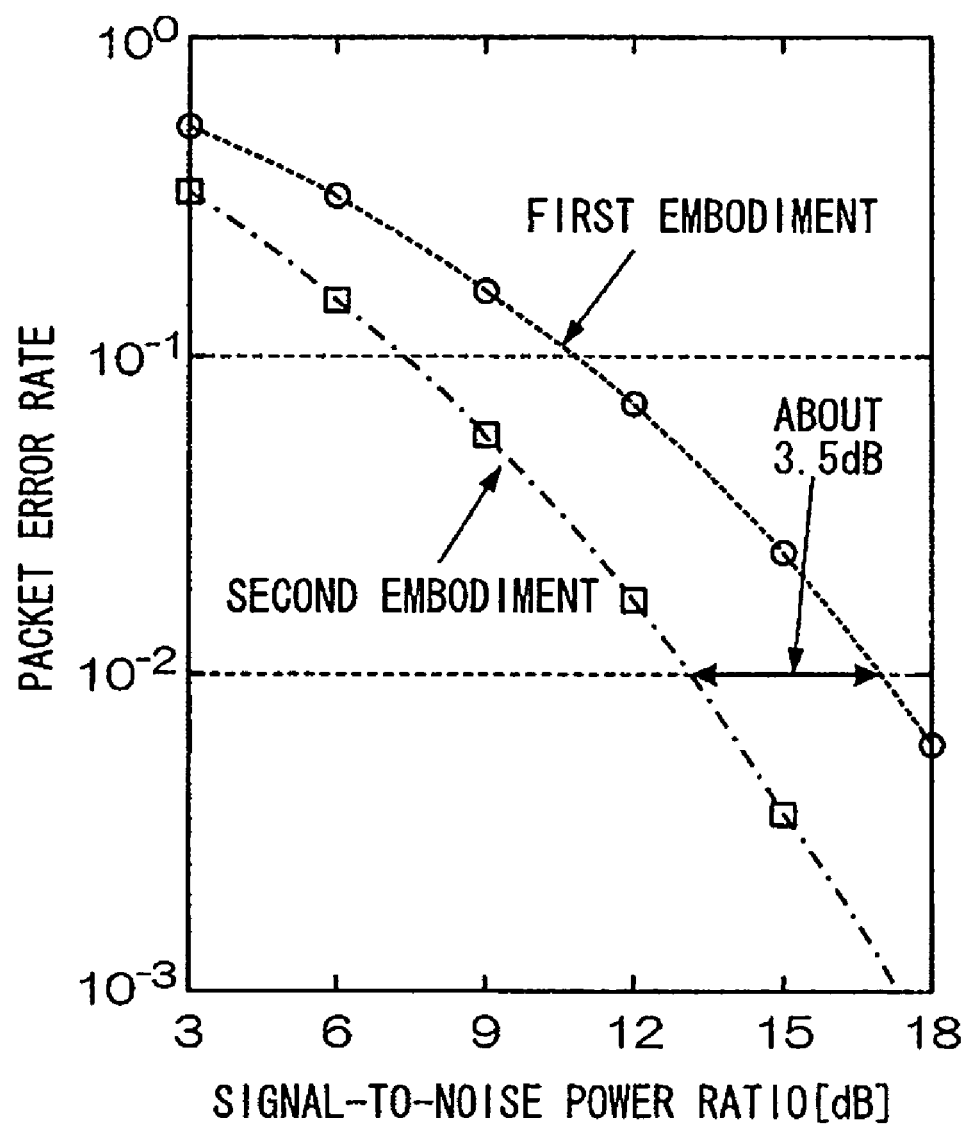
FIG. 15 is a diagram (part 2) of a performances comparison in the first example of the invention.

FIG. 15 is a diagram of carrier-to-noise power ratio against packet error rate characteristics in this example. In the block demodulation circuit of FIG. 2, in comparison with the wireless receiving apparatus of FIG. 1, the CNR required to obtain a packet error rate of 1% rises to approximately 3.5 dB. By suppressing the miss-detection rate of the carrier frequency in this manner, wireless transmission error rate characteristics can be enhanced in regions of low CNR.

Subsequently, a ninth embodiment of the invention will be explained.

Figure 16:
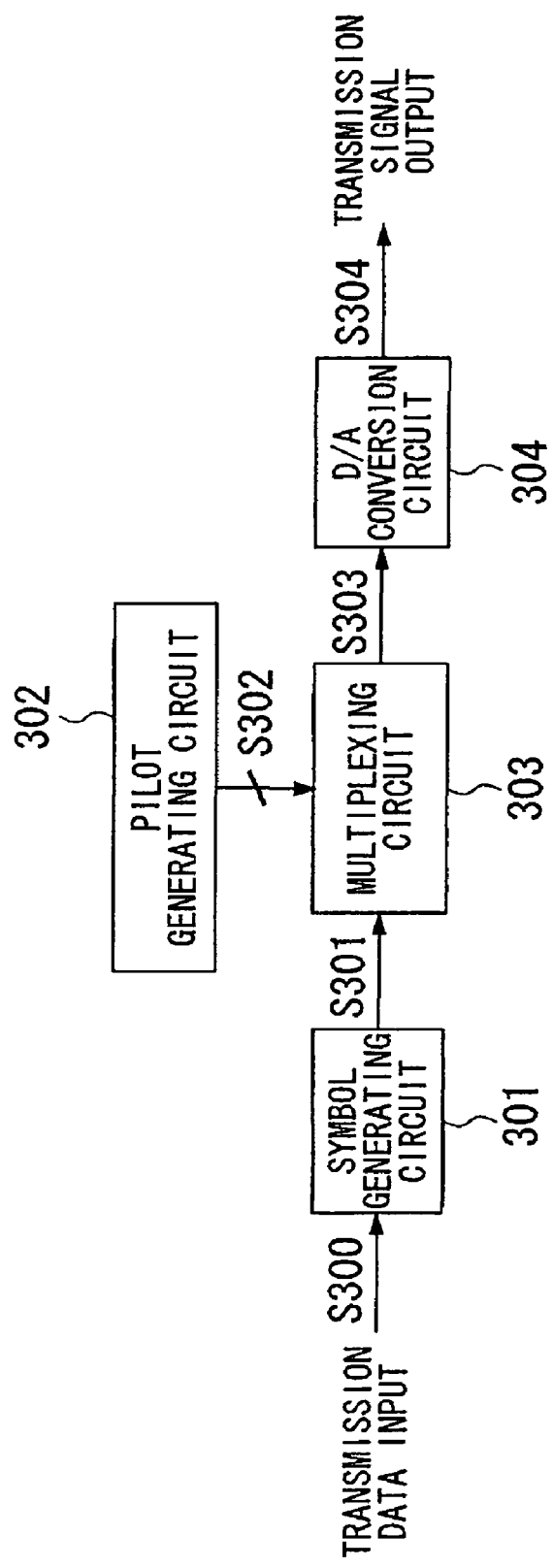
FIG. 16 is a block diagram of a ninth embodiment of the invention.

FIG. 16 is a block diagram of an example configuration of an embodiment of a wireless transmitting apparatus according to the invention.

A transmission data bit stream S300 is converted (modulated) to data symbols such as PSK in a symbol generating circuit 301. A pilot generating circuit 302 generates a pilot signal S302. A multiplexing circuit 303 multiplexes a transmission symbol row S301 with the pilot signal S302, generating a transmission burst signal S303. The transmission burst signal S303 is D/A converted by a D/A conversion circuit 304, and output as a transmission burst signal S304.

Figure 17:
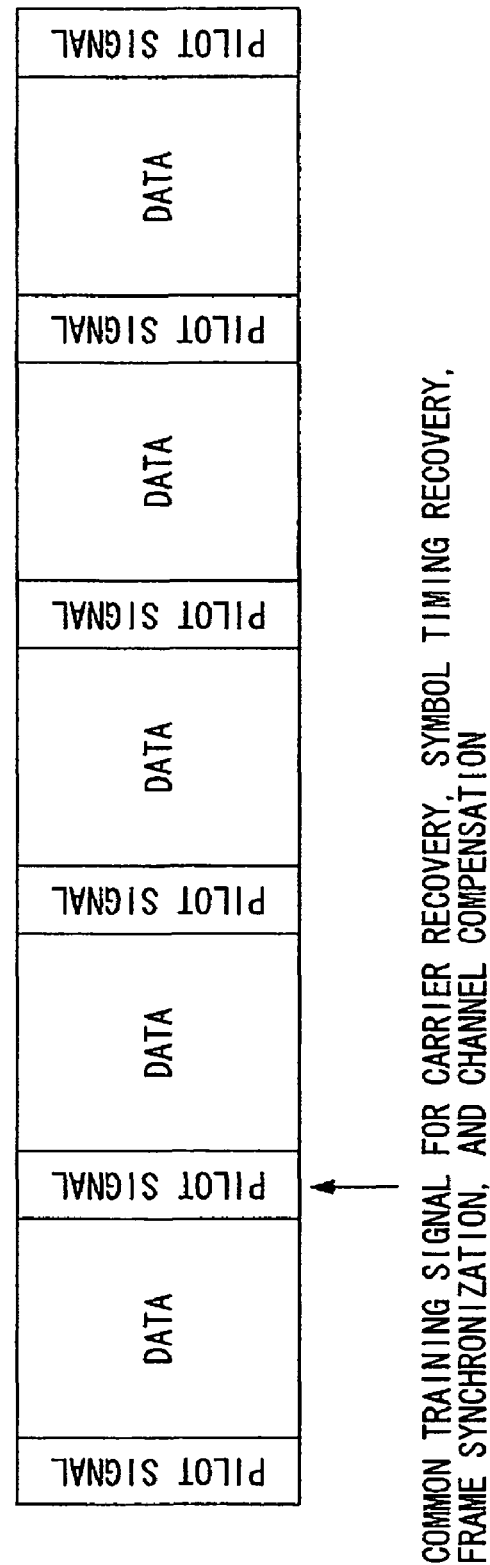
FIG. 17 is a first diagram of a frame configuration used in a wireless transmitting apparatus and a wireless receiving apparatus of the invention.

In the ninth embodiment of the invention shown in FIG. 16, the wireless transmitting apparatus generates training data required for carrier recovery, symbol timing recovery, frame synchronization, channel distortion correction, and the like, as the common pilot signal S302. The multiplexing circuit 303 can generate a frame configured such as that shown in FIG. 17 (a first diagram of a frame configuration used in a wireless transmitting apparatus and a wireless receiving apparatus). Since pieces of data required for carrier recovery, symbol timing recovery, and frame synchronization do not need to be held separately inside the frame, transmission efficiency (frame efficiency) can be increased even if the communication traffic is predominantly short packets.

Figure 18:
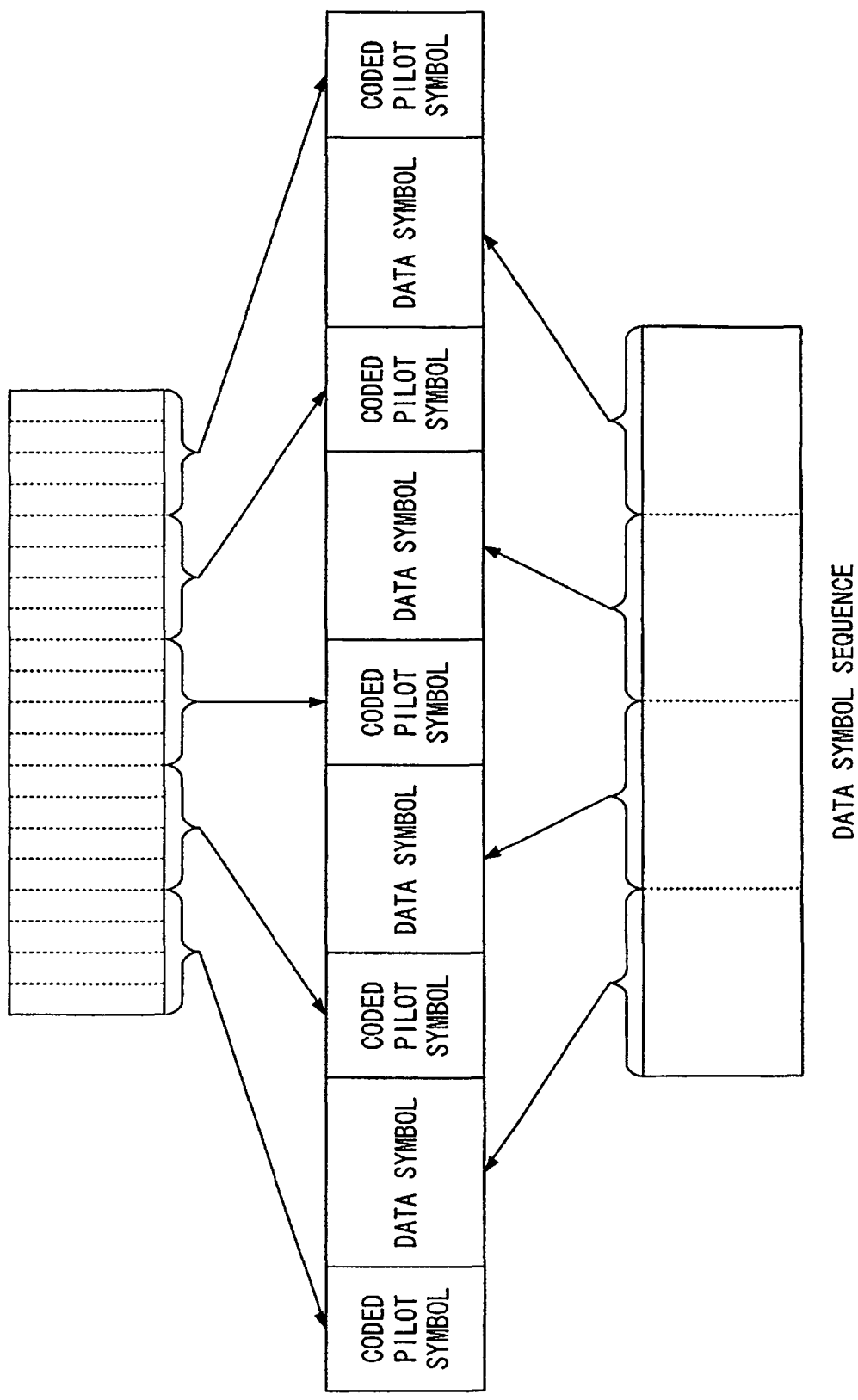
FIG. 18 is a second diagram of a frame configuration used in a wireless transmitting apparatus and a wireless receiving apparatus of the invention.

FIG. 18 is a second diagram of a frame configuration used in a wireless transmitting apparatus and a wireless receiving apparatus. In FIG. 18 illustrates in greater detail the frame shown in FIG. 17. As shown in FIG. 18, codified pilot symbols corresponding to a plurality of burst synchronization functions, such as carrier frequency recovery, symbol timing recovery, frame synchronization, and channel distortion correction, are generated, and transmitted between data symbols in the data symbol sequence.

Subsequently, a tenth embodiment of the invention will be explained.

Figure 19:
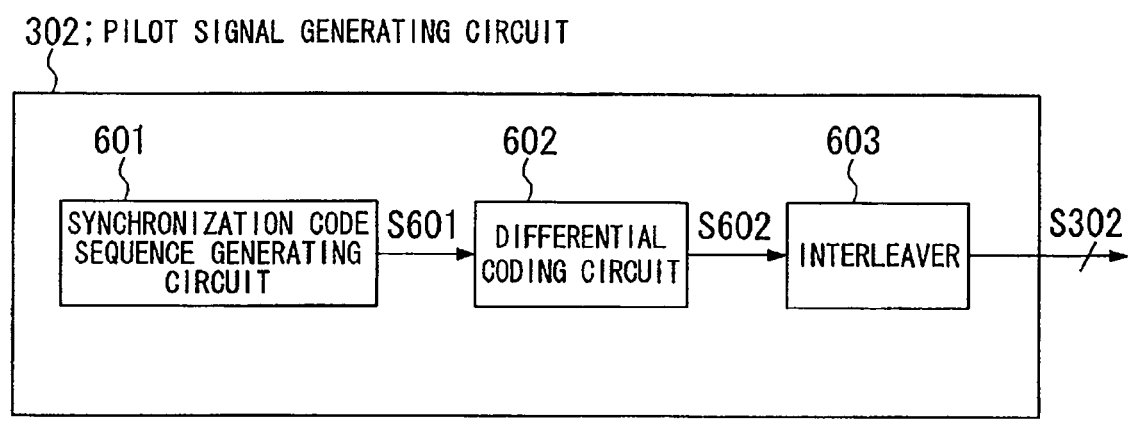
FIG. 19 is a block diagram of an embodiment (tenth embodiment) of a pilot generating circuit of a wireless transmitting apparatus of the invention.

FIG. 19 is a block diagram of an example configuration of an embodiment of a pilot signal generating circuit of a wireless receiving apparatus according to the invention. FIG. 19 corresponds to the example configuration of the pilot signal generating circuit portion of the embodiment of the wireless receiving apparatus shown in FIG. 16. A synchronization code sequence signal S601 generated by a synchronization code sequence generating circuit 601 is input to a differential encoding circuit, and differentially encoded. A differentially encoded synchronization code sequence signal S602 is input to an interleaver 603, which generates a pilot signal S302.

Figure 20:
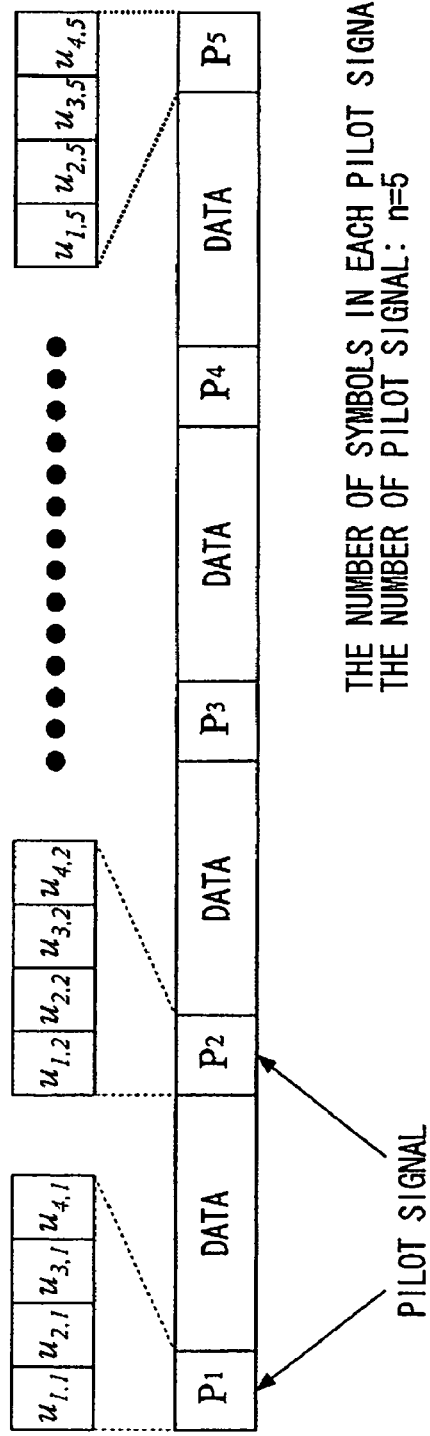
FIG. 20 is an example of pilot generating in a wireless transmitting apparatus of the invention.

FIG. 20 is an example of pilot generating in the wireless receiving apparatus of the invention.

In this example, the number of symbols per pilot signal Np=4, and the number of pilot signals Nq=5. A pilot pattern matrix U can, for example, be determined in the follow manner. The synchronization code sequence generating circuit 601 generates a matrix V as a synchronization code sequence signal S61. Note that M≧Np and N≧Nq. Matrix V is determined by $$V = \begin{pmatrix} v_1 \\ v_2 \\ \vdots \\ v_M \end{pmatrix} = \begin{pmatrix} v_{1,1} & v_{1,2} & \cdots & v_{1,N-1} \\ v_{2,1} & v_{2,2} & \cdots & v_{2,N-1} \\ \vdots & \vdots & \ddots & \vdots \\ v_{M,1} & v_{M,2} & \cdots & v_{M,N-1} \end{pmatrix}$$ [Equation 1]

Here, pseudo noise (PN) sequence and the like can be used to generate synchronization codes v2, v2, . . . , vM. More precise frame detection can be achieved by using Walsh-Hadamard codesets and the like, which has high quadrature between codes. When M≧Np and N≧Nq, matrix V is made an output matrix V', and when M>Np or N>Nq, a matrix V' obtained by cutting away the matrix V is output as the synchronization code sequence signal S61. That is, matrix V' is determined by $$V' = \begin{pmatrix} v'_1 \\ v'_2 \\ \vdots \\ v'_{Np} \end{pmatrix} = \begin{pmatrix} v_{1,1} & v_{1,2} & \cdots & v_{1,Nq-1} \\ v_{2,1} & v_{2,2} & \cdots & v_{2,Nq-1} \\ \vdots & \vdots & \ddots & \vdots \\ v_{Np,1} & v_{Np,2} & \cdots & v_{Np,Nq-1} \end{pmatrix}$$ [Equation 2]

Matrix V' is differentially encoded by the differential encoding circuit 602, and a matrix U is generated as a differentially encoded synchronization code sequence signal S62.

$$U = \begin{pmatrix} u_1 \\ u_2 \\ \vdots \\ u_{Np} \end{pmatrix} = \begin{pmatrix} u_{1,1} & u_{1,2} & \cdots & u_{1,Nq-1} & u_{1,Nq} \\ u_{2,1} & u_{2,2} & \cdots & u_{2,Nq-1} & u_{2,Nq} \\ \vdots & \vdots & \ddots & \vdots & \vdots \\ u_{Np,1} & u_{Np,2} & \cdots & u_{Np,Nq-1} & u_{Np,Nq} \end{pmatrix}$$ [Equation 3]

Here, matrix U is obtained by differentially encoding the matrix V' output from the synchronization code sequence generating circuit 601 in the row direction with respect to an initial pattern vector of $$I = (u_{1,1} u_{2,1} \ldots u_{Np,1})^T$$ [Equation 4]

By inputting matrix U to the interleaver 63, a pixel at row m column n of matrix U is output as pilot signal S63 in correspondence with the pilot pattern of symbol m of the nth pilot. Since the frame-synchronization sequence-related information is stored after being differentially encoded, an arbitrary symbol sequence can be selected as an initial pattern vector I when generating U. As the pilot signal is also used in symbol timing synchronization in the wireless receiving apparatus, symbol timing synchronization performances can be enhanced by selecting the initial pattern vector I such that encoding between adjacent symbols is reversed.

Subsequently, an eleventh embodiment of the invention will be explained.

Figure 21:
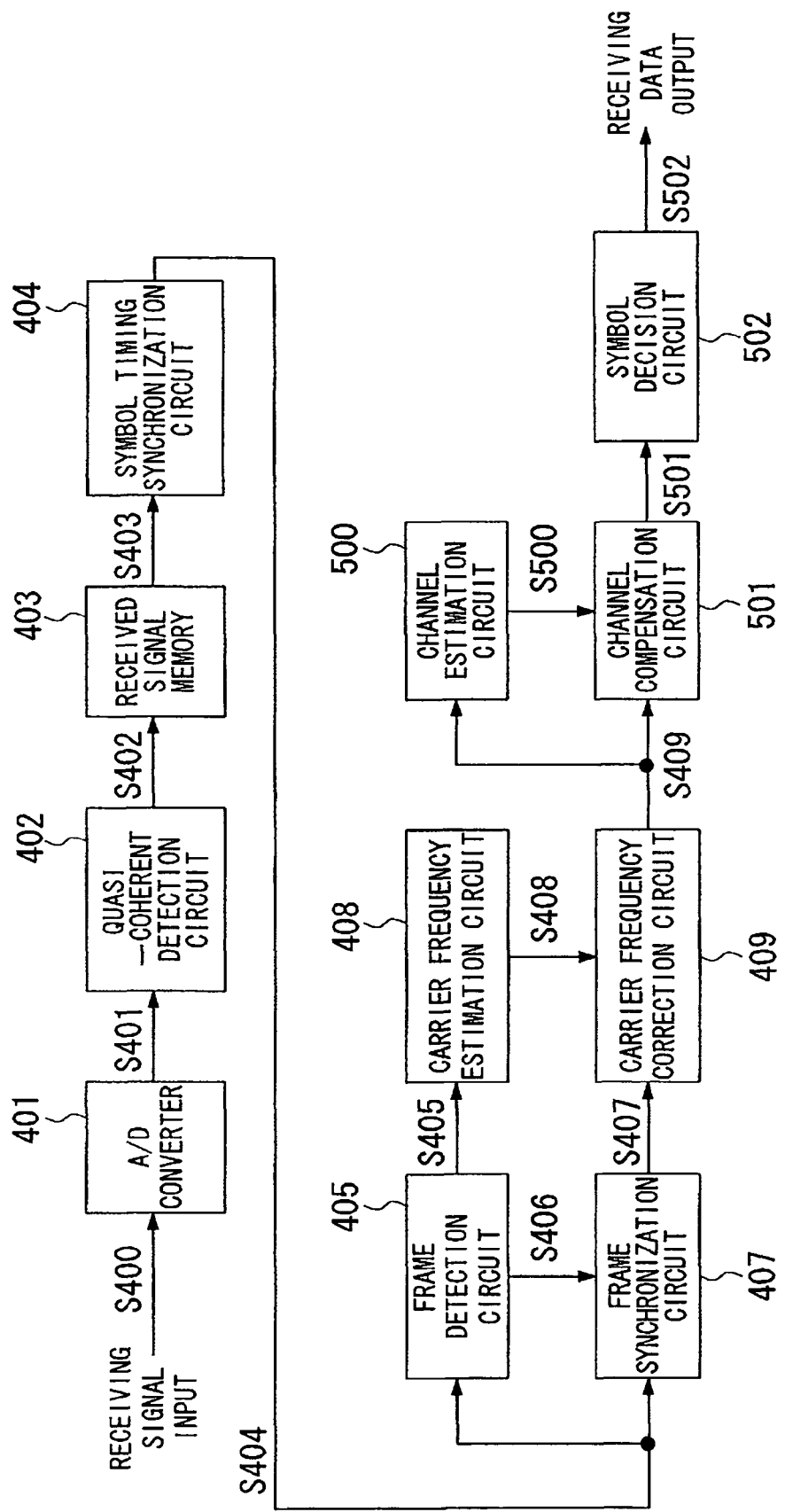
FIG. 21 is a block diagram of an eleventh embodiment of a wireless transmitting apparatus of the invention.

FIG. 21 is a block diagram of an example configuration of an embodiment of a wireless receiving apparatus according to the invention.

A received burst signal S400 is A/D converted by an A/D conversion circuit 401. An A/D converted received burst signal S401 is provisionally reproduced based on a local oscillator of the receiving apparatus, and a quasi-coherent detection circuit 402 performs quasi-coherent detection. When performing an analog signal process at the quasi-coherent detection circuit 402, the quasi-coherent detection circuit 402 is provided before the A/D conversion circuit 401. The quasi-coherent detection circuit 402 outputs after sampling a received signal. A received burst signal that has been subjected to quasi-coherent detection S402 is temporarily stored in a received signal memory 403, and is later read out and processed when necessary. Based on a received burst signal S403, a symbol timing synchronization circuit 404 establishes symbol timing. A received burst signal for which symbol timing has been established S404 is input to a frame detection circuit 405, which outputs pilot signal data S405 and frame position data S406. The pilot signal data S405 is input to a carrier frequency estimation circuit 408, which estimates a carrier frequency. The frame position data S406 is input to a frame synchronization circuit 407 which establishes a frame position. A carrier frequency correction circuit 409 corrects the carrier frequency of a frame-synchronization received burst signal S407 using an estimated carrier frequency S408. Based on a carrier frequency-corrected received burst signal S409, a channel estimation circuit 500 estimates channel distortion. Channel distortion of the carrier frequency-corrected received burst signal S409 is corrected by fading and the like at a coherent rent detection circuit 501 using information related to channel distortion S500. A symbol decision circuit 502 converts (modulates) a channel distortion-corrected received burst signal S501 from data symbols to a data bit stream, and outputs a received data signal S502. The coherent detection circuit 501 in FIG. 21 is similar to the coherent detection circuit 19 of FIG. 1. Since coherent detection is a concept normally performed in a set with a process of carrier recovery, coherent detection, strictly speaking, includes concepts of 'carrier frequency correction' and 'symbol decision.' Therefore, to clarify the specific functional processes in this embodiment, it is termed 'channel compensation circuit'. The symbol decision circuit 502 of FIG. 21 is similar to the demodulation circuit in FIG. 1. In comparison with FIG. 1, this embodiment does not include a pulse-shaping filter (reference numeral 15 in FIG. 1); since a pulse-shaping filter can be provided at any position in this embodiment, it is not shown.

Figure 27:
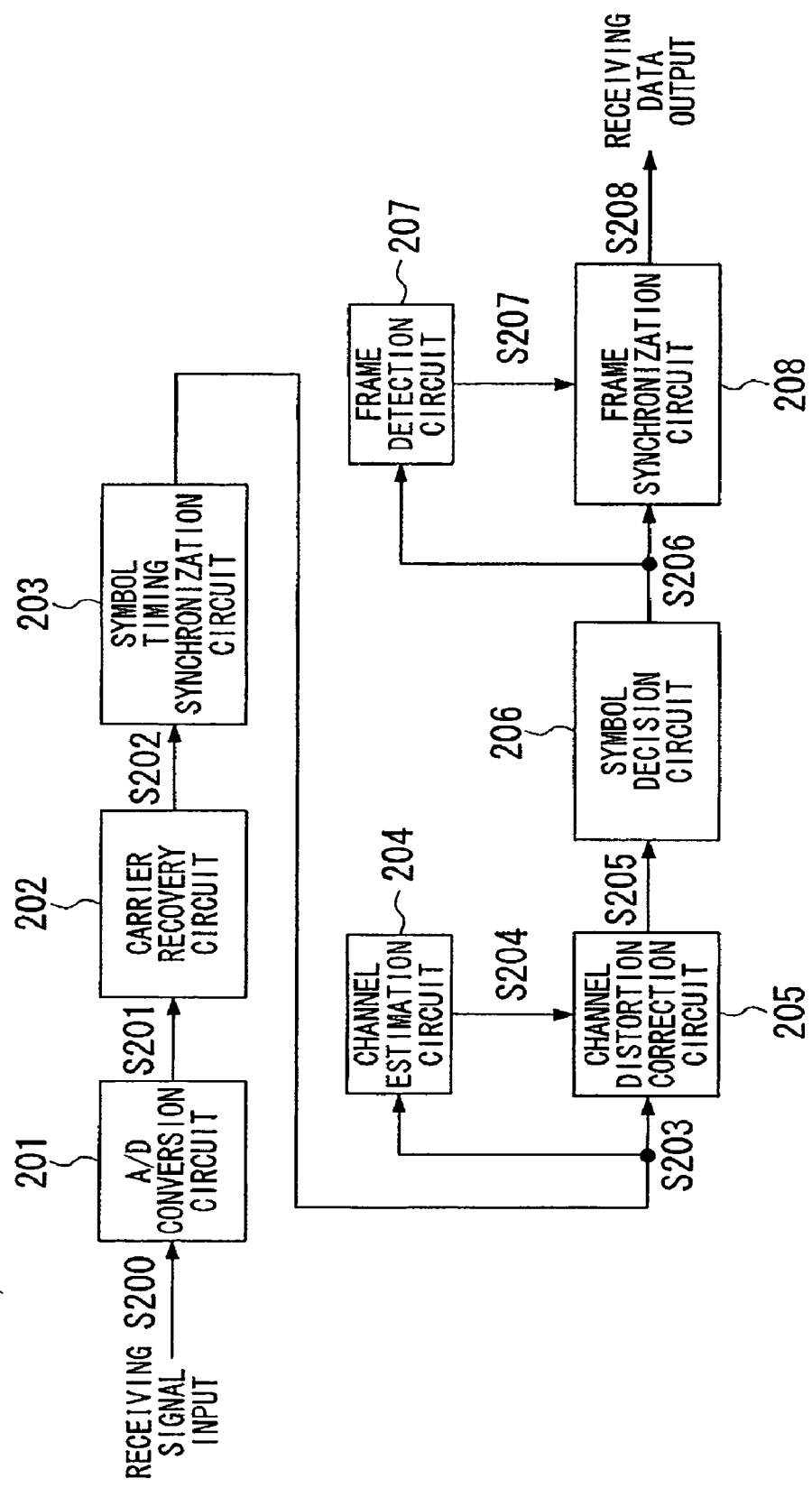
FIG. 27 is a block diagram of an embodiment of a conventional wireless receiving apparatus.
Figure 28:
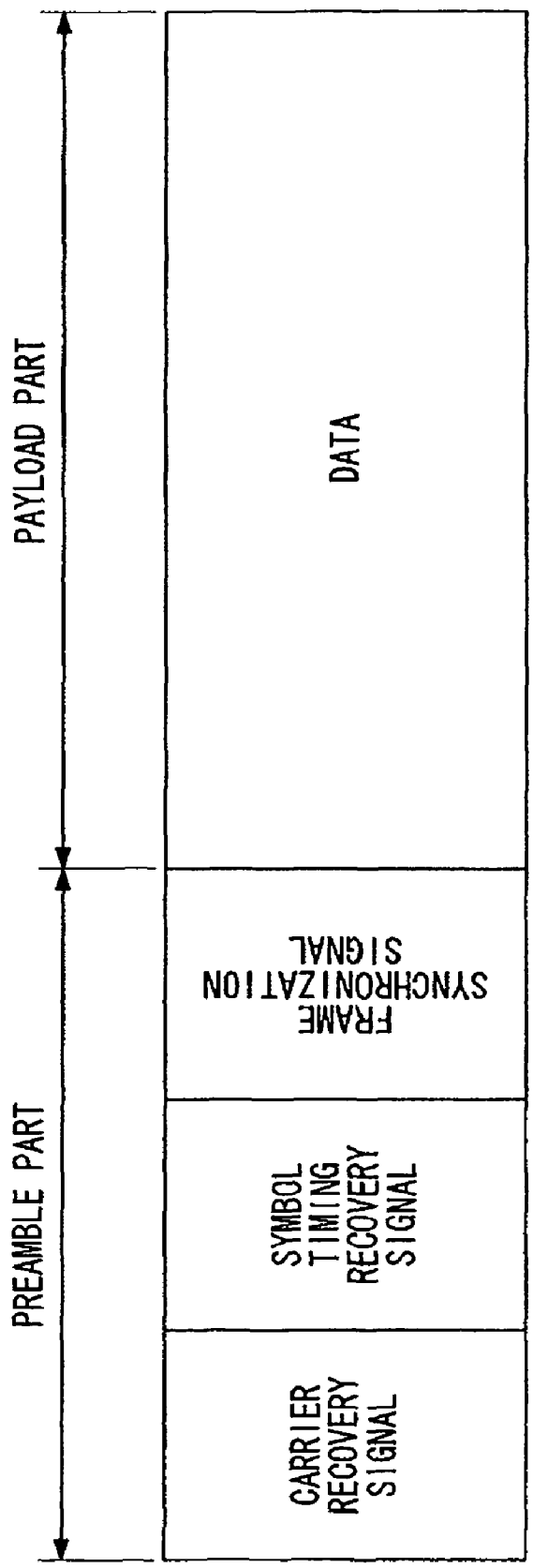
FIG. 28 is a diagram of a frame configuration used in a conventional wireless transmitting apparatus and a conventional wireless receiving apparatus.

The embodiment of the wireless receiving apparatus according to the invention shown in FIG. 21 includes a synchronization function block similar to the embodiment of the conventional wireless receiving apparatus shown in FIG. 27. A constellation of difference is that, while the conventional wireless receiving apparatus shown in FIG. 27 requires separate training signal sequence s, the wireless receiving apparatus of the invention shown in FIG. 16 can be realized for a common pilot signal. Also, the sequence of implementing the synchronization processes is different.

Subsequently, a twelfth embodiment of the invention will be explained.

Figure 22:
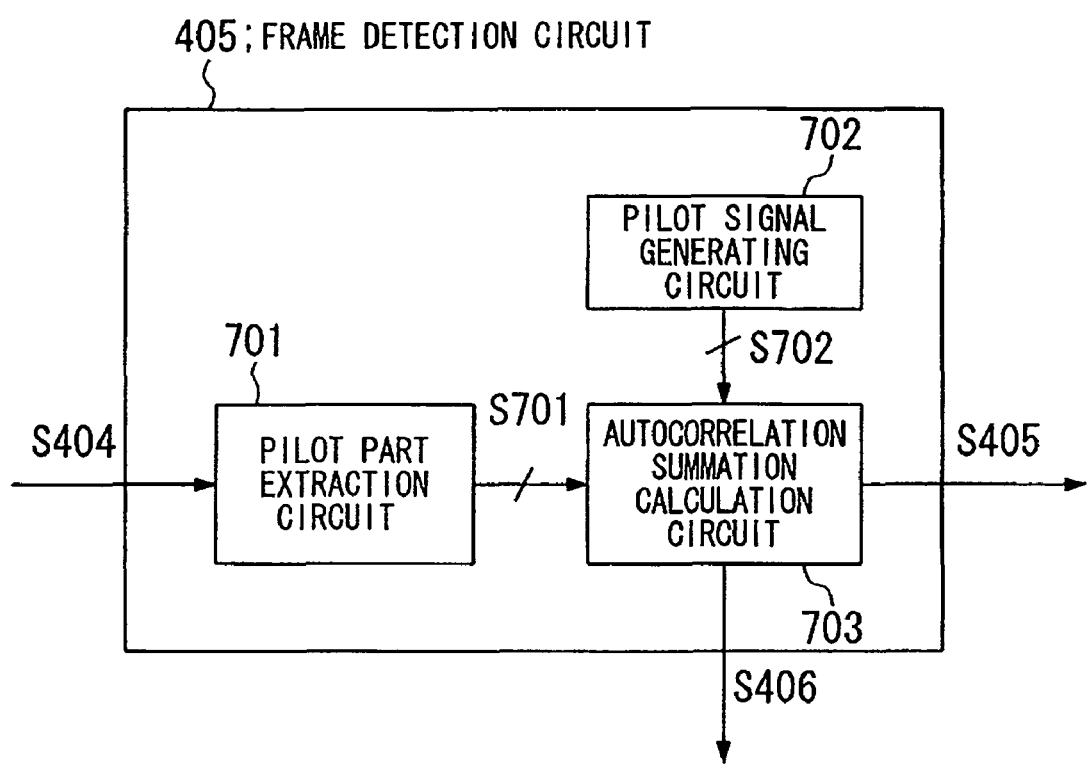
FIG. 22 is a block diagram of an embodiment (twelfth embodiment) of a frame detection/synchronization circuit of a wireless receiving apparatus of the invention.

FIG. 22 is a block diagram of an example configuration of an embodiment of a frame detection/synchronization circuit of the wireless receiving apparatus according to the invention.

FIG. 22 corresponds to the example configuration of the frame detection circuit portion of the embodiment of the wireless receiving apparatus shown in FIG. 21. A received burst signal for which symbol timing is established S404 is input to a pilot extraction circuit 701, and only a pilot part is extracted. A pilot signal generating circuit 702 generates a pilot signal that is identical to the pilot signal shown in the tenth embodiment. A correlation value calculation circuit 703 calculates a correlation value while deviating the frame position between an extracted pilot signal S701 and a pilot signal S702 generated by the pilot signal generating circuit 702. This corresponds to calculating a cross-correlation value between the pilot signal S701 and the pilot signal S702, the calculated cross-correlation values being compared at the different deviated frame positions, and output as frame position data S406 having the largest correlation value. Since the calculated correlation value is an autocorrelation value based on the pilot signal insertion interval, the summation of autocorrelation values is output as pilot signal data S405.

In the example configuration of the embodiment shown in FIG. 22, frame synchronization using correlation peak detection is performed between the extracted pilot signal S701 and the pilot signal S702 generated by the pilot signal generating circuit 702. By performing complex conjugate multiplication (i.e. autocorrelation calculation) at (Np+Nd) symbol intervals, reduction in the peak value caused by carrier frequency offset can be suppressed. Since complex conjugate multiplication is merely extraction of a differential signal, a cross-correlation value for the differential signal is calculated. Nd is the length of unit data inserted between pilots. A specific procedure is explained below.

Let s(kT) represent a received signal at time kT. T is the symbol time, and the central Nyquist constellation of a narrow-aperture window (index {0}) is the time origin.

(1) A complex conjugate multiplication is performed at (Np+Nd) [symbol] intervals of the received signal. The differential signal Sdiff(kT) is $$S_{diff}(kT) = s(kT)^* \times s(\{k+(N_p+N_d)\}T) \quad \text{[Equation 5]}$$

where * is a complex conjugate.

(2) A cross-correlation function is calculated using pilot pattern matrix V'. The cross-correlation value Scross(kT) is $$S_{cross}(kT) = \sum_{m=1}^{N_p} \sum_{n=1}^{N_q-2} \left\{ s_{diff}\left( \begin{array}{c} (k+(m-1))T + \\ (n-1)(N_p+N_d)T \end{array} \right) \times v_{mn} \right\} \quad \text{[Equation 6]}$$

where vmn expresses a differential signal between a pixel at row m column n of matrix V', i.e. symbol m of the nth pilot, and symbol m of pilot (n+1).

(3) Kmax that maximizes ||Scross(kT)|| in the narrow-aperture window, i.e.

$$K_{max} = \underset{k}{\operatorname{argmax}} \|S_{cross}(kT)\| \quad \text{[Equation 7]}$$

Equation 7 becomes the index of the frame for detection, i.e. frame position data S406.

Figure 23:
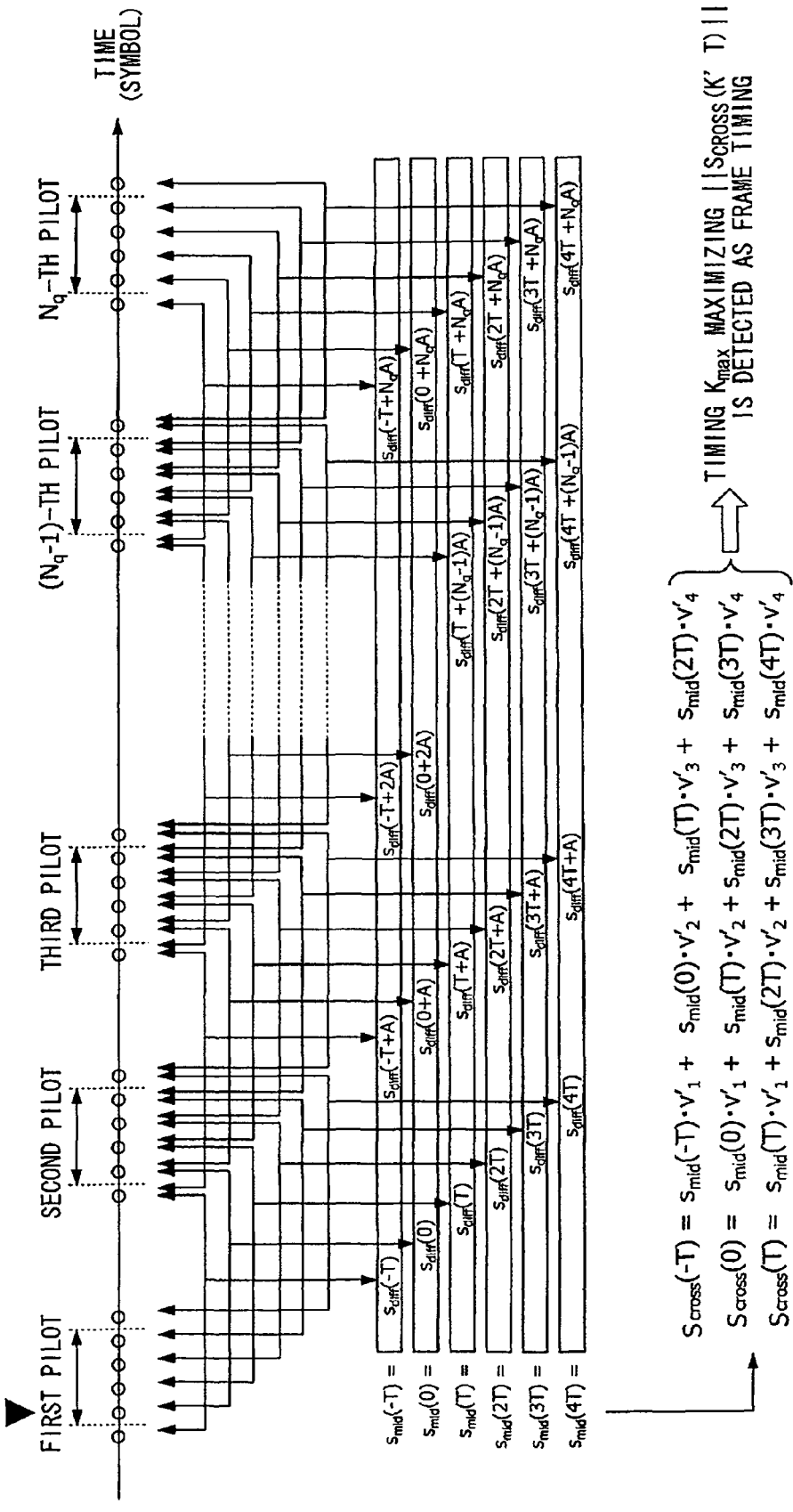
FIG. 23 is an example of a method of calculating frame position data in a wireless receiving apparatus of the invention.

FIG. 23 is a diagram of an example of calculating frame position data in the wireless receiving apparatus of the invention.

In this example, the number of symbols per pilot signal Np=4, and the narrow-aperture window width is three symbols. Middle correlation vectors Smid(kT), Smid((k+1)T), Smid((k+2)T), and Smid((k+3)T) using the extraction differential signal Sdiff for their elements are prepared ((k=−1, 0, +1); inner products of these with v'1 to v'4 are calculated, and the summation is Scross(kT). The cross-correlation value of each item will reach its maximum if the timing matches; since, if the timing deviates by more than one symbol, the correlation will be approximately 0 (correlation partner is the pilot signal) or a random correlation (correlation partner is data), the frame timing should be determined by the index k that maximizes ||Scross(kT)||, i.e. Kmax.

Subsequently, a thirteenth embodiment of the invention will be explained.

From the phase component of the cross-correlation value peak value S405 detected by the frame detection circuit 405: Scross(KmaxT), a phase rotation amount estimated value S408 per symbol: Δg can be determined. Δg is determined by $$\Delta g = \frac{1}{(N_p+N_d)} \times \tan^{-1} \frac{\operatorname{Im}[S_{cross}(K_{max}T)]}{\operatorname{Re}[S_{cross}(K_{max}T)]} \quad \text{[Equation 8]}$$

Using the carrier phase rotation amount Δg per detected symbol, receive frequency correction is performed for received signals (symbol units) of all payloads and all pilots. That is, carrier frequency-corrected received burst signal S409: sAFC(kT) for an uncorrected received burst signal S407: s(kT) is determined from $$S_{AFC}(kT) = s(kT) \times \exp\{-j\Delta g(k-K_{max})\} \quad \text{[Equation 9]}$$

Example 2

An example using the embodiments of the wireless receiving apparatus and the wireless transmitting apparatus of the invention shown in FIGS. 16, 19, 21, and 22 will be explained with reference to FIGS. 24 and 25. Here, a comparison of packet error rate characteristics is made using computer simulation. FIG. 24 illustrates parameter comparison conditions in this example. It is here assumed that modulation is by QPSK, the channel is a single-path Rayleigh fading channel, and that a short packet with a data packet length of 16 bytes (128 symbols) is used. There are five pilot signals, each having a length of four symbols. A comparison is made of packet error rates of an apparatus without receive diversity and one with two-branch receive diversity with maximal ratio combining in a case where synchronization is made ideal.

Figure 25:
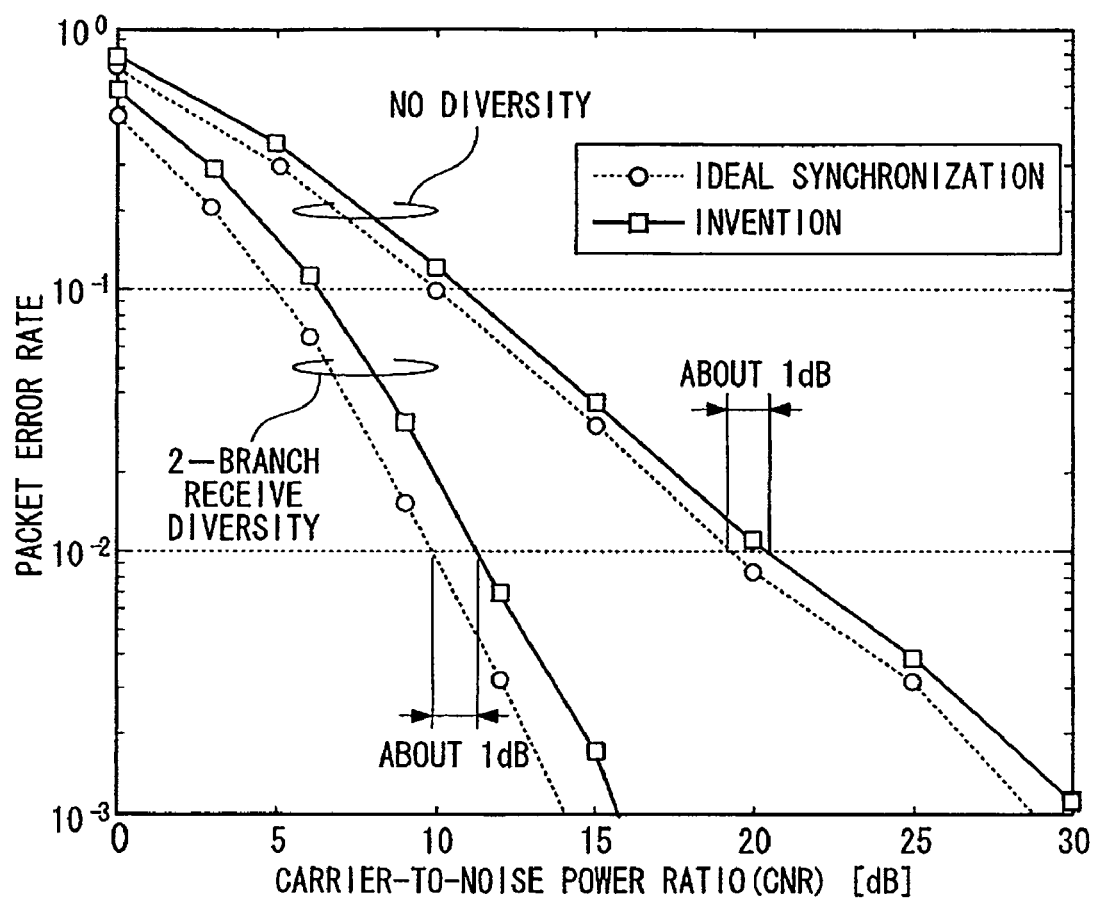
FIG. 25 is a diagram of performances in a second example.
Figure 26:
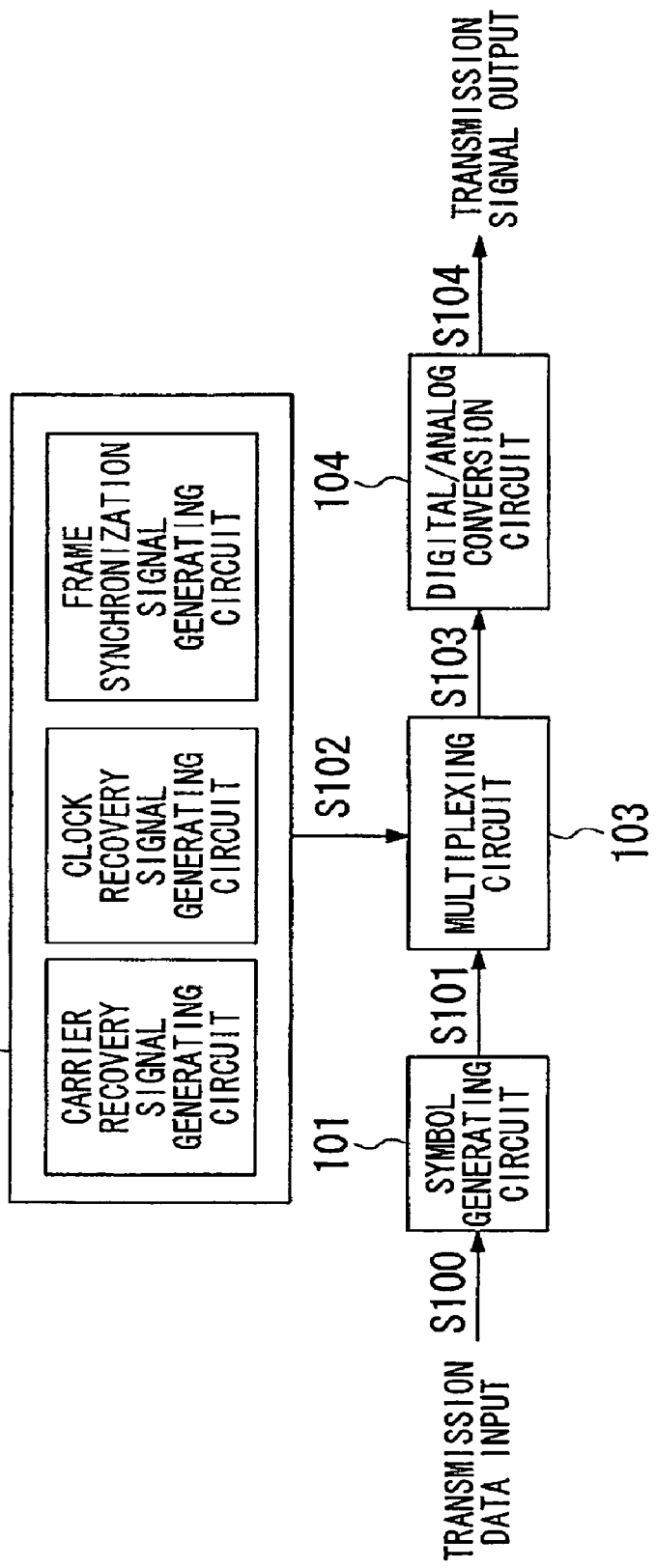
FIG. 26 is a block diagram of an embodiment of a conventional wireless transmitting apparatus.

FIG. 25 is a diagram of packet error rate characteristics against carrier-to-noise power ratio in the second example. In this example of the invention, overall characteristic deterioration including carrier frequency recovery, symbol timing recovery, frame synchronization, and channel distortion correction are compared with performances in a case when each type of synchronization is made ideal, the CNR being set to that required to obtain a packet error rate of 10-2, thereby enabling deterioration to be controlled to approximately 1 dB. On the other hand, by using the invention, a high transmission efficiency (frame efficiency) of 86% can be achieved.

Subsequently, a fourteenth embodiment of the invention will be explained.

Figure 29:
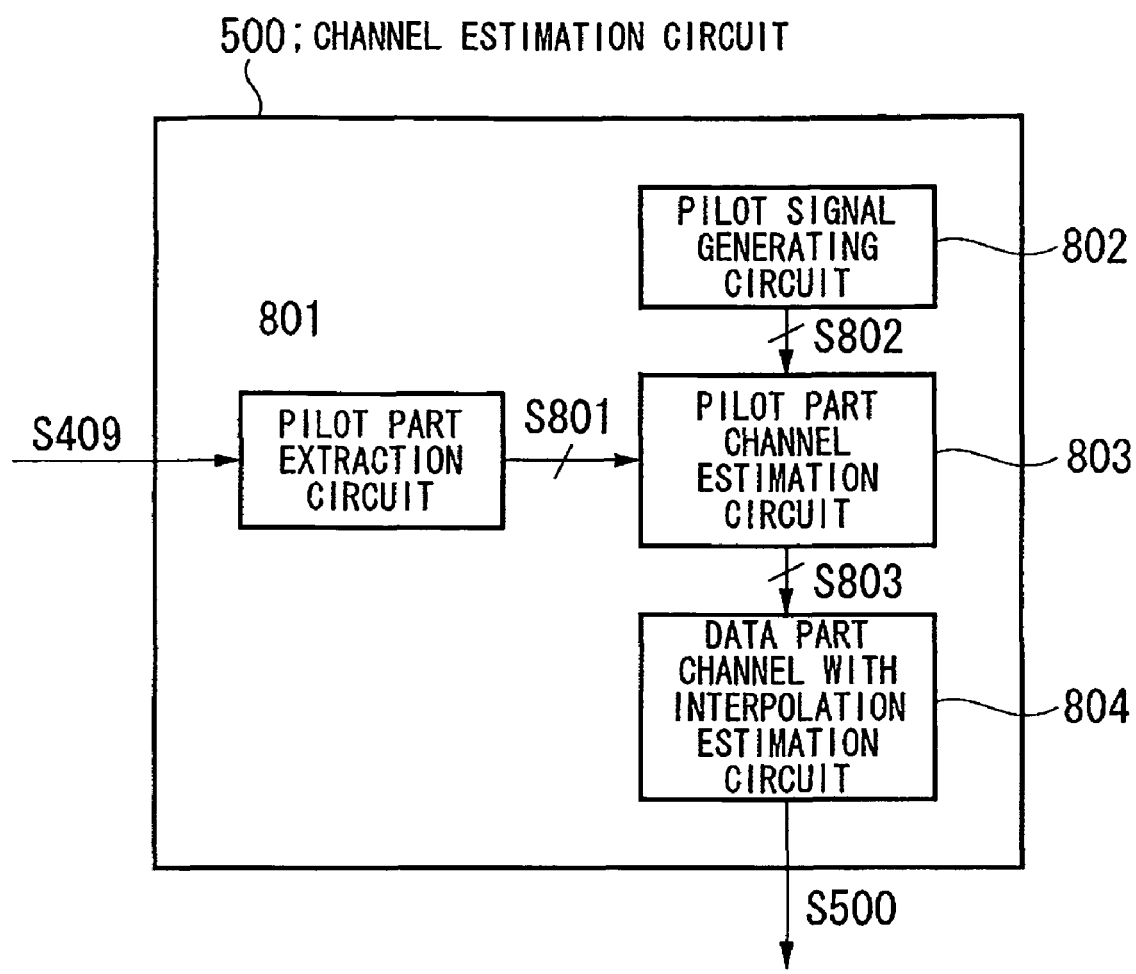
FIG. 29 is a diagram of an embodiment (fourteenth embodiment) of a channel estimation circuit in a wireless receiving apparatus of the invention.

FIG. 29 is an example configuration of a channel estimation circuit in a wireless receiving apparatus of the invention.

FIG. 29 corresponds to the example configuration of the channel estimation circuit in the wireless receiving apparatus shown in FIG. 21.

In this channel estimation circuit, a carrier frequency-corrected received burst signal S409 is input to a pilot extraction circuit 801, which extracts only the pilot part of the received burst signal. A pilot signal generating circuit 802 generates a pilot signal S802 identical to the pilot signal shown above in the tenth embodiment. Using the pilot extraction circuit 801 extracted from the carrier frequency correction circuit 409 and the pilot signal S802 generated by the pilot signal generating circuit 802, a pilot part channel estimation circuit 803 outputs information related to channel distortion S803 for each pilot position. Using the information related to channel distortion S803 for each pilot position, a data part channel interpolation estimation circuit 804 performs an interpolation estimation for channel distortion of the data signal part, and outputs information related to channel distortion S500 for the entire received burst.

FIG. 29 is an example configuration of a channel estimation circuit 500, where the pilot part channel estimation circuit 803 estimates a channel at each pilot position. Since the pilot signal S801 extracted from the received burst is encoded for information for frame synchronization relating to amplitude-phase fluctuation, i.e. information related to channel distortion, can be extracted by removing coding data using the pilot signal S802 known beforehand. Moreover, since the pilot signal includes a plurality of symbols, channel distortion estimation errors caused by noise can be reduced by averaging channel data obtained from the pilot symbols. This makes it possible to perform superior channel estimation in regions of low CNR, and to output highly precise information related to channel distortion S803 at each pilot position. If symbol m of the nth pilot in the received pilot signal S801 is sn(mT), and symbol m of the nth pilot in the generated pilot signal S802 is Um,n, information related to channel distortion S803 at pilot position n is determined as $$h_{est}(P_n) = \frac{1}{N_p}\sum_{m=1}^{N_p} u^*_{m,n} \times s_n(mT)(1 \leq n \leq N_q) \quad \text{[Equation 10]}$$

Incidentally, Um,n, is determined as $$U = \begin{pmatrix} u_1 \\ u_2 \\ \vdots \\ u_{N_p} \end{pmatrix} = \begin{pmatrix} u_{1,1} & u_{1,2} & \cdots & u_{1,N_q-1} & u_{1,N_q} \\ u_{2,1} & u_{2,2} & \cdots & u_{2,N_q-1} & u_{2,N_q} \\ \vdots & \vdots & \ddots & \vdots & \vdots \\ u_{N_p,1} & u_{N_p,2} & \cdots & u_{N_p,N_q-1} & u_{N_p,N_q} \end{pmatrix} \quad \text{[Equation 11]}$$

Due to fading, channel distortion in the received burst becomes continuous amplitude-phase fluctuation. Therefore, the data part channel interpolation estimation circuit 804 can use information related to channel distortion S803 at each cyclically inserted pilot position to make an interpolation estimation of channel distortion in the data part, and output this as information related to channel distortion S804. Any insertion method can be used for channel distortion. Examples include linear interpolation from information related to channel distortion of pilots at both ends of the data part on a constellation plane, simple averaging using a plurality of pilots near the data part, spline interpolation using a plurality of pilots near the data part, and Nyquist insertion interpolation using all the pilots.

Example 3

Figure 30:
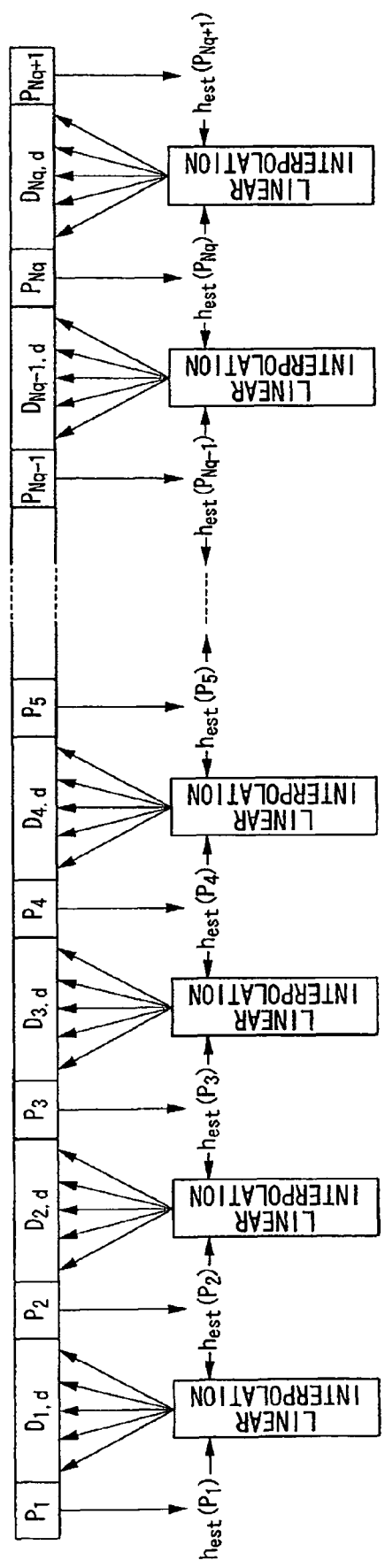
FIG. 30 is a A diagram of a channel linear interpolation estimation method in a third example.

FIG. 30 is a diagram of an example of a channel linear interpolation estimation method in a third example of the invention.

Figure 31:
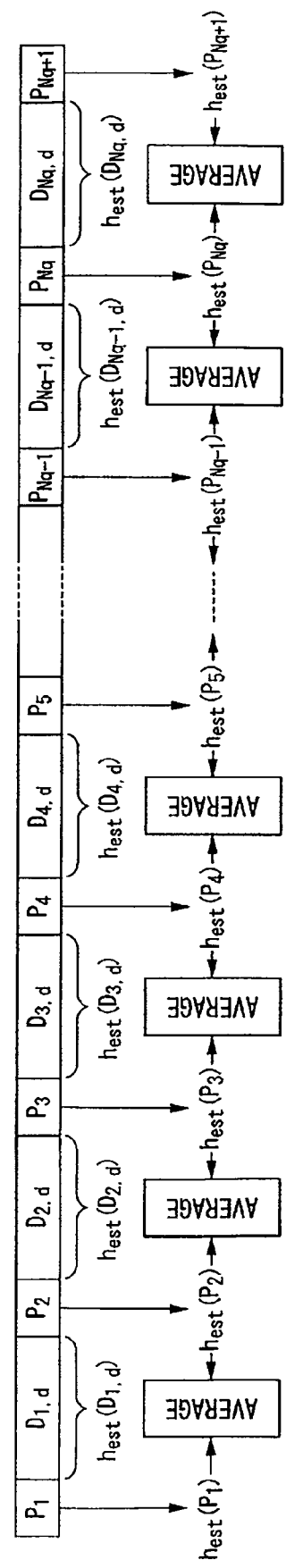
FIG. 31 is a first diagram of a channel averaging interpolation estimation method in a third example.

FIG. 31 is a first diagram of an example of a channel averaging interpolation estimation method in the third example of the invention.

Figure 32:
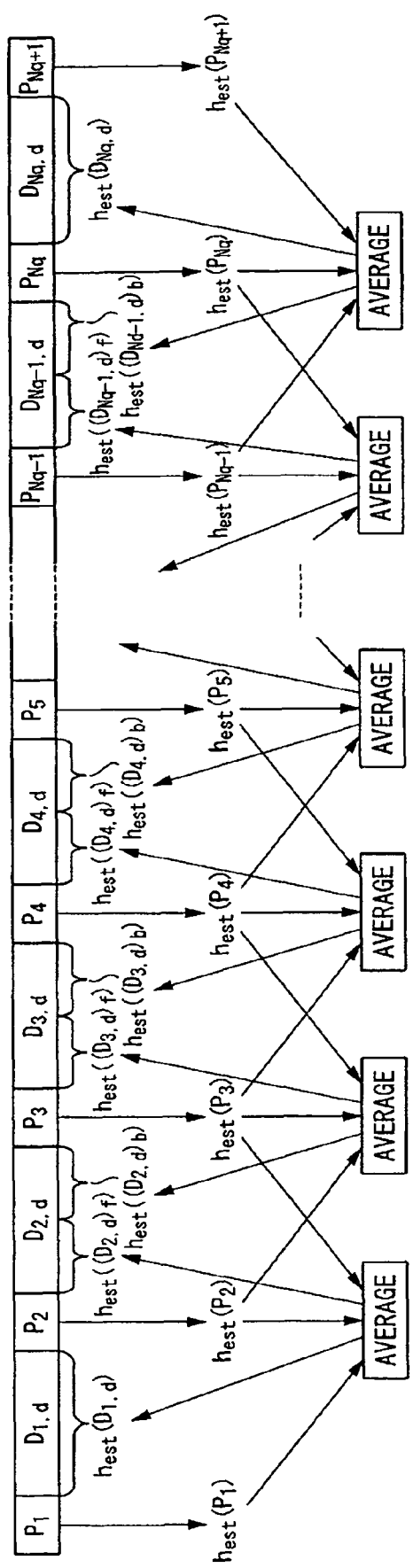
FIG. 32 is a second diagram of a channel averaging interpolation estimation method in a third example.

FIG. 32 is a second diagram of an example of a channel linear interpolation estimation method in the third example of the invention.

FIG. 33 is a diagram of parameter comparison conditions in the third example of the invention.

Figure 34:
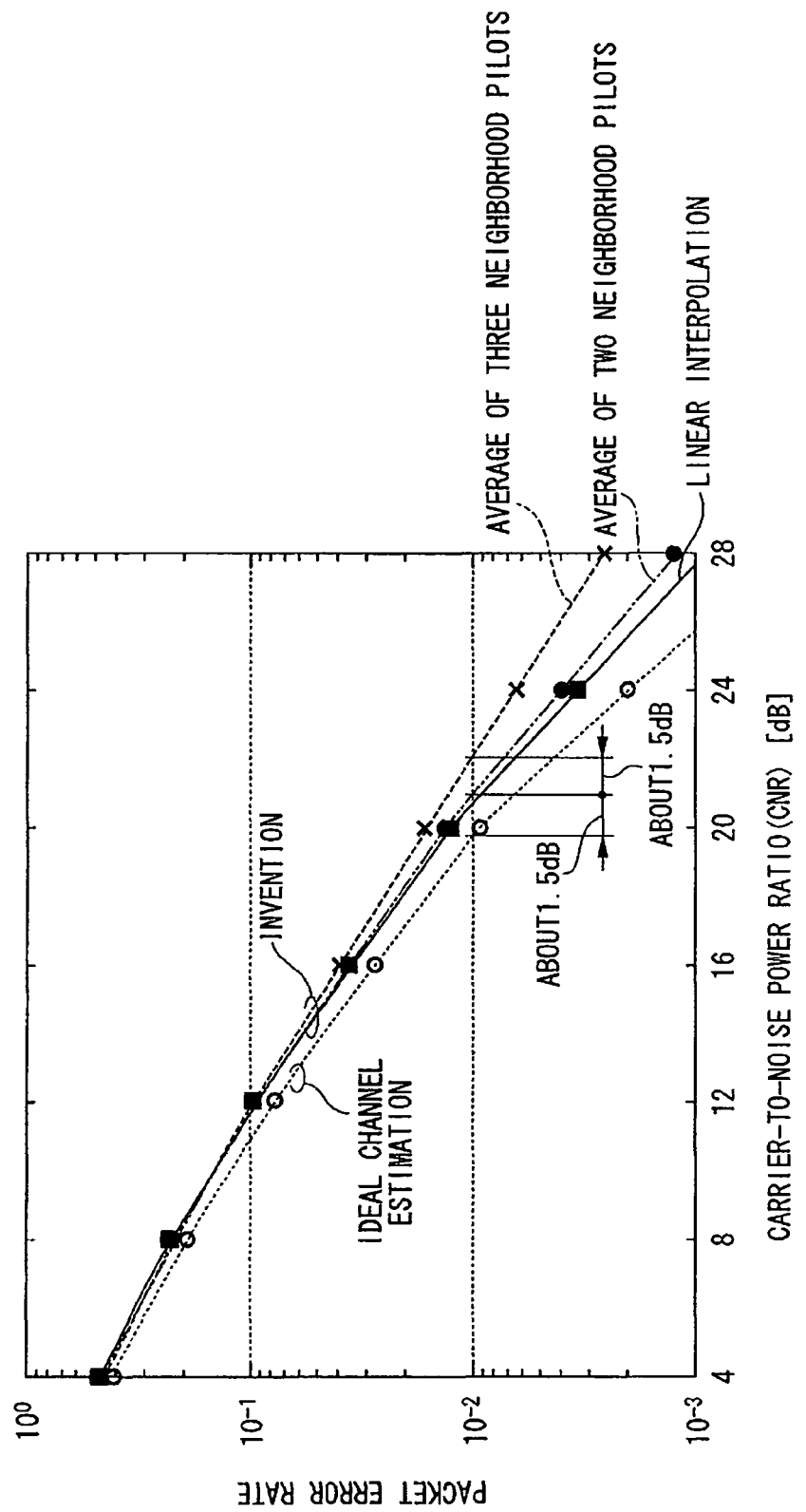
FIG. 34 is a diagram of performances in a third example.

FIG. 34 is a diagram of performances in a third example of the invention.

An example using the wireless transmitting apparatus and the wireless receiving apparatus of the invention shown in FIGS. 16, 19, 21, 22, and 29 will be explained with reference to FIGS. 30, 31, 32, 33, and 34. Packet error rate (PER) characteristics for different channel interpolation methods will be compared using computer simulations.

As shown in FIG. 30, an interpolation method in the third example uses information related to channel distortion of pilot apparatuses at both ends of a data part to linearly interpolate channel distortion of the data part for each symbol. In comparison with methods such as spline interpolation and Nyquist interpolation, computation is simple, the size of the circuit can be reduced, and installation is easy.

In comparison with this linear interpolation method, the method of simply averaging information related to channel distortion at a plurality of pilot positions that are nearest the data part, and interpolating this as channel distortion of the data part, as shown in FIGS. 31 and 32, interpolates information related to channel distortion for each of a plurality of symbol blocks instead of each symbol. Since computation can be further simplified, the size of the circuit is smaller and installation is easy.

As shown in FIG. 33, parameter conditions in the third example assume that QPSK modulation is used, the channel is a single-path Rayleigh fading, and that a short packet having a data length of 16 bytes (128 symbol) are used. There are five pilot signals, each having a length of four symbols. For purposes of comparison, evaluation was also made of a case where channel estimation is ideal, and the respective packet error rates were compared.

As shown in FIG. 34, in a comparison between cases using linear interpolation and a two nearest pilot average, and a case where the channel estimation is ideal, packet error rate characteristics with respect to carrier-to-noise power ratio in each case can be suppressed to approximately 1.5 dB with CNR required for PER=10-2. According to literature such as 'Sampei, S. and Sunaga T., "Rayleigh fading compensation for QAM in land mobile radio communications." Trans. IEEE Veh. Technol., Vol. 42, No. 2, pp. 137-47, May 1993', deterioration from the logical values in pilot symbol method is known to be approximately 2 dB, and the method of the invention can therefore be described as sufficiently durable for practical use.

As shown in FIG. 34, when a three nearest pilot average is used, required CNR characteristics further deteriorate by approximately 1.5 dB from the two nearest pilot average. This is due to deterioration in the precision of channel tracking as the pilot average interval increases. However, since noise resistance is increased by using a greater number of pilot signals in the interpolation, the effect increases when the applied CNR region has decreased as a result of a change in the anticipated fading model or concomitant use of diversity technology, making this method very suitable for practical use.

FIG. 35 is a diagram of parameter conditions in a fourth example of the invention.

Figure 36:
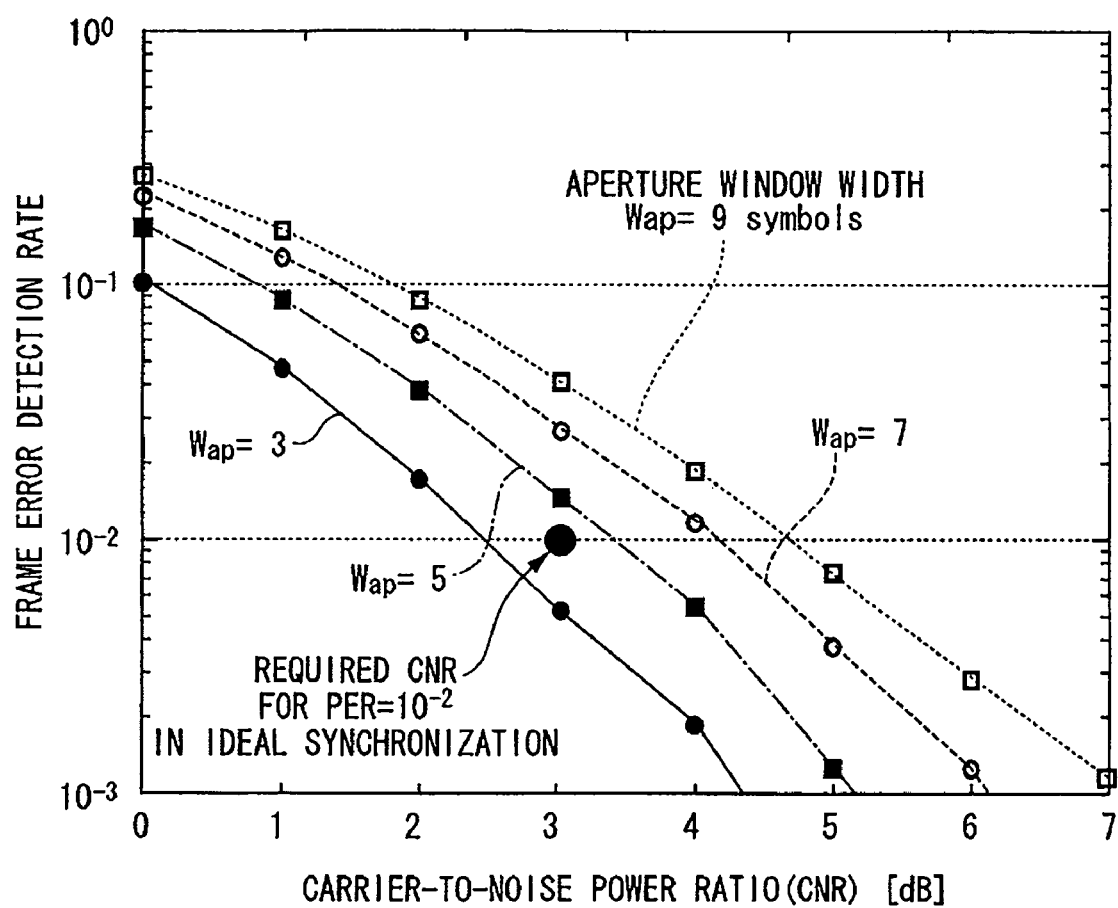
FIG. 36 is a first diagram of performances in a fourth example.

FIG. 36 is a first diagram of performances in the fourth example of the invention.

Figure 37:
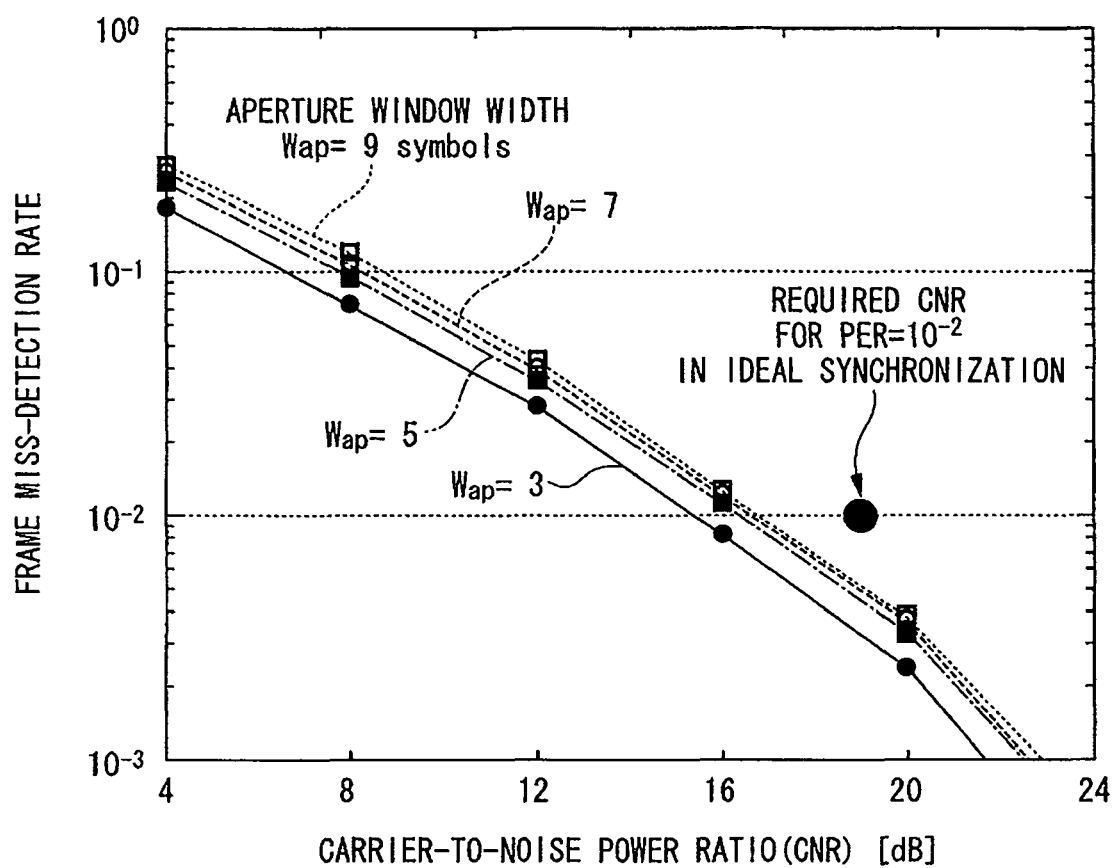
FIG. 37 is a second diagram of performances in a fourth example.

FIG. 37 is a second diagram of performances in the fourth example of the invention.

Figure 38:
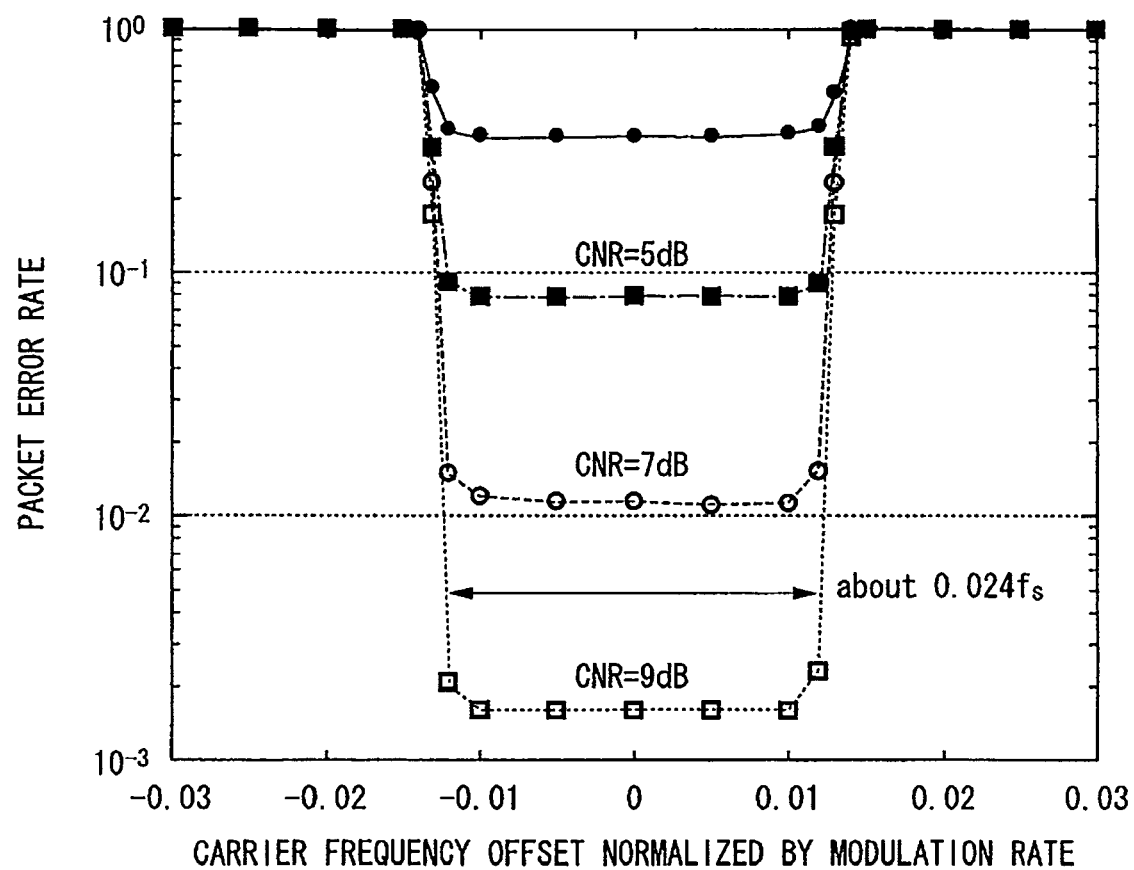
FIG. 38 is a third diagram of performances in a fourth example.

FIG. 38 is a third diagram of performances in the fourth example of the invention.

Figure 39:
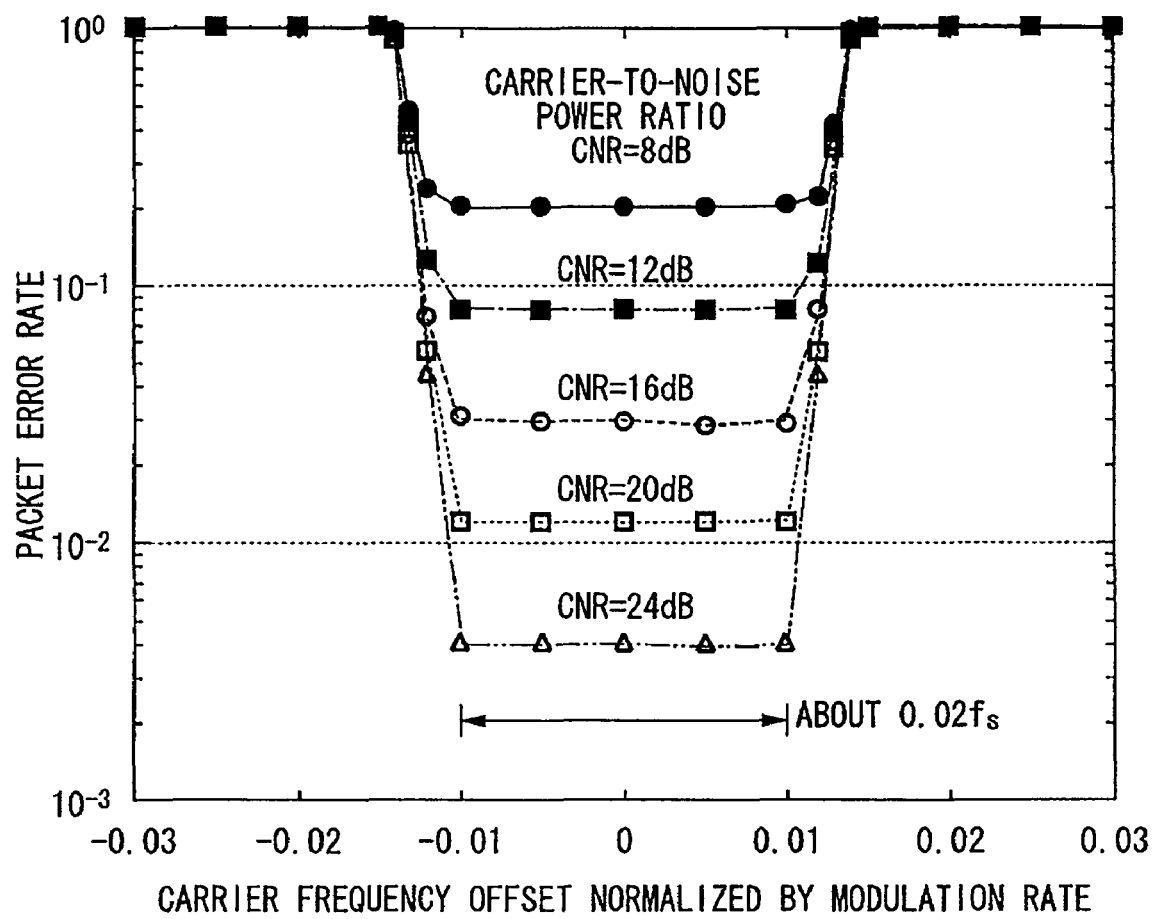
FIG. 39 is a fourth diagram of performances in a fourth example.

FIG. 39 is a fourth diagram of performances in the fourth example of the invention.

Figure 40:
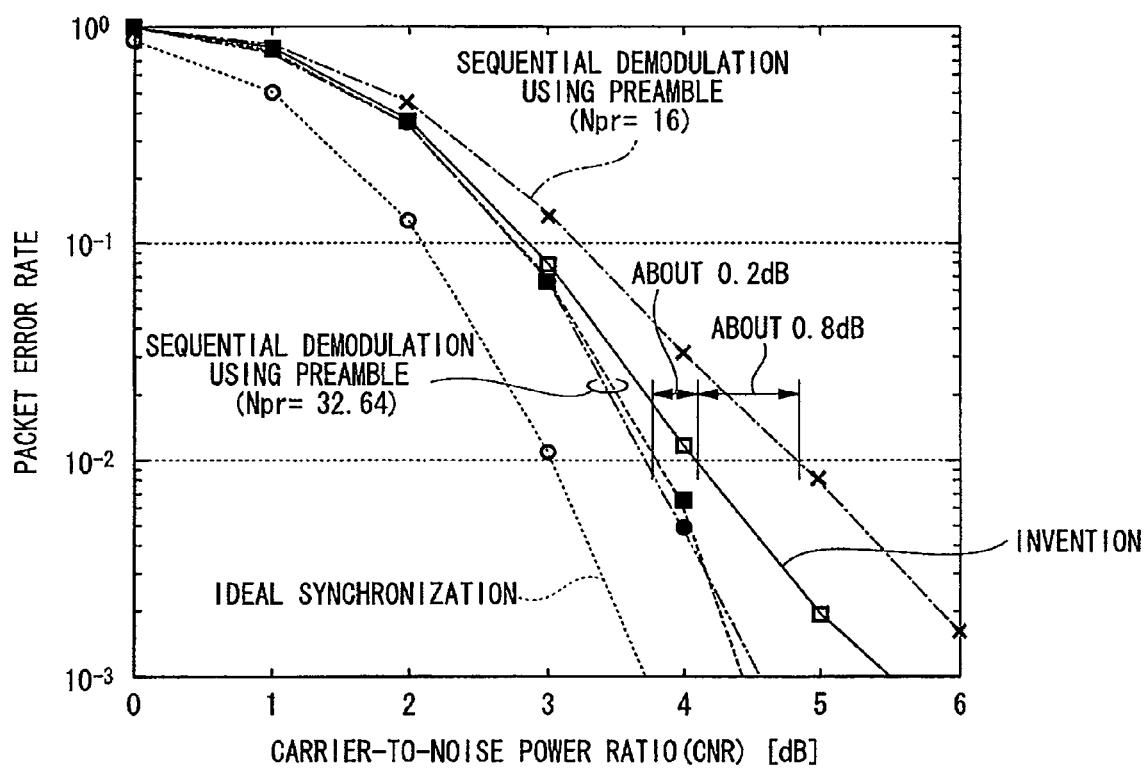
FIG. 40 is a fifth diagram of performances in a fourth example.

FIG. 40 is a fifth diagram of performances in the fourth example of the invention.

Figure 41:
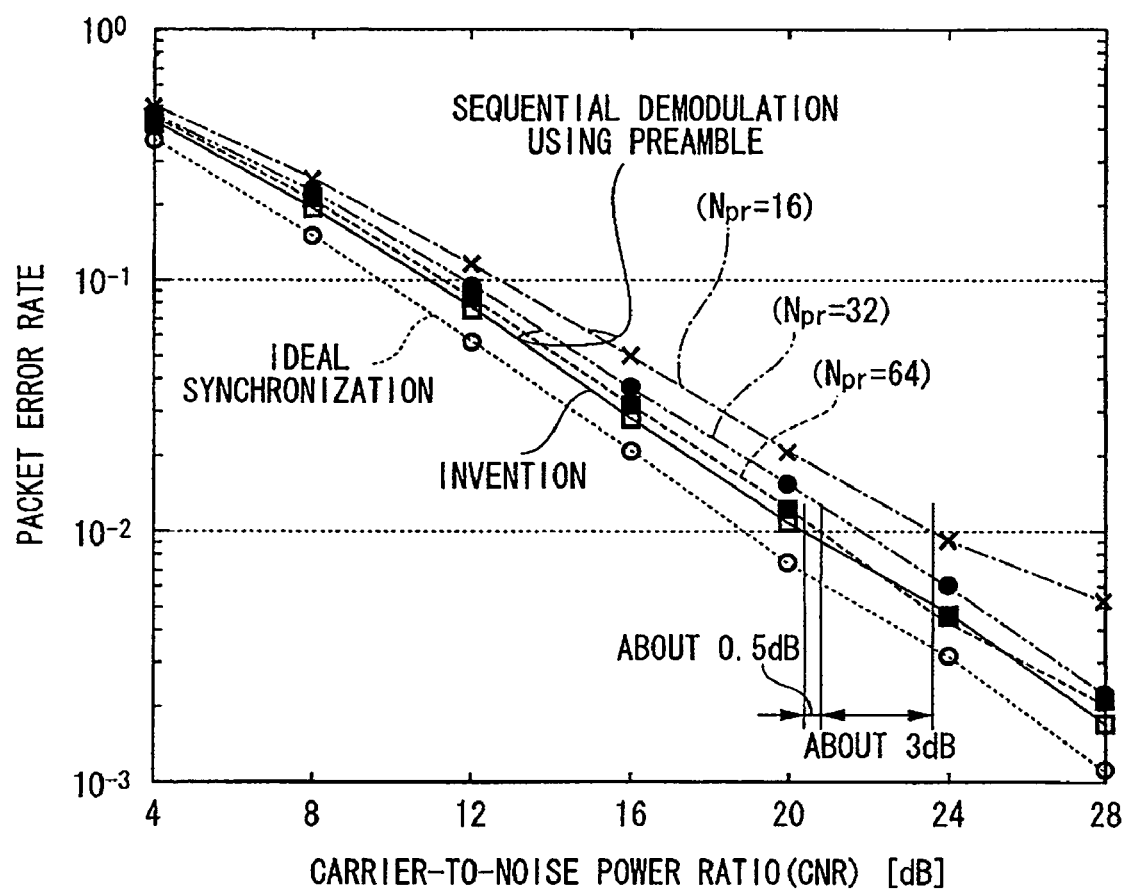
FIG. 41 is a sixth diagram of performances in a fourth example.

FIG. 41 is a sixth diagram of performances in the fourth example of the invention.

A fourth example using embodiments of the wireless receiving apparatus and the wireless transmitting apparatus in the invention shown in FIGS. 16, 19, 21, 22, and 29 will be explained with reference to FIGS. 35, 36, 37, 38, 39, 40, and 41. Here, comparisons are made using computer simulations for frame miss-detection rate characteristics, carrier frequency synchronization performances, and packet error rate (PER) as overall performances.

As shown in FIG. 35, parameter comparison conditions in the fourth example assume that modulation is by QPSK, the channel is an additive white Gaussian noise (AWGN) or a single-path Rayleigh fading channel, and a short packet with a data length of 16 bytes (128 symbols) is used. There are five pilot signals, each having a length of four symbols. For comparison, in addition to the embodiment of the invention, synchronization performances in cases where various types of synchronization are made ideal, and a sequential demodulation method using a preamble, were also evaluated and compared.

FIGS. 36 and 37 are frame miss-detection rate characteristics with respect to carrier-to-noise power ratio, representing comparisons between cases where aperture window width Wap was 3, 5, 7, and 9. In FIG. 36, only an AWGN channel was considered. At a narrow aperture window width Wap of 3, the CNR required for a frame miss-detection rate of 10-2 is 2.5 dB. As shown later in FIG. 40, since the CNR required for a PER of 10-2 is 3.0 dB when synchronization is made ideal, the frame miss-detection rate in this case has negligible effect on the packet transmission performances. Of course, even when Wap>3, although there is a slight effect on packet error rate characteristics as overall performances, the frame synchronization rate is adequate for practical use. Thus by using the invention, highly precise frame synchronization can be anticipated.

In contrast to when synchronization is made ideal as shown in FIG. 41 described below, where the CNR required for a frame miss-detection rate of 10-2 is 19 dB, in FIG. 37, which assumes that the channel model is a single-path Rayleigh fading, the CNR required for a frame miss-detection rate of 10-2 is approximately 15 dB for Wap=3 and approximately 17 dB for Wap=5 to 9, achieving a sufficient margin of more than 2 dB in each case. In other words, frame synchronization performances obtained by implementing the invention can be described as having almost no effect on deterioration in packet error rate characteristics as overall performances.

FIGS. 38 and 39 are carrier frequency synchronization performances in this example. In FIGS. 38 and 39, the horizontal axis represents carrier frequency offset between the transmitting and receiving apparatuses, and the vertical axis represents the packet error rate. The carrier frequency offset value is normalized to the modulation rate fs. Carrier frequency synchronization performances are shown for different CNR values. FIG. 38 considers only AWGN as the channel, whereas FIG. 39 assumes a single-path Rayleigh fading. Both have a pull-in range of approximately 0.02 to 0.024 fs, and achieve remarkably flat and excellent performances in the pull-in range. Carrier frequency synchronization performances obtained by the invention can therefore be described as balanced and excellent whatever the channel model.

FIGS. 40 and 41 are comparisons between packet error rate characteristics of a configuration of the invention in this example and of a sequential demodulation method. In the sequential demodulation method, the preamble length Npr is changed to 16, 32, and 64 symbols. In FIG. 40, where only AWGN is considered as the channel model, in the sequential demodulation method using a preamble, characteristics saturate to Npr≧32. At this time, in the configuration of the invention which does not use a preamble, the CNR required for PER=10-2 deteriorates by only 0.2 dB. Meanwhile, as shown in FIG. 35, the transmission efficiency (frame efficiency) greatly increases from between 60% and 71% to 86%. In FIG. 41, which assumes a single-path Rayleigh fading channel, in the sequential demodulation method using a preamble, the packet error rate characteristics gradually improve as the preamble length is increased. In contrast in the configuration of the invention which does not use a preamble, the CNR required for a packet error rate of 10-2 further increases by approximately 0.5 to 3 dB. Simultaneously, as also shown in FIG. 35, the transmission efficiency (frame efficiency) of the sequential demodulation method, which was between 60% and 78%, is increased to 86% by the configuration of the invention. Thus implementation of the invention can simultaneously enhance the packet error rate and the transmission efficiency (frame efficiency).

Example 5

Figure 42:
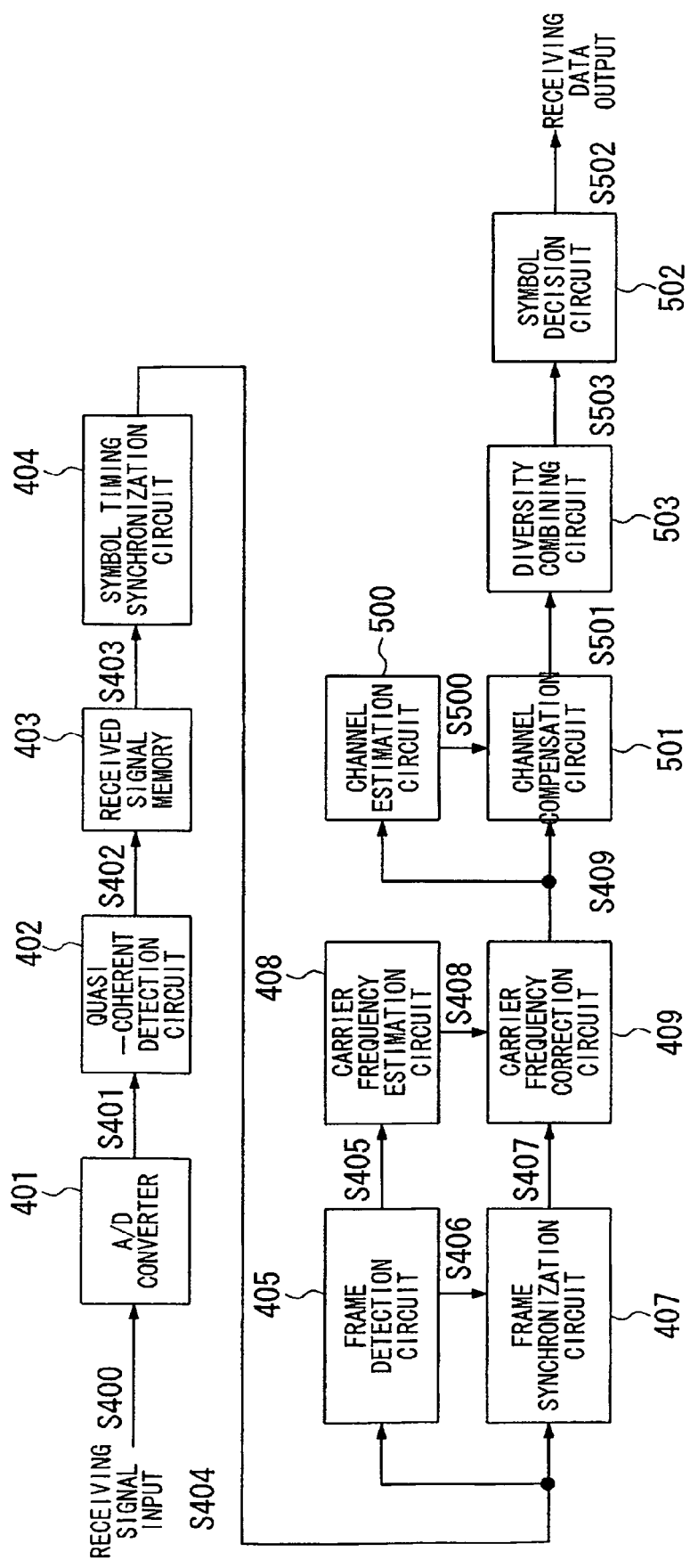
FIG. 42 is a block diagram of a wireless receiving apparatus when diversity technology is used in a fifth example.

FIG. 42 is a block diagram of a wireless receiving apparatus using diversity technology.

A wireless receiving apparatus includes a plurality of antennas, and, as shown in FIG. 42, when receiving signals by diversity technology, a diversity combining circuit 503 is provided to combine signals received from each of the plurality of antennas. FIG. 42 is an example where a diversity synthesis circuit is provided between the channel compensation circuit 501 and the symbol decision circuit 502 the of the wireless receiving apparatus shown in FIG. 21.

Subsequently, test results obtained when using diversity technology in a wireless receiving apparatus will be explained using FIG. 42.

The wireless receiving apparatus of FIG. 42 was used in a test, with a fading simulator connected between a wireless transmitting apparatus and the wireless receiving apparatus. To verify space diversity performances, the wireless receiving apparatus is configured to allow maximum-ratio synthetic diversity reception having a maximum of three branches.

FIG. 43 is a diagram of apparatus conditions and measurement conditions in a test.

The modulation method was π/4-QPSK, the carrier frequency band was 280 MHz, and the propagation channel was an independent non-correlated single-path Rayleigh fading. The data packet length was a short packet of 16 bytes.

Figure 44:
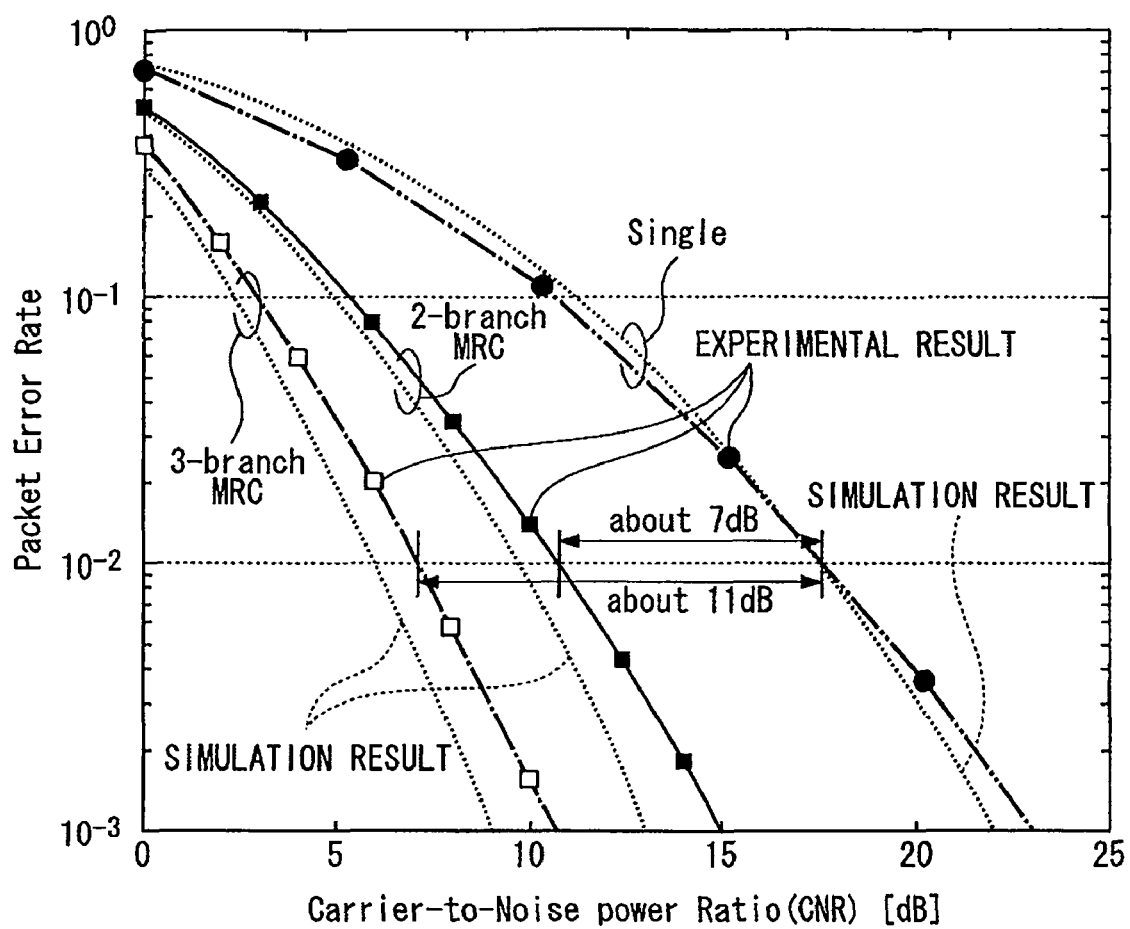
FIG. 44 is a diagram of packet error performances in a test of a fifth example.

FIG. 44 is a diagram of packet error characteristics in the test result.

For comparison, FIG. 44 also illustrates results of computer simulations. Since the difference between the test values and the simulation values is never more than 1 dB for each number of reception branches, the configuration of FIG. 42 is clearly highly practical. In comparison with single reception, CNR required for PER=10-2 is approximately 7 dB in two-branch reception, and approximately 11 dB in three-branch reception; the text therefore confirms that a diversity effect is obtained, and that the invention is highly effective and practical when combined with diversity technology.

The invention claimed is:

1. A wireless transmitting apparatus comprising:
a symbol generating circuit that converts a transmission data bit stream to a data symbol sequence;
a training signal generating circuit that generates a training signal including information for carrier recovery, information for clock recovery, and information for frame synchronization;
a multiplex circuit that multiplexes said training signal and said data symbol sequence, and generates a transmission burst signal; and
a digital-to-analog conversion circuit that performs a digital-to-analog conversion of said transmission burst signal,
wherein the training signal generated by said training signal generating circuit is inserted into a transmission burst as a pilot signal at fixed symbol intervals by said multiplex circuit,
wherein said training signal generating circuit comprises:
a synchronization code sequence generating circuit that generates a synchronization code sequence signal for frame synchronization;
a differential encoding circuit that differentially encodes said synchronization code sequence signal; and
an interleave circuit that interleaves said differentially encoded synchronization code sequence signal.

2. The wireless transmitting apparatus according to claim 1, wherein said synchronization code sequence generating circuit generates and outputs a synchronization code sequence matrix having Np rows (Np=number of symbols in one pilot signal inserted to burst signal) and Nq−1 columns (Nq=number of pilot signals inserted to burst signal);

said differential encoding circuit generates a differentially encoded matrix by differentially encoding said synchronization code sequence matrix in the row direction with respect to an initial burst vector; and said interleave circuit rearranges said differentially encoded matrix such that an element at row m and column n corresponds to a pilot pattern of symbol m of an nth pilot signal.

3. A wireless receiving apparatus that performs wireless communication connection with a wireless transmitting apparatus which comprises:
a symbol generating circuit that converts a transmission data bit stream to a data symbol sequence;
a training signal generating circuit that generates a training signal including information for carrier recovery, information for clock recovery, and information for frame synchronization;
a multiplex circuit that multiplexes said training signal and said data symbol sequence, and generates a transmission burst signal; and
a digital-to-analog conversion circuit that performs a digital-to-analog conversion of said transmission burst signal,
the training signal generated by said training signal generating circuit being inserted into a transmission burst as a pilot signal at fixed symbol intervals by said multiplex circuit, and
the wireless receiving apparatus comprising:
a receiving circuit that receives a wireless burst signal transmitted from said wireless transmitting apparatus;
an analog-to-digital conversion circuit that performs an analog-to-digital conversion of said received burst signal;
a symbol timing synchronization circuit that performs symbol timing synchronization using the received burst signal that was subject to analog-to-digital conversion;
a frame detection circuit that detects a frame position from the received burst signal for which symbol timing was established, and extracts a pilot signal;
a frame synchronization circuit that performs frame synchronization using data relating to said detected frame position;
a carrier frequency estimation circuit that performs a carrier frequency estimation using pilot signal data extracted by said frame detection circuit;
a carrier frequency correction circuit that performs carrier frequency correction of the received burst signal for which symbol timing was established, using said estimated carrier frequency;
a channel estimation circuit that estimates channel distortion based on said frequency-corrected received burst signal, and outputs information related to channel distortion;
a channel compensation circuit that corrects channel distortion of said frequency-corrected received burst signal, using said information related to channel distortion; and
a symbol decision circuit that converts a data symbol sequence of said channel-compensated received burst signal to a received data bit stream,
wherein said training signal generating circuit comprises:
a synchronization code sequence generating circuit that generates a synchronization code sequence signal for frame synchronization;
a differential encoding circuit that differentially encodes said synchronization code sequence signal; and an interleave circuit that interleaves said differentially encoded synchronization code sequence signal.

4. The wireless receiving apparatus according to claim 3, wherein said frame detection circuit detects said frame position by being comprised of
- a synchronization encoding sequence generating circuit that generates a synchronization code sequence signal for frame synchronization; differential encoding circuit that differentially encodes said synchronization code sequence signal; interleave circuit that interleaves said differentially encoded synchronization code sequence signal;
- a training signal generating circuit that generates a training signal including information for carrier recovery, information for clock recovery, and information for frame synchronization;
- a pilot signal extraction circuit that extracts a pilot signal from a received burst signal for which symbol timing was established; and
- a correlation value calculation circuit that calculates a correlation value using a pilot signal extracted from said received burst signal and a pilot signal sequence generated by said training signal generating circuit.

5. The wireless receiving apparatus according to claim 3, wherein said channel frequency estimation circuit estimates the carrier frequency by detecting the phase of an autocorrelation summation output by autocorrelation-summation calculation circuit that calculates an autocorrelation value using a pilot signal extracted from said received burst signal and a pilot signal sequence generated by said training signal generating circuit.

6. The wireless receiving apparatus according to claim 3, wherein said frame detection circuit comprises:
- a synchronization encoding sequence generating circuit that generates a synchronization code sequence signal for frame synchronization; differential encoding circuit that differentially encodes said synchronization code sequence signal; and interleave circuit that interleaves said differentially encoded synchronization code sequence signal; training signal generating circuit that generates a training signal including information for carrier recovery, information for clock recovery, and information for frame synchronization;
- a pilot signal extraction circuit that extracts a pilot signal from a received burst signal for which symbol timing was established;
- a correlation value calculation circuit that calculates a correlation value using a pilot signal extracted from said received burst signal and a pilot signal sequence generated by said training signal generating circuit; and
- an autocorrelation-summation calculation circuit calculating a summation of said autocorrelations using correlation values calculated by said correlation value calculation circuit.

7. The wireless receiving apparatus according to claim 5, wherein
said carrier frequency estimation circuit further comprising frequency offset addition/subtraction circuit that generate and output a plurality of estimated carrier frequencies by adding/subtracting a plurality of frequency offset values to a precise estimation result; and
said carrier frequency correction circuit generates a plurality of frequency-corrected received burst signals by performing carrier frequency correction to the received burst signal using the plurality of estimated carrier frequencies generated by said frequency offset addition/subtraction circuit.

8. The wireless receiving apparatus according to claim 7, further comprising maximum likelihood decision circuit that performs a maximum likelihood decision with respect to said plurality of frequency-corrected received burst signals, and determines one of them, said channel estimation circuit and said channel compensation circuit executing channel estimation and channel compensation with respect to said determined frequency-corrected received burst signal; and
- a symbol decision circuit that performs a symbol decision with respect to said received burst signal whose channel was corrected by said channel compensation circuit.

9. The wireless receiving apparatus according to claim 7, wherein said channel estimation circuit and said channel compensation circuit execute channel estimation and channel compensation with respect to each of said frequency-corrected received burst signals; and further comprising
- a maximum likelihood decision circuit that performs a maximum likelihood decision with respect to said plurality of channel-compensated received burst signals, and selects one frequency-corrected received burst signal; and
- a symbol decision circuit that performs a symbol decision with respect to said received burst signal selected by said maximum likelihood decision circuit.

10. The wireless receiving apparatus according to claim 7, wherein said channel estimation circuit and said channel compensation circuit execute channel estimation and channel compensation with respect to each of said frequency-corrected received burst signals; and further comprising
- a symbol decision circuit that performs a symbol decision with respect to said plurality of received burst signals whose channels were corrected by said channel compensation circuit; and
- an error detection determination selection circuit that performs error detection determination selection with respect to said plurality of received burst data signals that have been subjected to symbol decision, and determines a desired received burst data signal.

11. The wireless receiving apparatus according to claim 7, wherein said channel estimation circuit and said channel compensation circuit execute channel estimation and channel compensation with respect to each of said frequency-corrected received burst signals; and further comprising
- a symbol decision circuit that performs a symbol decision with respect to said plurality of channel-compensated received burst signals;
- an error detection determination selection circuit that performs error detection determination selection with respect to said plurality of received burst data signals that have been subjected to symbol decision; and
- a maximum likelihood decision circuit that, when there are a plurality of received burst signals in which no errors were detected by said error detection determination selection circuit, performs a maximum likelihood decision with respect to said plurality of channel-compensated received burst signals in which no errors were detected, and selects one frequency-corrected received burst signal.

12. The wireless receiving apparatus according to claim 7, wherein, in said frequency offset addition/subtraction circuit, the plurality of frequency offset values that are added/subtracted to/from said precise estimated value estimated by said channel frequency estimation circuit, are integral multiples of a reciprocal of the pilot signal insertion cycle in the received burst signal.

13. The wireless receiving apparatus according to claim 5, further comprising:
- a pulse-shaping filtering circuit for removing inter-symbol interference; and
- a pulse-shaping filtering being performed with respect to said received burst signal that has been subjected to symbol timing synchronization, and a received burst signal that has been subjected to pulse-shaping filtering being used in a rough estimation by said carrier frequency estimation circuit and in said carrier frequency correction circuit.

14. The wireless receiving apparatus according to claim 5, further comprising:
- a first pulse-shaping filtering circuit for removing inter-symbol interference;
- said first pulse-shaping filtering circuit performing pulse-shaping filtering to said received burst signal that was subjected to symbol timing synchronization;
- a received burst signal that has passed first pulse-shaping filtering circuit being used in a rough estimation made by said carrier frequency estimation circuit; and
- said carrier frequency correction circuit performing carrier frequency correction with respect to a received burst signal that does not pass said first pulse-shaping filtering circuit, and further comprising:
- a second pulse-shaping filtering circuit that performs pulse-shaping filtering to remove inter-symbol interference with respect to a received burst signal whose carrier frequency has been corrected by said carrier frequency correction circuit; and
- a received burst signal that has been subjected to pulse-shaping filtering by said second pulse-shaping filtering circuit being used in said channel estimation circuit and channel compensation circuit.

15. The wireless receiving apparatus according to claim 9 or 10, wherein said channel estimation circuit performs channel estimation processes in time-division with respect to a plurality of frequency-corrected received burst signals.

16. The wireless receiving apparatus according to claim 9 or 10, wherein said channel compensation circuit performs channel compensation processes with respect to a plurality of frequency-corrected received burst signals.

17. The wireless receiving apparatus according to claim 9 or 10, further comprising:
- a plurality of said channel estimation circuit, which performs parallel processes of channel estimation with respect to a plurality of frequency-corrected received burst signals.

18. The wireless receiving apparatus according to claim 9 or 10, further comprising:
- a plurality of said channel compensation circuit, which performs parallel processes of channel compensation with respect to a plurality of frequency-corrected received burst signals.

19. The wireless receiving apparatus according to claim 3, wherein said channel estimation circuit comprises
- a pilot signal extraction circuit that extracts a pilot signal from a frequency-corrected received burst signal;
- a training signal generating circuit that generates a pilot signal containing information for carrier recovery, information for clock recovery, and information for frame synchronization;
- a pilot part channel estimation circuit that uses a pilot signal extracted from said received signal and a pilot signal generated by said training signal generating circuit to perform channel distortion estimation at a pilot signal position; and
- a data part channel interpolation estimation circuit that uses information related to channel distortion of said pilot signal position to perform an interpolation estimation of channel distortion in a data signal part, and outputs information related to channel distortion for an entire received burst.

20. The wireless receiving apparatus according to claim 19, wherein said channel interpolation estimation circuit linearly interpolates on a constellation plane and outputs, as information related to channel distortion of the data signal part, information related to channel distortion of pilots at both ends of the data part at each symbol position.

21. The wireless receiving apparatus according to claim 19, wherein said channel interpolation estimation circuit simply averages on a constellation plane and outputs, as information related to channel distortion of the data signal part, information related to channel distortion at a plurality of pilot signal positions near a data part.

22. A wireless transmission method comprising:
- a symbol generating process of converting a transmission data bit stream to a data symbol sequence;
- a training signal generating process of generating a training signal including information for carrier recovery, information for clock recovery, and information for frame synchronization;
- a multiplex process of multiplexing said training signal and said data symbol sequence, and generating a transmission burst signal; and
- a digital-to-analog conversion process of performing a digital-to-analog conversion of said transmission burst signal; and
- the training signal generated in said training signal generating process being inserted into a transmission burst as a pilot signal at fixed symbol intervals by said multiplex process, wherein said training signal generating process comprises:
- a synchronization code sequence generating process of generating a synchronization code sequence signal for frame synchronization;
- a differential encoding process of differentially encoding said synchronization code sequence signal; and
- an interleave process of interleaving said differentially encoded synchronization code sequence signal.

23. The wireless transmission method according to claim 22, wherein said synchronization code sequence generating process generates and outputs a synchronization code sequence matrix having Np rows (Np=number of symbols in one pilot signal inserted to burst signal) and Nq−1 columns (Nq=number of pilot signals inserted to burst signal);
- said differential encoding process generates a differentially encoded matrix by differentially encoding said synchronization code sequence matrix in the row direction with respect to an initial burst vector; and
- said interleave process rearranges said differentially encoded matrix such that an element at row m and column n corresponds to a pilot pattern of symbol m of an nth pilot signal.

24. A wireless reception method in a wireless receiving apparatus which performs wireless communication connection with a wireless transmitting apparatus comprising:
- a symbol generating circuit that converts a transmission data bit stream to a data symbol sequence;

a training signal generating circuit that generates a training signal including information for carrier recovery, information for clock recovery, and information for frame synchronization;
a multiplex circuit that multiplexes said training signal and said data symbol sequence, and generates a transmission burst signal; and
a digital-to-analog conversion circuit that performs a digital-to-analog conversion of said transmission burst signal;
the training signal generated by said training signal generating circuit being inserted into a transmission burst as a pilot signal at fixed symbol intervals by said multiplex circuit;
the wireless reception method comprising:
a receiving process of receiving a wireless burst signal transmitted from said wireless transmitting apparatus;
an analog-to-digital conversion process of performing an analog-to-digital conversion of said received burst signal;
a symbol timing synchronization process of performing symbol timing synchronization using the received burst signal that was subject to analog-to-digital conversion;
a frame detection process of detecting a frame position from the received burst signal for which symbol timing was established, and extracting a pilot signal;
a frame synchronization process of performing frame synchronization using data relating to said detected frame position;
a carrier frequency estimation process of performing a carrier frequency estimation using pilot signal data extracted in said frame detection process;
a carrier frequency correction process of performing carrier frequency correction of the received burst signal for which symbol timing was established, using said estimated carrier frequency;
a channel estimation process of estimating channel distortion based on said frequency-corrected received burst signal, and outputs information related to channel distortion;
a channel compensation process of correcting channel distortion of said frequency-corrected received burst signal, using said information related to channel distortion; and
a symbol decision of converting a data symbol sequence of said channel-compensated received burst signal to a received data bit stream,
wherein said training signal generating process comprises:
a synchronization code sequence generating process of generating a synchronization code sequence signal for frame synchronization;
a differential encoding process of differentially encoding said synchronization code sequence signal; and
an interleave process of interleaving said differentially encoded synchronization code sequence signal.

25. The wireless reception method according to claim 24, wherein said frame detection process detects a frame by
a synchronization encoding sequence generating process of generating a synchronization code sequence signal for frame synchronization;
differential encoding process of differentially encoding said synchronization code sequence signal;
an interleave process of interleaving said differentially encoded synchronization code sequence signal;
a training signal generating process of generating a training signal including information for carrier recovery, information for clock recovery, and information for frame synchronization;
a pilot signal extraction process of extracting a pilot signal from a received burst signal for which symbol timing was established; and
a correlation value calculation process of calculating a correlation value using a pilot signal extracted from said received burst signal and a pilot signal sequence generated in said training signal generating process.

26. The wireless reception method according to claim 25, wherein said channel frequency estimation process estimates the carrier frequency by detecting the phase of an autocorrelation-summation output in an autocorrelation-summation calculation process of calculating an autocorrelation value using a pilot signal extracted from said received burst signal and a pilot signal sequence generated in said training signal generating process.

27. The wireless reception method according to claim 26, wherein said frame detection process comprises:
a synchronization encoding sequence generating process of generating a synchronization code sequence signal for frame synchronization;
a differential encoding process of differentially encoding said synchronization code sequence signal;
an interleave process of interleaving said differentially encoded synchronization code sequence signal;
a training signal generating process of generating a training signal including information for carrier recovery, information for clock recovery, and information for frame synchronization;
a pilot signal extraction process of extracting a pilot signal from a received burst signal for which symbol timing was established; and
a correlation value calculation process of calculating a correlation value using a pilot signal extracted from said received burst signal and a pilot signal sequence generated in said training signal generating process;
said autocorrelation-summation calculation process calculating a summation of said autocorrelation values using correlation values calculated in said correlation value calculation process.

28. The wireless reception method according to claim 26, wherein
said carrier frequency estimation process further comprises a frequency offset addition/subtraction process of generating and outputting a plurality of estimated carrier frequencies by adding/subtracting a plurality of frequency offset values to a precise estimation result; and
said carrier frequency correction process generating a plurality of frequency-corrected received burst signals by performing carrier frequency correction to a received burst signal using the plurality of estimated carrier frequencies generated in said frequency offset addition/subtraction process.

29. The wireless reception method according to claim 28, further comprising:
a maximum likelihood decision process of performing a maximum likelihood decision with respect to said plurality of frequency-corrected received burst signals, and determining one of them; in said channel estimation process and said channel compensation process, channel estimation and channel compensation being performed with respect to said determined frequency-corrected received burst signal; and a symbol decision process of performing a symbol decision with respect to said received burst signal whose channel was corrected in said channel compensation process.

30. The wireless reception method according to claim 28, wherein said channel estimation process and said channel compensation process perform channel estimation and channel compensation with respect to each of said frequency-corrected received burst signals, and further comprising:

a maximum likelihood decision process of performing a maximum likelihood decision with respect to said plurality of channel-compensated received burst signals, and selecting one frequency-corrected received burst signal; and a symbol decision process of performing a symbol decision with respect to said received burst signal selected in said maximum likelihood decision process.

31. The wireless reception method according to claim 28, wherein said channel estimation process and said channel compensation process perform channel estimation and channel compensation with respect to each of said frequency-corrected received burst signals, and further comprising:

a symbol decision process of performing a symbol decision with respect to said plurality of received burst signals whose channels were corrected in said channel compensation process; and an error detection determination selection process of performing error detection determination selection with respect to said plurality of received burst data signals that have been subjected to symbol decision, and determining a desired received burst data signal.

32. The wireless reception method according to claim 28, wherein said channel estimation process and said channel compensation process perform channel estimation and channel compensation with respect to each of said frequency-corrected received burst signals, and further comprising:

a symbol decision process of performing a symbol decision with respect to said plurality of channel-compensated received burst signals;

an error detection determination selection process of performing error detection determination selection with respect to said plurality of received burst data signals that have been subjected to symbol decision; and a maximum likelihood decision process of, when there are a plurality of received burst signals in which no errors were detected in said error detection determination selection process, performing a maximum likelihood decision with respect to said plurality of channel-compensated received burst signals in which no errors were detected, and selecting one frequency-corrected received burst signal.

33. The wireless reception method according to claim 28, wherein, in said frequency offset addition/subtraction process, the plurality of frequency offset values that are added/subtracted to/from said precise estimated value estimated in said channel frequency estimation process are integral multiples of a reciprocal of the pilot signal insertion cycle in the received burst signal.

34. The wireless reception method according to claim 26, further comprising:

a pulse-shaping filtering process for removing inter-symbol interference;

the pulse-shaping filtering process being performed with respect to said received burst signal that has been subjected to symbol timing synchronization, and a received burst signal that has been subjected to the pulse-shaping filtering process being used in a rough estimation in said carrier frequency estimation process and in said carrier frequency correction process.

35. The wireless reception method according to claim 26, further comprising:

a first pulse-shaping filtering process for removing inter-symbol interference; and wherein said first pulse-shaping filtering process performs pulse-shaping filtering to said received burst signal that was subjected to symbol timing synchronization;

a received burst signal that has passed said first pulse-shaping filtering process is used in a rough estimation made in said carrier frequency estimation process;

said carrier frequency correction process performs carrier frequency correction with respect to a received burst signal that does not pass said first pulse-shaping filtering process; and further comprising:

a second pulse-shaping filtering process of performing pulse-shaping filtering to remove inter-symbol interference with respect to a received burst signal whose carrier frequency has been corrected in said carrier frequency correction process; and wherein a received burst signal that has been subjected to pulse-shaping filtering in said second pulse-shaping filtering process is used in said channel estimation process and channel compensation process.

36. The wireless reception method according to claim 30 or 31, wherein said channel estimation process performs channel estimation processes in time-division with respect to a plurality of frequency-corrected received burst signals.

37. The wireless reception method according to claim 30 or 31, wherein said channel compensation process performs channel compensation processes with respect to a plurality of frequency-corrected received burst signals.

38. The wireless reception method according to claim 30 or 31, further comprising:

a plurality of said channel estimation process, which are performed in parallel with respect to a plurality of frequency-corrected received burst signals.

39. The wireless reception method according to claim 30 or 31, further comprising:

a plurality of said channel compensation processes, which are performed in parallel with respect to a plurality of frequency-corrected received burst signals.

40. The wireless reception method according to claim 24, wherein said channel estimation process comprises:

a pilot signal extraction process of extracting a pilot signal from a frequency-corrected received burst signal;

a training signal generating process of generating a pilot signal containing information for carrier recovery, information for clock recovery, and information for frame synchronization;

a pilot part channel estimation process of using a pilot signal extracted from said received signal and a pilot signal generated in said training signal generating process to perform channel distortion estimation at a pilot signal position; and a data part channel interpolation estimation process of using information related to channel distortion of said pilot signal position to perform an interpolation estimation of channel distortion in a data signal part, and outputting information related to channel distortion for an entire received burst.

41. The wireless reception method according to claim 40, wherein said channel interpolation estimation process linearly interpolates information related to channel distortion of pilots at both ends of the data part at each symbol position on a constellation plane and output as information related to channel distortion of the data signal part.

42. The wireless reception method according to claim 40, wherein said channel interpolation estimation process simply averages information related to channel distortion at a plurality of pilot signal positions near a data part on a constellation plane and output as information related to channel distortion of the data signal part.

43. A wireless communication system including a wireless receiving apparatus and a wireless transmitting apparatus,
said wireless transmitting apparatus comprising:
a symbol generating circuit that converts a transmission data bit stream to a data symbol sequence;
a training signal generating circuit that generates a training signal including information for carrier recovery, information for clock recovery, and information for frame synchronization;
a multiplex circuit that multiplexes said training signal and said data symbol sequence, and generates a transmission burst signal; and
a digital-to-analog conversion circuit that performs a digital-to-analog conversion of said transmission burst signal;
the training signal generated by said training signal generating circuit being inserted into a transmission burst as a pilot signal at fixed symbol intervals by said multiplex circuit,
said wireless receiving apparatus comprising:
a receiving circuit that receives a wireless burst signal transmitted from said wireless transmitting apparatus;
an analog-to-digital conversion circuit that performs an analog-to-digital conversion of said received burst signal;
a symbol timing synchronization circuit that performs symbol timing synchronization using the received burst signal that was subject to analog-to-digital conversion;
a frame detection circuit that detects a frame position from the received burst signal for which symbol timing was established, and extracts a pilot signal;
a frame synchronization circuit that performs frame synchronization using data relating to said detected frame position;
a carrier frequency estimation circuit that performs a carrier frequency estimation using pilot signal data extracted by said frame detection circuit;
a carrier frequency correction circuit that performs carrier frequency correction of the received burst signal for which symbol timing was established, using said estimated carrier frequency;
a channel estimation circuit that estimates channel distortion based on said frequency-corrected received burst signal, and outputs information related to channel distortion;
a channel compensation circuit that corrects channel distortion of said frequency-corrected received burst signal, using said information related to channel distortion; and
a symbol decision circuit that converts a data symbol sequence of said channel-compensated received burst signal to a received data bit stream,
wherein said training signal generating circuit comprises:
a synchronization code sequence generating circuit that generates a synchronization code sequence signal for frame synchronization;
a differential encoding circuit that differentially encodes said synchronization code sequence signal; and
an interleave circuit that interleaves said differentially encoded synchronization code sequence signal.

44. A wireless communication method for a wireless communication system including a wireless receiving apparatus and a wireless transmitting apparatus, said wireless communication method comprising:
a symbol generating process of converting a transmission data bit stream to a data symbol sequence;
a training signal generating process of generating a training signal including information for carrier recovery, information for clock recovery, and information for frame synchronization;
a multiplex process of multiplexing said training signal and said data symbol sequence, and generating a transmission burst signal; and
a digital-to-analog conversion process of performing a digital-to-analog conversion of said transmission burst signal;
a training signal generated by said training signal generating circuit being inserted into a transmission burst as a pilot signal at fixed symbol intervals in said multiplex process;
a receiving process of receiving a wireless burst signal transmitted from said wireless transmitting apparatus;
an analog-to-digital conversion process of performing an analog-to-digital conversion of said received burst signal;
a symbol timing synchronization process of performing symbol timing synchronization using the received burst signal that was subject to analog-to-digital conversion;
a frame detection process of detecting a frame position from the received burst signal for which symbol timing was established, and extracting a pilot signal;
a frame synchronization process of performing frame synchronization using data relating to said detected frame position;
a carrier frequency estimation process of performing a carrier frequency estimation using pilot signal data extracted in said frame detection process;
a carrier frequency correction process of performing carrier frequency correction of the received burst signal for which symbol timing was established, using said estimated carrier frequency;
a channel estimation process of estimating channel distortion based on said frequency-corrected received burst signal, and outputting information related to channel distortion;
a channel compensation process of correcting channel distortion of said frequency-corrected received burst signal, using said information related to channel distortion; and
a symbol decision of converting a data symbol sequence of said channel-compensated received burst signal to a received data bit stream,
wherein said training signal generating process comprises:
a synchronization code sequence generating process of generating a synchronization code sequence signal for frame synchronization;
a differential encoding process of differentially encoding said synchronization code sequence signal; and
an interleave process of interleaving said differentially encoded synchronization code sequence signal.

* * * * *